United States Patent [19]

Menezes et al.

[11] 4,360,843
[45] Nov. 23, 1982

[54] APPARATUS AND METHOD FOR DETERMINING TIME CODE ADDRESSES AT LOW TAPE SPEED

[75] Inventors: William A. Menezes, Mountain View; Douglas D. Kuper, Campbell; David Wheeler, Palo Alto, all of Calif.

[73] Assignee: Sony Corporation, Tokyo, Japan

[21] Appl. No.: 139,748

[22] Filed: Apr. 11, 1980

[51] Int. Cl.³ .................... H04N 5/78; G11B 27/14
[52] U.S. Cl. .................... 360/72.2; 235/92 T; 360/14.3
[58] Field of Search .................... 360/72.2, 14, 72.3, 360/72.1, 13; 235/92 T

[56] References Cited

U.S. PATENT DOCUMENTS

| | | | |
|---|---|---|---|
| 4,040,100 | 8/1977 | Chan | 360/72.2 |
| 4,120,006 | 10/1978 | Nagami | 360/72.2 |
| 4,167,759 | 9/1979 | Tachi | 360/14 |
| 4,175,267 | 11/1979 | Tachi | 360/72.2 |
| 4,210,939 | 7/1980 | Ninomiya | 360/72.2 |
| 4,232,347 | 11/1980 | Tachi | 360/72.2 |
| 4,272,790 | 6/1981 | Bates | 360/14 |
| 4,280,150 | 7/1981 | Bates | 360/14 |
| 4,290,081 | 9/1981 | Foerster | 360/72.2 |

FOREIGN PATENT DOCUMENTS

| | | | |
|---|---|---|---|
| 2734339 | 2/1978 | Fed. Rep. of Germany | 360/72.2 |
| 55-52571 | 4/1980 | Japan | 360/72.2 |

*Primary Examiner*—Howard Britton
*Attorney, Agent, or Firm*—Lewis H. Eslinger; Alvin Sinderbrand

[57] ABSTRACT

For determining the address, in terms of its respective longitudinal time code, of a selected video or other information signal recorded on a tape which has both longitudinal time codes and control pulses or control track signals recorded along its length, when the information signal is selected while the tape is being moved at a speed which is insufficient for the reliable reading of its longitudinal time codes, the tape is accelerated to a speed sufficient for the longitudinal time codes to be reliably read and a subsequently encountered longitudinal time code is read, the reproduced control pulses are counted between the time that an information signal is selected and the time that the subsequently encountered longitudinal time code is read, and a derived address of the selected information signal is determined, in terms of its respective longitudinal time code, as a function of the value of the subsequently encountered longitudinal time code and the count of the reproduced control pulses.

24 Claims, 20 Drawing Figures

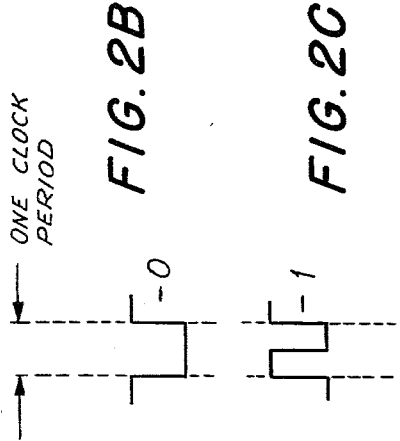
FIG. 1
PRIOR ART
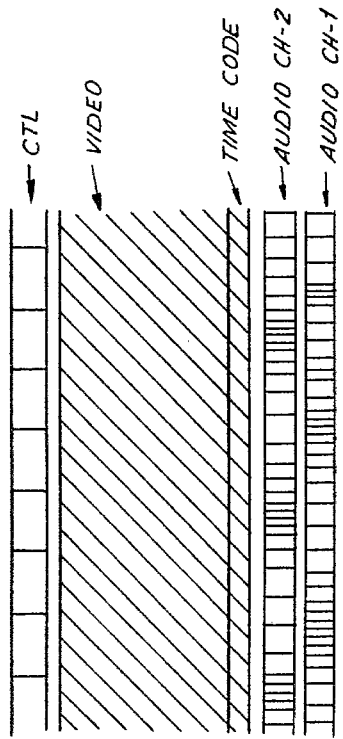
FIG. 2B
FIG. 2C
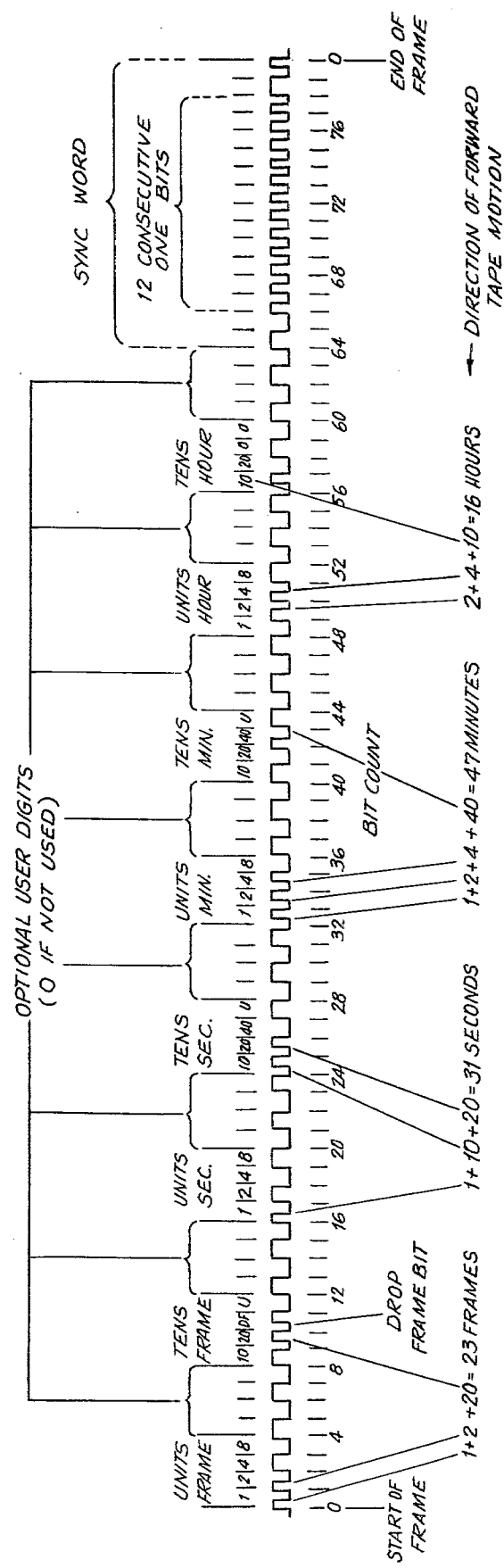
FIG. 2A
PRIOR ART

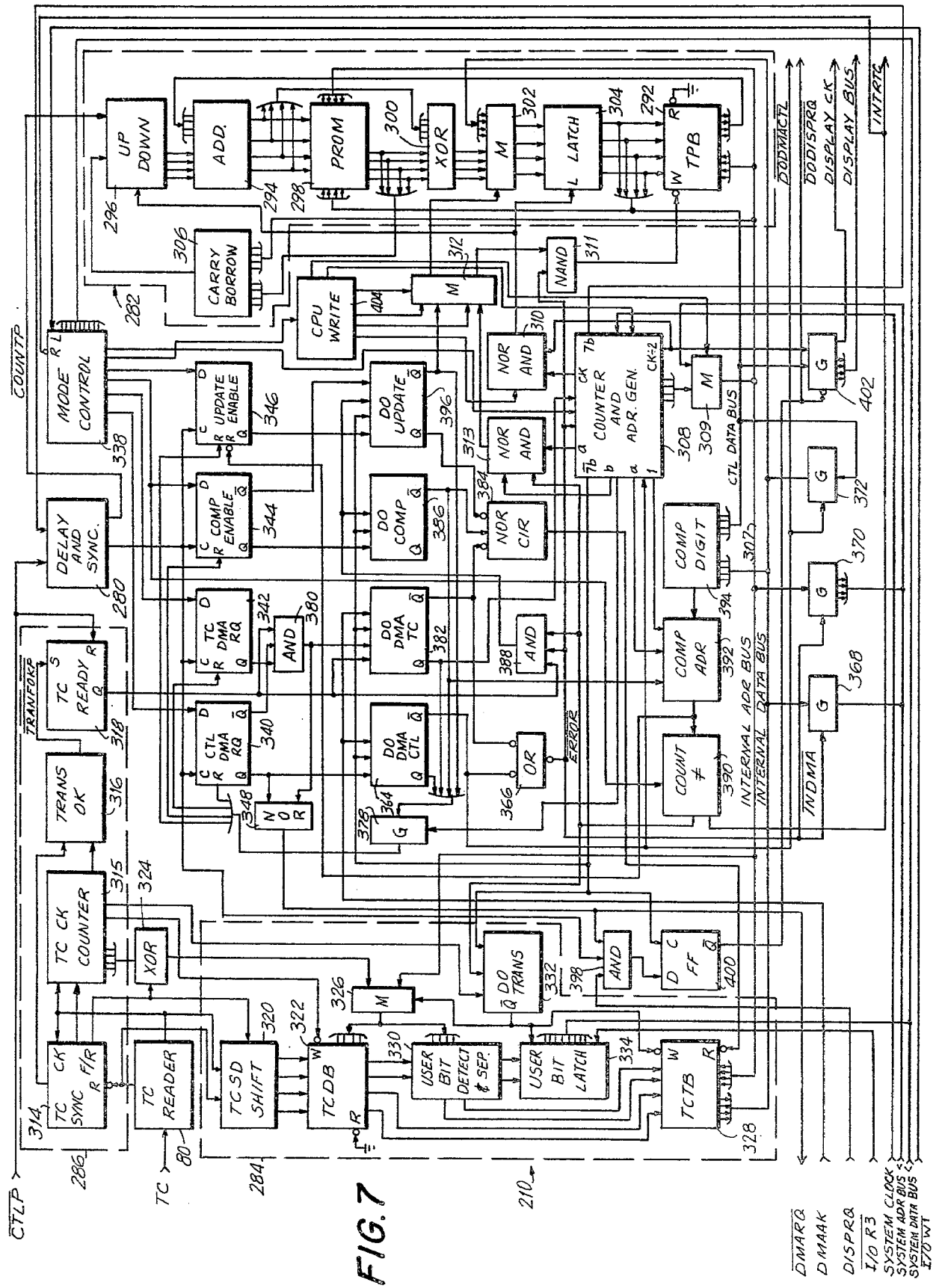

FIG. 8

| Time Code Transfer Buffer | Tape Position Buffer | 4-Bit Address Value | 16 Phase Clock Value |
|---|---|---|---|
| UNITS FRAME | UNITS FRAME | 0 | 0A |
| TENS FRAME | TENS FRAME | 1 | 1A |
| UNITS SEC. | UNITS SEC. | 2 | 2A |
| TENS SEC. | TENS SEC. | 3 | 3A |
| UNITS MIN. | UNITS MIN. | 4 | 4A |
| TENS MIN. | TENS MIN. | 5 | 5A |
| UNITS HOUR | UNITS HOUR | 6 | 6A |
| TENS HOUR | TENS HOUR | 7 | 7A |
| USER DIGIT 1 | UNITS FRAME | 8 | 0B |
| USER DIGIT 2 | TENS FRAME | 9 | 1B |
| USER DIGIT 3 | UNITS SEC. | 10 | 2B |
| USER DIGIT 4 | TENS SEC. | 11 | 3B |
| USER DIGIT 5 | UNITS MIN. | 12 | 4B |
| USER DIGIT 6 | TENS MIN. | 13 | 5B |
| USER DIGIT 7 | UNITS HOUR | 14 | 6B |
| USER DIGIT 8 | TENS HOUR | 15 | 7B |

(Lower half: rows 0–7; Upper half: rows 8–15)

APPARATUS AND METHOD FOR DETERMINING TIME CODE ADDRESSES AT LOW TAPE SPEED

BACKGROUND OF THE INVENTION

1. Field of the Invention

This invention relates generally to tape recorders and playback machines and, more particularly, is directed to determining the longitudinal time code addresses of selected information signals recorded on tapes.

2. Description of the Prior Art

There are many functions of tape recorders, particularly video tape recorders (VTRs), for which it is desirable to easily and accurately determine the positions or addresses of selected signals recorded upon a tape. For example, such addresses can be used to subsequently relocate desired signals, and, in the field of broadcast and commercial video tape recording, in which sophisticated machinery has been developed for the control of VTRs, such addresses are used to automatically cause VTRs to cue to, and to initiate and terminate playback at specified tape positions. In video tape editing, such addresses may be used to control the relatively complicated task of automatically causing playback and record VTRs to start up, achieve synchronization with each other, and simultaneously reach respective preselected tape addresses at which the signal from the playback VTR commences to be recorded on the tape in the record VTR. Such addresses may also be used in video editing to determine when the edit ends, to preview the edit, to initiate slow motion or the operation of special effect generators and to cause various of the signals which can be recorded on a VTR, such as the video and one or more audio signals, to be cut in or out at different times.

In order to satisfy the desire of VTR users, particularly broadcasters and commercial video tape recorders, for means to accurately select the addresses of selected locations on video tape recordings, video tape machines have been produced which allow an operator to rapidly locate and view the recorded signal corresponding to a desired video frame. For example, many VTRs and VTR editors provide a shuttle mode of operation in which an operator can view the visual information recorded on the tape while moving the tape at a controllably variable speed, which ranges between speeds that are substantially higher and substantially lower than normal speed. In addition, many such machines also have a jog mode of operation in which the operator can view the visual information recorded on the tape while the tape is moved either very slowly or not at all.

Although controls which allow slow or still motion playback, such as shuttle and jog controls, make it easy to find, view and select a desired frame of a video recording, they do not solve the problem of making it possible to easily and accurately assign a tape address to the selected frame. To do that, apparatus must be provided for easily and accurately determining the current tape address when the desired frame is viewed.

One method which has been used in the past to determine such a current tape address is the counting of control pulses. Control pulses or control track signals are recorded serially along many video tapes for the purpose of synchronizing the motion of such tapes relative to the moving or rotary transducer heads which are used to record and reproduce video signals thereon. Since each recording format records a predetermined number of such control pulses in conjunction with each frame, counting of the control pulses can provide an accurate relative address for each frame. Because of their relatively low frequency, commonly either one or two control pulses are recorded per frame, such control pulses are relatively easy to read and, although they cannot be read when a tape is virtually or actually at a stand-still, they can be read and counted at modest tape speeds, and particularly at all but the lowest tape speeds encountered in the shuttle or jog modes. Thus, tape control equipment which counts control pulses can provide a fairly accurate relative address of a frame viewed at slow or still motion.

Unfortunately, determining tape addresses by counting control pulses has several major disadvantages. Most important is the fact that the counting of control pulses provides nothing more than a measure of the distance along the tape occupied by the counted control pulses and thus can only provide a tape address that is relative to a point on the tape from which the control pulses have been continuously counted. In order to obtain an absolute tape address, it is necessary to set the counter at zero or another predetermined value at a known location, usually near the start of the tape, and to continuously count control pulses from such known location. If, for any reason, the count value is lost, it is necessary to return to the known position and reset the counter. As the tape is moved over greater distances, and as it is stopped and started and alternately moved in forward and reverse directions, as tapes often are in the editing process, it becomes increasingly likely that an occasional control pulse will be miscounted, owing to drop out, random noise, or the movement of control pulses past the control pulse reading head at a time when the motion of the tape is too low for the control pulse to be reliably read. Each miscount adversely affects the accuracy of all subsequently counted tape addresses until the count is again reset.

Because of the foregoing problems associated with determining tape addresses by counting control pulses, professional or broadcast video tape equipment often provides means for recording and reading time code addresses on a video tape, which addresses separately identify each frame of a recorded video signal. Such time codes commonly identify each frame of the video signal in terms of a sequential frame number, which specifies an hour, a minute, a second, and a frame value. For example, in the Society of Motion Picture and Television Engineers (SMPTE) time code for National Television System Commission (NTSC) video signals, frame numbers vary sequentially from a lowest possible value of 00 hours, 00 minutes, 00 seconds, and 00 frames, to a maximum possible value of 23 hours, 59 minutes, 59 seconds, and 29 frames.

There are two major types of time codes, namely, longitudinal time codes which are recorded in a track along a longitudinal margin of the tape, and vertical interval time codes which are recorded in the same tracks as the video signal, but in the portions of such tracks corresponding to the vertical blanking periods or intervals.

When longitudinal time codes can be read, they provide a very reliable and accurate means for identifying the address of each individual frame. Unfortunately, longitudinal time codes often cannot be read reliably, if at all, during slow or still motion playback because the output of conventional playback or reproducing heads is proportional to the rate of change of the flux acting on the head from the respective track, and not to the flux itself. Thus, with prior art longitudinal time code equipment, an operator is usually unable to directly determine the longitudinal time code address of a desired video frame selected while moving a tape at a slow speed, for example, while using a jog or shuttle mode. As a result, in order to find the longitudinal time code address of a desired video frame, it is often necessary to repeatedly perform the operation of adding or subtracting frames from an approximate time code address and viewing the frame having the resulting address until such viewing indicates that the correct time code address has been selected.

As is well known in the art of video editing, when vertical interval time codes are used to address video tapes, the equipment required for producing and reading such vertical interval time codes is more expensive than that required for longitudinal time codes. Many VTR's, particularly those equipped with so-called dynamic tracking, encounter difficulties in accurately reading such vertical interval time codes in slow or still motion modes.

OBJECTS AND SUMMARY OF THE INVENTION

Accordingly, it is an object of this invention to provide a method and an apparatus for determining time code addresses that avoid the above-described difficulties encountered with the prior art.

More particularly, it is an object of this invention to provide a method and apparatus for determining the longitudinal time code address of a signal read from a tape at a time when the tape speed is too slow to allow reliable reading of such longitudinal time code address.

Another object is to provide a method and apparatus for easily and conveniently determining the tape address of a frame of a video signal which is selected during playback of the video signal from a video tape in a slow or still motion operation.

In accordance with an aspect of this invention, in an apparatus for determining the address of a selected information signal recorded on a tape which also has a series of longitudinal time codes recorded along its length and designating corresponding addresses of recorded information signals, and a series of control pulses or control track signals which are recorded along the tape for the purpose of synchronizing the motion of the tape relative to transducer means which reads the information signals recorded on the tape, and in which time code reading means are capable of reliably reading the longitudinal time codes only when the tape is moved at a speed which is sufficient therefor, selectively operable means are provided for generating a marking signal when an information signal recorded at a desired point of the tape is read, and control pulse reading means read the control pulses as the tape moves; there is provided a device for determining the address, in terms of its respective longitudinal time code, of an information signal selected at a time that the tape is not being moved at a speed sufficient for reliable reading of the longitudinal time codes. The device thus provided comprises speed-up means operable for increasing the speed of the tape after generation of a marking signal so that the tape attains a sufficient speed for the time code reading means to reliably read a subsequently encountered longitudinal time code, counting means for counting the control pulses read by the control pulse reading means in the time between the generation of the marking signal and the reliable reading of the subsequently encountered longitudinal time code and thereby providing a count of the control pulses, and means for providing a derived address, in terms of its respective longitudinal time code, which is a function of the count of control pulses and of the subsequently encountered longitudinal time code and which corresponds to the selected information signal.

It is a further feature of the invention that operation of the speed-up means can be delayed until a selectively actuable control means is actuated.

It is still a further feature of the invention that cue means are provided to move the tape to the derived address so as to enable verification that the derived address does in fact correspond to the selected information signal.

It is yet another feature of the invention that it can be used in conjunction with video tape editing systems.

The above, and other objects, features and advantages of this invention, will be apparent in the following detailed description of illustrative embodiments of the invention which is to be read in connection with the accompanying drawings.

BRIEF DESCRIPTION OF THE DRAWINGS

FIG. 1 is a diagram of a length of video tape showing one of the formats commonly used in magnetically recording a plurality of signals upon such tape;

FIG. 2A is a diagram of the SMPTE time code;

FIGS. 2B and 2C are waveform diagrams illustrating the difference between a one-bit and a zero-bit in the SMPTE time code shown on FIG. 2A;

FIG. 7 is a detailed block diagram of a time code/CTL board included in the video tape editing system of FIG. 5;

FIG. 8 is a memory map of two separate memory buffers shown in FIG. 7;

DETAILED DESCRIPTION OF PREFERRED EMBODIMENTS

Figure 3:
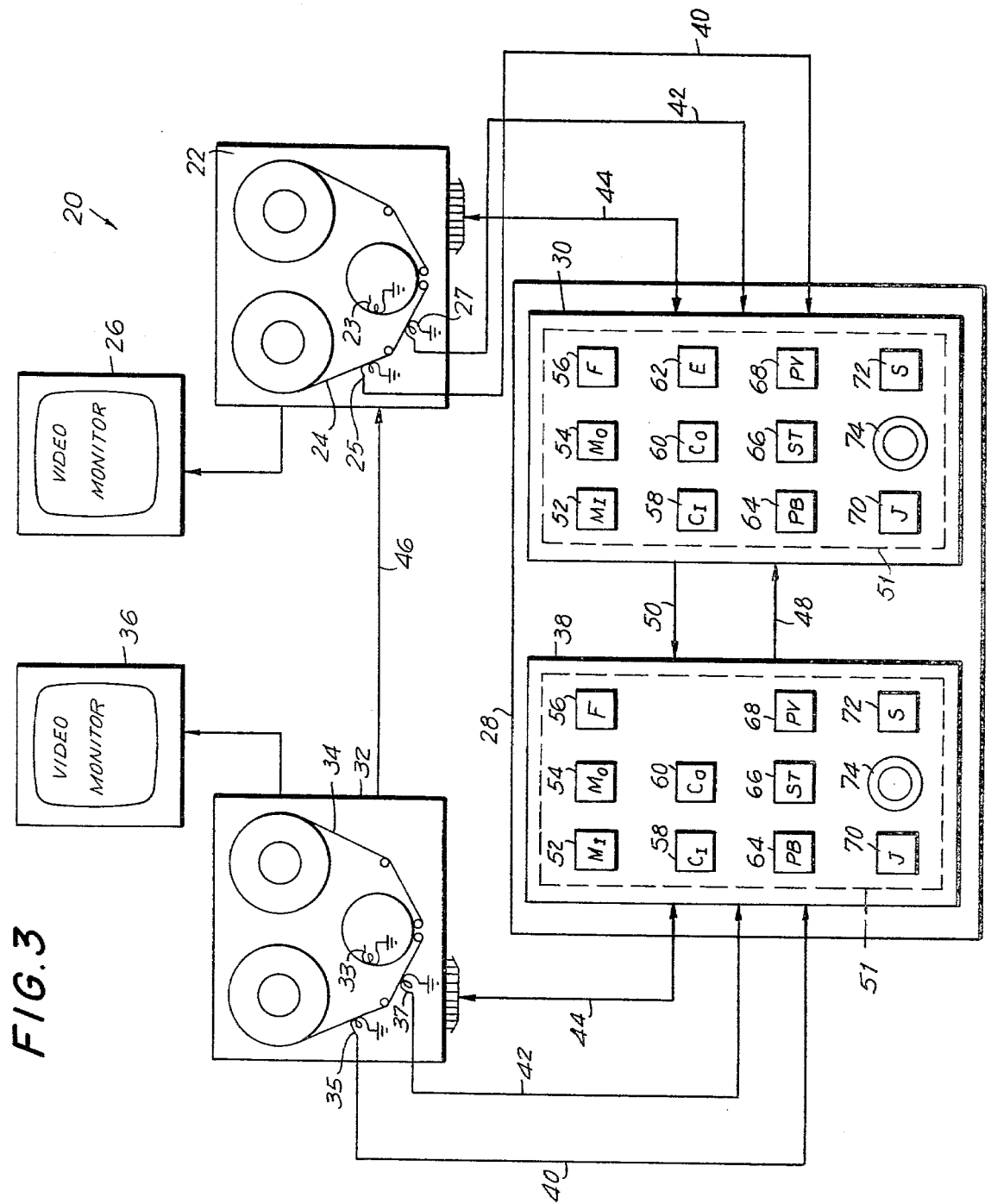
FIG. 3 is a diagram of a video tape editing system employing an address determining apparatus according to an embodiment of the present invention.

Referring initially to FIG. 3, a video tape editing system 20 is there shown which employs an apparatus according to the present invention for determining the address of a selected information signal recorded on a length of video tape. The editing system 20 generally includes a record video tape recorder (VTR) 22, in which a record tape 24 is placed for the recording thereon of edited video information by means of a rotary record/playback head 23, and a record video monitor 26 for displaying video information read or played back by head 23 of record VTR 22. The video tape editing system 20 also comprises an editor 28 which includes a record VTR control circuit 30 to which record VTR 22 is connected. The editing system 20 further comprises a play VTR 32 containing a play tape 34 on which there is recorded video information which is to be reproduced by a playback head 33 for recording on the record tape 24, and a play video monitor 36 for displaying the video information being played back from tape 34. The editor 28 also contains a play VTR control circuit 38 to which the play VTR 32 is connected.

The record and play VTRs 22 and 32 respectively have fixed heads 25 and 35 connected to their respective control circuits 30 and 38 by means of respective control pulse (CTL) connections 40, which communicate a pulse to the respective control circuit 30 or 38 in the editor 28 each time the head 25 or 35 reads one of the control pulses which are recorded serially along the tape 24 and 34, as indicated at CTL on FIG. 1. Such control pulses CTL are used in helical scan VTRs, such as VTRs 22 and 32, for the purpose of synchronizing the longitudinal motion of the tape relative to the rotary movements of transducer heads 23 and 33 which are used in helical scan VTRs to read and write video information in the skewed or slant tracks which are also shown on the tape in FIG. 1. The VTRs 22 and 32 are also shown on FIG. 3 to be connected to the respective control circuit 30 or 38 by time code connections 42 which deliver to the respective control circuits within editor 28 the signals read by time code heads 27 and 37 contained within the respective VTRs 22 and 32.

The longitudinal time code signals read by time code heads 27 and 37 are recorded serially along the video tapes 24 and 34, as is shown in FIG. 1. Although various longitudinal time codes can be used with various embodiments of the present invention, the VTRs shown in FIG. 3 are assumed to use the SMPTE time code shown in FIG. 2A, which contains one 80-bit longitudinal time code per video frame. Of the 80 bits of this time code, 16 comprise a sync word at the end of the time code for the purpose of enabling the circuitry which reads such time codes to determine the beginning and end of each time code and to determine the direction in which the time code is being read. The remaining 64 bits of the time code are divided into sixteen 4-bit digits, with eight of such digits being used to give a time designation to each video frame. Such time designation specifies an hour, a minute, a second, and a frame value for each frame, these values each having two decimal digits. The remaining eight 4-bit digits in the time code can be used as desired, for example, for labeling the number of the reel of tape upon which a given video signal is recorded.

Each of the VTRs 22 and 32 is also connected to its respective control circuit 30 and 33 within editor 28 by means of a respective VTR control and status connection 44, by which the respective control circuit can determine such information from the VTR as its direction of motion, and by which the respective control circuit can set the corresponding VTR to a play mode, a record mode, a forward or reverse direction of motion, a still motion mode of playback, or a stop mode. In addition, the record and play VTR control circuits 30 and 38 are connected to each other by a play VTR status connection 48 and a play VTR control connection 50, through which record VTR control circuit 30 can derive information concerning the status of, and can give commands to, play VTR 32 and its control circuit 38, so as to coordinate the operation of the record and play VTRs, as is required in video editing.

The record and play VTR control circuits 30 and 38 each include a plurality of push buttons disposed on a control panel 51, and which are used to control the operation of the editor 28. The two control panels 51 are identical except for the fact that, as stated below, an edit push button 62 is only provided on the control panel of record VTR control circuit 30. Each of the control panels 51 includes an in-point marking push button 52 and an out-put marking push button 54. These two push buttons 52 and 54 are used to mark the in- and out-points for the respective VTR during a video edit, that is, to mark the first frame and the last frame of a segment of video signals which, on play VTR 32, are to be transferred therefrom to the record VTR 22, and which on record VTR 22, are to be replaced by the segment of video signals marked on the play VTR. Each of the control panels 51 also includes a find push button 56 which, as will be explained below, is actuable to initiate a series of steps in its associated VTR by which a time code can be read according to this invention for the purpose of calculating the address of an in-point or an out-point marked by actuation of button 52 or 54 at a time when the VTR is traveling too slow for time codes to be read. A cue-to-inpoint push button 58 and a cue-to-outpoint push button 60 are also provided on each control panel 51 and are actuable to cause the respective VTR to go to the frame of the selected in-point or out-point, respectively, and to display that frame in still motion on the associated video monitor 26 or 36. As earlier noted, an edit push button 62 is located only on the control panel 51 of record VTR control circuit 30 since the edit function involves the editing system as a whole, and thus does not require duplication for each VTR. Actuation of edit button 62 causes editing system 20 to actually execute an edit in which selected video information played back from tape 34 in play VTR 32 is transferred to and recorded on tape 24 in record VTR 22. A play push button 64 is provided on each control panel 51 and is actuable to cause its respective VTR to operate in the playback mode. A stop push button 66 is provided on each control panel 51 and is actuable to stop the motion of the respective VTR. A preview push button 68 is provided on each panel 51 and is actuable to cause the respective VTR to preview the segment of the video information which has been marked by use of buttons 52 and 54. In the case of the play VTR 32, actuation of preview button 68 causes the marked video segment on play tape 34 to be shown on monitor 36 preceded and followed by a blank video display. In the case of record VTR 22, actuation of preview button 68 causes the video information both before and after the marked segment on record tape 24 to be displayed on monitor 26 separated by a blank display corresponding to the marked segment itself, and in which, during an actual edit, video information played back from tape 34 will be recorded on tape 24. Push buttons 70 and 72 are provided on each control panel 51 and are actuable to select the jog and shuttle modes, respectively. When jog button 70 is pushed, a rotatable control knob 74 on the same control panel can be manipulated to cause the tape on the respective VTR to be moved a distance through which the knob 74 is turned. This enables an operator to view the video information on a tape while that tape is made to move at a very slow speed by slowly turning the knob 74. It also gives an operator the ability to view the video information on a tape while that tape is at a standstill merely by allowing or causing knob 74 to stop its rotation. When shuttle push button 72 is pushed, the operator can view the video information recorded upon a tape in its respective VTR, in any of a wide range of speeds, varying from considerably above normal playback speed to considerably below normal playback speed, as is determined by the angular position to which its respective control knob 74 is displaced.

Figure 4:
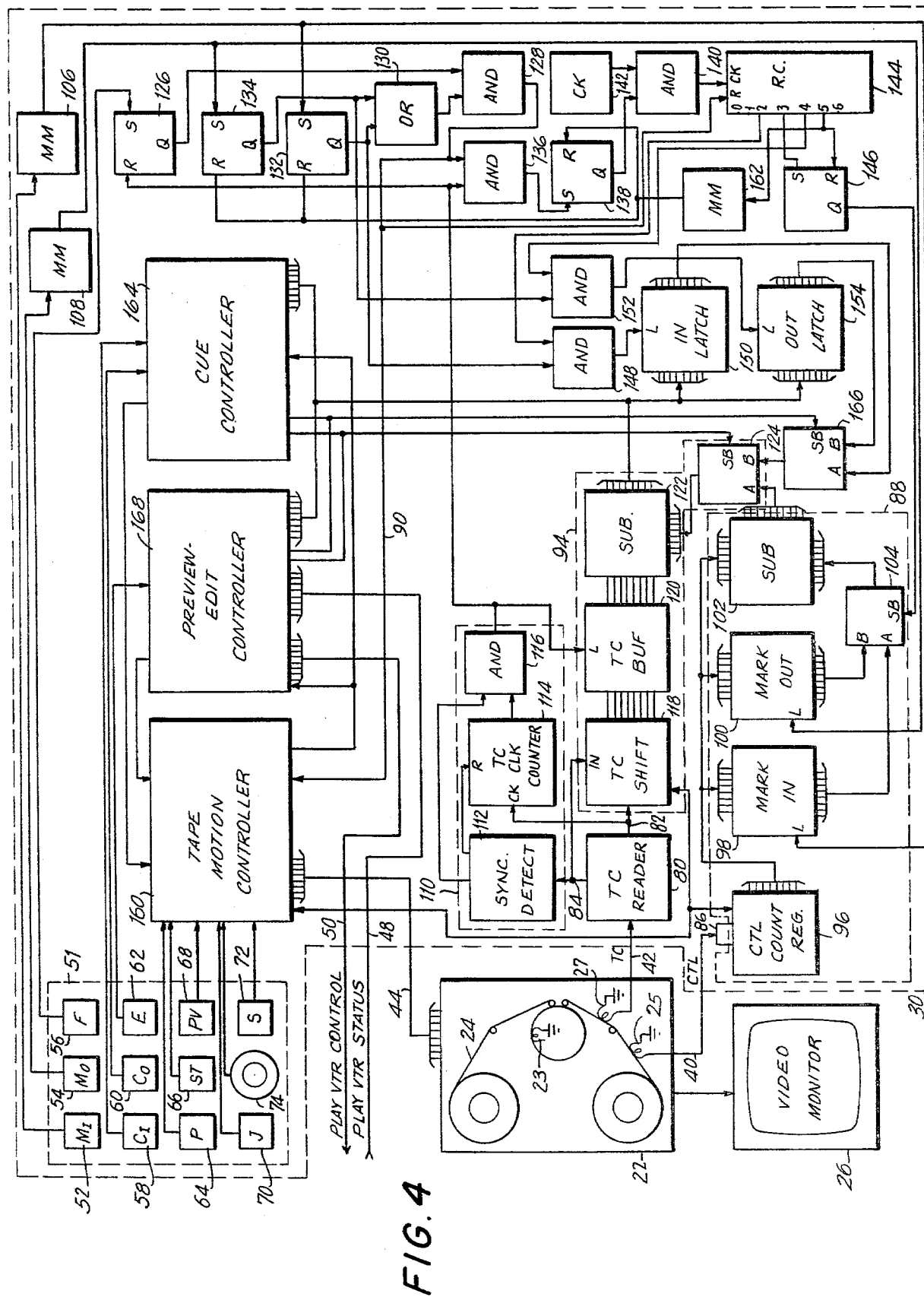
FIG. 4 is a block diagram of the address determining apparatus according to this invention which is part of the editing system shown in FIG. 3.

Referring now to FIG. 4, it will be seen that the record VTR control circuit 30 is there shown in greater detail. The VTR control circuit 30 of FIG. 4 comprises apparatus for determining the address of selected information signals, or video frames, recorded upon tape 24, and which includes a time code reader 80 receiving a time code signal read by a time code head 27 contained within VTR 22, as the serial time code recorded upon tape 24 passes that head. As was stated earlier, the SMPTE time code recorded upon tape 24 is comprised of 80 bits per frame. Each bit is either a zero or a one with the magnetic orientation of the recorded signal changing directions once every clock period, as shown in FIG. 2B, to represent a zero bit and twice every clock period as shown in FIG. 2C, to represent a one bit. The one bit has a transition in the middle of its associated clocking period, whereas the zero bit does not. As can be seen from FIG. 2A, it is the timing of transitions relative to their respective clocking period, rather than their direction, which determines whether a bit is a one or a zero. The time code reader 80 receives the signal picked up by the time code head and from it determines the current clock period of the signal and whether one or two transitions take place during each clock period, so as to determine whether the bit read during each clock period is either a zero or a one. The time code reader 80 supplies, as an output on a line 82, a serial data clock signal which has a frequency equal to the current clock period of the time code signal being read by the time code head. Time code reader 80 also supplies a time code serial data signal on a line 84 which is synchronized with the serial data output of the time code reader on line 82, and which has a high value when the bit just read is a one and a low value when the bit just read is a zero.

The apparatus shown in FIG. 4 for determining the address of selected information signals also includes the selectively operable push buttons 52 and 54 for generating respective marking signals upon reading of an information signal recorded at a desired point on tape 24. When VTR 22 is in either the play, shuttle, or jog mode, an operator of the apparatus shown in FIGS. 3 and 4, can view on monitor 26 the video signal currently being played back by VTR 22. When the operator sees a desired frame of the video signal recorded on tape 24, he can push either button 52 to mark that frame as an in-point, or he can push button 54 to mark that desired frame as an out-point.

The apparatus for determining the address of a selected information signal recorded on tape 24 also includes a control pulse receiving means, in the form of CTL input 86, for receiving the control pulses which are read by a control pulse reading head within VTR 22 as the tape 24 moves therepast.

The time code reader 80 can only reliably read longitudinal time codes when tape 24 is moving at a sufficient speed for the purpose. This is because the signal generated in the coil of the time code reading head is a function of the change of the rate of magnetic flux through that coil. When tape 24 is moving at a very slow rate, the rate of change of magnetic flux induced in the time code reading head coil is greatly reduced, which increases the difficulty of reading the recorded time code signal. Furthermore, as can be seen from FIGS. 2A, 2B, and 2C, the SMPTE longitudinal time code is a self-clocked signal, which means that the difference between zero bits and one bits is determined only by a difference between the relative frequencies at which flux transitions occur in each of those two different types of bits. Thus, if the speed of the tape is uneven, it becomes extremely difficult for the time code reader 80 to accurately determine the length of the clock period of individual bits within each time code, and thus to determine whether flux transitions are occurring once or twice during every such clock period.

Although the time code reader 80 is not capable of reliably reading time codes when tape 24 is moving at slow speeds, it is often desirable to mark in- or out-points of a video segment during a slow-motion or still-motion operation. For this reason, the present invention provides a device for determining the address, in terms of its respective longitudinal time code, of a selected information signal, or video frame, even if such desired information signal is selected by actuation of push button 52 or 54 at a time when tape 24 is not being moved at a speed sufficient for time code reader 80 to reliably read the longitudinal time code.

Such a device according to this invention comprises speed up means operable, as hereinafter described, for increasing the speed of the tape 24 after the generation of a marking signal by actuation of button 52 or 54, so that tape 24 attains a sufficient speed for time code reader 80 to reliably read a subsequently encountered longitudinal time code. The device according to the invention is further shown to include counting means 88 connected to CTL input 86 for counting the control pulses received by the CTL input between the actuation of push button 52 or 54 and the reliable reading of the subsequently encoutered longitudinal time code, and means 94 for providing a derived address, in terms of its respective longitudinal time code, which is a function of the count of control pulses occurring between the pushing of button 52 or 54 and the reading of the subsequently encountered longitudinal time code and also a function of the address of the subsequently encountered time code. The derived address thus produced by means 94 corresponds to the time code address of the individual frame displayed on monitor 26 at the time that push button 52 or 54 was pushed.

The counting means 88 is shown to include a CTL count register 96, an in-point mark time register 98, an out-point mark time register 100, a subtracting circuit 102, and a multiplexer 104. As previously noted, a predetermined number of control pulses, either one or two, are recorded in conjunction with each video frame recorded on a tape. Thus, by counting the control pulses which are supplied through CTL input 86 to CTL count register 96, it is possible to count the number of frames by which tape 24 has moved. The count register 96 increases its count by one each time a number of control pulses corresponding to one video frame on tape 24 are received by CTL input 86. In the embodiment of the invention shown in FIG. 4, count register 96 provides, as an output, a frame number corresponding to a frame number in the SMPTE time code, that is, a frame number which designates hours, minutes, seconds and frames, each in terms of a two-digit decimal value. The sequence of counting values produced as an output by count register 96 corresponds to the sequence of SMPTE time codes. For example, after the frame value of a count produced by count register 96 reaches "29", the next count it produces will have a zero frames value and the seconds value will be increased by one. Similarly, when the seconds value reaches "59", the next count of the count register 96 will have a seconds value of zero and the minutes value will be increased by one. Finally, when the minutes value in the count of the count register 96 reaches "59", the next count produced by the count register will have a zero minutes value and the hours value will be increased by one. The output of count register 96 is supplied in a 32-bit parallel manner, that is, in eight 4-bit binary coded decimal digits, to the inputs of in-point mark time register 98, out-point mark time register 100 and subtracting circuit 102.

The push button 52 is connected with a monostable multivibrator 106 so that when push button 52 is activated, monostable multivibrator 106 will produce a brief positive pulse which is supplied to the load input of in-point mark time register 98, causing that register to latch, or store, the 8-digit count value currently being output by the count register 96. Similarly, push button 54 is connected to a debounce multivibrator 108, which, in turn, is connected to the load input of out-point mark time register 100, so that, when push button 54 is activated, a brief positive pulse will be produced by monostable multivibrator 108 causing out-point mark time register 100 to latch the current output of count register 96. The mark time registers 98 and 100 each have a 32-bit, 8-digit, parallel output to which is supplied the value stored in its respective mark time register. These outputs from registers 98 and 100 are supplied to inputs A and B, respectively, of a multiplexer 104, which selects one of these outputs from the mark time registers 98 and 100 and supplies it as a 32-bit subtrahend input to subtracting circuit 102. Normally, the output of the in-point mark time register 98 is supplied by multiplexer 104 as the subtrahend to subtracting circuit 102. However, when a select B (SB) input of the multiplexer is supplied with a high signal, the output of the out-point mark time register 100 will be supplied as the subtrahend to subtracting circuit 102. The subtracting circuit 102 also has a 32-bit, 8-digit, output which, at any given time, is equal to the difference between the minuend constituted by the current count of count register 96 and the subtrahend from one of mark time registers 98 or 100.

The apparatus for determining time code addresses of information signals selected at low tape speeds, as disclosed in FIG. 4, also includes a time code ready indicating circuit 110 for detecting the probability of accuracy of a longitudinal time code that has just been read by reader 80 and for generating a time code ready signal when such longitudinal time code has at least a predetermined degree of accuracy. Time code ready indicating circuit 110 is shown to be comprised of a sync word detecting circuit 112, a time code clock counter 114, and an AND circuit 116. The sync word detecting circuit 112 is connected to both the serial data clock output 82 and the time code serial data output 84 of time code reader 80. The time code clock counter 114 is connected to serial data clock output 82 of time code reader 80, and AND circuit 116 is connected to outputs of sync word detecting circuit 112 and time code clock counter 114. The sync word detecting circuit 112 uses the signals from serial data clock output 82 and time code serial data output 84 to read the bits produced by the time code reader 80. The circuit 112 may include a counter which counts one bits and is reset by zero bits, and which produces an output supplied to AND gate 116 when twelve one bits have been counted in a row indicating that the sync word included in the SMPTE time code shown in FIG. 2A has been received. The time code clock counter 114 receives an output from sync word detecting circuit 112 and is reset thereby shortly after that detecting circuit 112 supplies its output signal indicating the receipt of a sync word to AND gate 116. After being reset, time code clock counter 114 counts the clock pulses of serial data clock output 82 of time code reader 80, and counter 114 generates an output to AND gate 116 when it reaches a count that indicates that eighty clock periods of the time code have been measured by time code reader 80 since the receipt of the previous sync word by sync detector circuit 112. AND gate 116 only produces an output if it receives inputs from detecting circuit 112 and clock counter 114 simultaneously. This will only occur when the sync word associated with a time code just read by the time code reader 80 occurs exactly eighty time code clock periods after the receipt by detecting circuit 112 of the previous sync word. Since there are eighty bits in each time code, and since one time code clock period is associated with each bit, an output from AND gate 116 indicates that the time code reader 80 has been able to accurately determine the time code clock period of the signal supplied to it from the time code reading head in VTR 22, and this, in turn, indicates that the information supplied on time code serial data output 84 is probably accurate. The output of AND gate 116 is herein called a time code ready signal, since it indicates that the time code data just read by time code reader 80 is probably accurate and thus is ready for use by the means 94 for providing a derived address.

The means 94 for providing a derived address is shown on FIG. 4 to include a time code shift register 118, a time code buffer 120, a time code subtracting circuit 122, and a multiplexer 124. The time code shift register 118 receives serial data clock output 82 and time code serial data output 84 from time code reader 80. Register 118 is a 32-bit serial-in, parallel-out shift register which has a 32-bit, 8-digit, output supplied as a parallel input to time code buffer 120. The output of time code buffer 120 is also a 32-bit, 8-digit, parallel output which is supplied as the minuend input to time code subtracting circuit 122. The subtrahend input of subtracting circuit 122, is similarly a 32-bit input which is normally supplied through multiplexer 124 from the output of subtracting circuit 102. The output of subtracting circuit 122 is also a 32-bit, 8-digit, output capable of representing a time code address.

The time code shift register 118 receives and shifts in the time code serial data output 84 from time code reader 80 in response to the serial data clock output 82 from reader 80. Register 118 includes suitable circuitry which causes it not to shift in those bits of the SMPTE time code which are associated with the optional user digits or with the sync word shown in FIG. 2A. Register 118 also includes suitable circuitry for replacing with 0 bits a dropped frame bit and user bits which are labeled with the letter "U" in FIG. 2A. Thus, time code shift register 118 receives only the 32-bits which are associated with the 8 address digits of the SMPTE time code. The time code shift register 118 has a connection with a tape motion controller 160, which connection informs shift register 118 whether VTR 22 is causing tape 24 to move in a forward or a reverse direction. If tape 24 is being moved in the reverse direction, register 118 shifts the time code serial data in a reverse manner, so that its 32-bit output will have the same order regardless of the direction of motion of tape 24. At the time that the string of continuous one bits of the sync word are detected by sync word detecting circuit 112, shift register 118 should contain the 8 digits of the complete time code address contained in the time code just read by time code reader 80, and its 32-bit output which is supplied to time code buffer 120 will contain these 8 digits. Thus, if a time code ready signal is generated by AND gate 116, indicating that the time code just read by time code reader 80 has a high probability of accuracy, time code buffer 120 will latch the 8-digit time code address being supplied by the output of time code shift register 118. This value, once latched by time code buffer 120, is supplied as the minuend input of time code subtracting circuit 122. Normally, the subtrahend input of time code subtracting circuit 122 will be supplied through multiplexer 124 from the output of the subtracting circuit 102 which represents the difference between the current count of count register 96 and the value of either in-point mark time register 98 or out-point mark time register 100. The difference between these two inputs to time code subtracting circuit 122, is supplied as an 8-digit time code address at the output of subtracting circuit 122.

The device for determining the time code address of a video frame which is selected at a low tape speed is also shown to include a find flip-flop 126 and an AND gate 128 connected to push button 56 and to a so-called speed-up wire 90, for preventing the application to tape motion controller 160 of a speed-up signal by way of such speed-up wire 90 until push button 56 is actuated. The find flip-flop 126 has its set input connected to the output of push button 56, and its Q output is connected to one input of AND gate 128. The reset input of flip-flop 126 is connected to the time code ready output of AND gate 116. The other input of AND gate 128 is connected to the output of an OR gate 130, which has as its two inputs the Q outputs of two flip-flops 132 and 134. The flip-flop 132 has its set input connected to the output of monostable multivibrator 106 which is triggered briefly upon the actuation of push button 52. Similarly, the set input of flip-flop 134 is connected to the output of monostable multivibrator 108 which is triggered positively upon the actuation of push button 54. The output of AND gate 128, besides being connected to speed-up wire 90, is also connected to one input of an AND gate 136. The other input of AND gate 136 is connected to the time code ready output of AND gate 116. The output of AND gate 136 is connected to the set input of a flip-flop 138 which has its Q output supplied to one input of an AND gate 140. The other input of AND gate 140 is supplied by a clock generator 142, which generates a series of clock pulses having a very high frequency relative to the frequency at which control pulses are read from tape 24. The output of AND gate 140 is supplied as the clocking input to a ring counter 144. A reset input of ring counter 144 is connected to speed-up wire 90. The 3rd and 5th bit outputs of ring counter 144 are respectively connected to the set and reset inputs of a flip-flop 146 which has its Q output supplied to the select B input (SB) of multiplexer 104. The 5th bit output of ring counter 144 is also connected to the input of a monostable multivibrator 162 which has its output connected to the reset inputs of flip-flops 132, 134 and 138. The 2nd bit output of ring counter 144 is connected to one input of an AND gate 148. The other input of AND gate 148 is connected to the Q output of flip-flop 132. The output of AND gate 148 is connected to the load input of an in-point address latch 150. The 4th bit output of ring counter 144 is connected to one input of an AND gate 152 which has its other input connected to the Q output of flip-flop 134. The output of AND gate 152 is connected to the load input of an out-point address latch 154. The inputs of in-point and out-point address latches 150 and 154 are both connected to the 32-bit, 8-digit, time code address output of time code subtracting circuit 122. The tape motion controller 160 is shown to be suitably connected with jog and shuttle push buttons 70 and 72 and with control knob 74 and may be of a type used in prior art video editors to control the tape movements in VTR 22 in response to manipulations of push buttons 70 and 72 and knob 74.

The operation of the circuitry shown in FIG. 4 in determining the time code address of video signals selected at low tape speeds will now be explained:

By use of either the play push button 64, or the jog or the shuttle push button 70 or 72, respectively, and control knob 74, an operator causes the tape 24 to move until a desired frame or sequence of frame is viewed on video monitor 26. At this time, a marking push button, for example, push button 52, can be actuated. The first actuation of push button 52 causes monostable multivibrator 106 to produce a brief positive pulse which causes in-point mark time register 98 to record the then current count of CTL count register 96. The brief pulse produced by monostable multivibrator 106 is also supplied to the set input of flip-flop 132, causing the Q output of that flip-flop to remain high until flip-flop 132 is reset. The OR circuit 130 produces a high output when any one of its inputs is high and, therefore, then produces a high output to AND gate 128. However, AND gate 128 will not produce a high output until both of its inputs have a high signal level. If it is now assumed, for purposes of example, that by use of either the play push button 64, or the jog and shuttle push buttons 70, 72 and knob 74, the tape 24 is further moved, a new frame viewed on monitor 26 may be selected as a desired out-point for a video edit. When such new frame is viewed, push button 54 is actuated to cause monostable multivibrator 108 to generate a brief positive pulse by which out-point mark time register 100 is made to record the value of CTL count register 96 at that time.

It should be here noted, that virtually all motion of tape 24 is reflected in the count indicated by count register 96. Counter register 96 receives an output from tape motion controller 160 which indicates to it whether tape 24 is moving in a forward or a reverse direction so that it can count up or down accordingly. Furthermore, since control pulses have relatively low frequencies, for example, occur at a frequency of either one or two pulses per frame, they can be read by the control pulse tape head at low tape speeds. Unless tape 24 is moved at a very low speed when a control pulse thereon is passing under the control pulse head, each control pulse that passes that head will be counted, and the count in the count register 96 will vary as an accurate reflection of a distance of tape movement. Thus, at any given time, the difference between the value stored in either in-point or out-point mark time register 98 or 100 and the count of register 96 should represent a fairly accurate representation of the distance between either the selected in-point or out-point, respectively, and the current tape position.

After an operator has actuated either in-point marking push button 52 or out-point marking push button 54, or both of them, he can then actuate find push button 56 to set flip-flop 126 and thereby cause its Q output to remain high until flip-flop 126 is reset. In the example being described, both push buttons 52 and 54 have been actuated so that both flip-flops 132 and 134 have been set to the states in which they produce high signals on their Q outputs. Thus, both of the inputs to OR gate 130 are high causing the output of that OR gate and the corresponding input to AND gate 128 also to be high. At this time, since the Q output of flip-flop 126 is also high, both inputs to AND gate 128 are high and thus the output of the latter will also be high to apply a high signal to speed-up wire 90. This high signal is applied to tape motion controller 160 which, in response thereto, supplies a command over VTR control and status connection 44 to VTR 22 for causing that VTR to increase the speed of tape 24 to a level high enough for the time codes on it to be reliably read by the time code reader 80. During the period in which the speed of tape 24 is being increased by the tape motion controller 160 in response to the high signal on the speed-up wire 90, time code reader 80, as always, attempts to read each time code which is encountered by the time code reading head contained within the VTR 22. However, it is only after sync word detecting circuit 112 has detected two separate time code sync words separated by a count of eighty time code clock periods counted by the time code clock counter 114, that AND gate 116 will generate a time code ready signal. Such time code ready signal will cause the eight time code address digits stored in time code shift register 118 to be transferred to time code buffer 120 and supplied as the minuend input to time code subtracting circuit 122. The time code ready signal from the output of AND gate 116 is supplied as one input to AND gate 136, and the other input to this AND gate 136 is the signal on speed-up wire 90, which is also high at this time due to the combined high outputs of flip-flop 126 and OR gate 130. As a result, the output supplied by AND gate 136 to the set input of flip-flop 138 is high causing that flip-flop to be set, which, in turn, causes a derived address to be calculated as a function of the time code address stored in time code buffer 120 for each of the push buttons 52 and 54 which had been actuated. Thus, it can be seen that time code buffer 120 provides means which, in response to the generation of the time code ready signal from AND gate 116, selects a longitudinal time code encountered by time code reader 80 subsequent to the speeding up of tape 24 as the subsequently encountered longitudinal time code from which the derived addresses of the video signals selected by the actuation of push buttons 52 and 54 are calculated.

As stated above, the first time code ready signal from AND gate 116 subsequent to the speeding up of tape 24 in response to a high signal on speed-up line 90, causes AND gate 136 to generate a high signal which sets flip-flop 138. This first time code ready signal also resets flip-flop 126 causing its Q output to go low, which, in turn, causes the output of AND gate 128, and hence the signal carried by speed-up wire 90, to go low. Such low signal on wire 90 stops the speed-up of tape 24 and which causes the output of AND gate 136 to go low and to stay low until find push button 56 is again activated. However, it should be noted that, due to the delay in the operation of flip-flop 126 and AND gate 128, the signal on speed-up wire 90 will not go low in response to the generation of a time code ready signal from AND gate 116 until AND gate 136 has had time to generate a brief pulse for setting flip-flop 138.

When flip-flop 138 is thus set, it supplies a positive signal to one input of AND gate 140 which thereby supplies clock signals from clock generator 142 to the clocking input of ring counter 144. The ring counter 144 has six output bits (0–5) only one of which is high at any given time. In response to each clock pulse which is supplied to the clocking input of ring counter 144, a successive one of its six output bits is made high. At the time that flip-flop 138 is first set by the output of AND gate 136, the 0th bit of ring counter 144 is high as a result of the high signal supplied to the reset input of ring counter 144 from the speed-up wire 90. However, as was discussed above, the signal on speed-up wire 90 goes low shortly after the setting of flip-flop 138, thereby freeing ring counter 144 to count the clock pulses passed through AND gate 140 from clock generator 142. In response to the first clock pulse received from clock generator 142, the 1st bit of ring counter 144 is set high. Like the 0th bit of ring counter 144, the 1st bit of the ring counter has no connection to its output. During the period that the output of the first bit of ring counter 144 is high, the circuitry of FIG. 4 has time for time code subtracting circuit 122 to subtract the 32-bit output of subtracting circuit 102 from the 32-bit time code address supplied by time code buffer 120, and to provide the resulting difference to the 32-bit output of circuit 122. In response to the next clock pulse received by ring counter 144, the 2nd bit of that ring counter goes high supplying a positive signal to one input of AND gate 148. The other input of AND gate 148 is connected to the Q output of flip-flop 132, which will always be high during the calculation of derived addresses if push button 52 has previously been activated. Since in the example being here described the push button 52 has been actuated, it will be assumed that both inputs of AND gate 148 are high, which causes the load input of in-point address latch 150 also to be high. This will cause in-point address latch 150 to store the 32-bit value being supplied by the output of time code subtracting circuit 122. This stored value is equal to the difference between the time code address currently stored in time code buffer 120 and the difference between the count currently in the count register 96 and the count which was in the count register 96 at the time that push button 52 was actuated. Thus, the value stored in the in-point address latch 150 in response to the high signal on the 2nd bit of ring counter 144 should equal the longitudinal time code address of tape 24 at the time push button 52 was actuated.

In response to the next clock signal received by ring counter 144, the 2nd bit output of that ring counter will go low and the 3rd bit output will go high. The high signal from the 3rd bit output of ring counter 144 causes flip-flop 146 to be set so that its Q output continuously supplies a high signal to the select B input (SB) of multiplexer 104 until flip-flop 146 is reset. When the select B input (SB) of multiplexer 104 is supplied with a positive or high signal, multiplexer 104 disconnects the output of in-point mark time register 93 from the subtrahend input of subtracting circuit 102 and, in its place, connects the output of out-point mark time register 100. As a result, the 32-bit output of subtracting circuit 102 which is supplied as the subtrahend to time code subtracting circuit 122 will be equal to the difference between the current value of the control or CTL count register 96 and the value of that count register 96 at the time when push button 54 was actuated. Therefore, the output of subtracting circuit 122 is equal to the time code address of tape 24 at the time that push button 54 was actuated. This output of subtracting circuit 122 is supplied to the inputs of latches 150 and 154.

At the next clock pulse from clock generator 142, and after the two subtracting circuits 102 and 122 have had time to operate, the 4th bit output of ring counter 144 goes high and supplies a corresponding high input to AND gate 152. The other input of AND gate 152 is connected to the Q output of flip-flop 134 which is high whenever that flip-flop is set, as it always will be if push button 54 has been actuated before the actuation of push button 56, as has been the case in the present example, Thus, at this time, AND gate 152 generates a high output for causing outpoint address latch 154 to latch the address supplied by the output of the subtraction circuit 122, which address corresponds to the time code address of tape 24 at the time that push button 54 was last actuated.

At the next clock pulse of clock generator 142, the 4th bit of ring counter 144 goes low, causing the value in latch 154 to be fixed, and the 5th bit of ring counter 144 goes high. When the 5th bit of ring counter 144 goes high, flip-flop 146 is reset for causing its Q output to go low, and thereby returning multiplexer 104 to its normal state in which the output of in-point mark time register 98 is supplied as the subtrahend to subtracting circuit 102. In addition, when the 5th bit of ring counter 144 goes high, it causes monostable multivibrator 162 to produce a brief pulse which reset flip-flops 132, 134 and 138. The resetting of flip-flop 138 causes its Q output to go low, which prevents the passage through AND gate 140 of any further clocking pulses from clock generator 142 and, thus, ring counter 144 is stopped with its 5th bit high, until the next actuation of push button 56. The resetting of flip-flops 132 and 134 clears those flip-flops until either or both of the push buttons 52 or 54 are again actuated.

Once the device for determining the time code address of video signals selected at low tape speeds has produced one or more derived time code addresses, as described above, such derived address can be used for a plurality of purposes. For example, in the apparatus shown in FIG. 4, a cue controller 164 is provided for moving tape 24 and bringing the latter to rest at the position at which the video frame recorded at the derived address can be read, and for causing the repetitive reading by VTR 22 of the frame at that position. The cue controller 164 may be comprised of cue controlling electronics which are well known in the art of video tape editors. In any case, cue controller 164 is shown in FIG. 4 to be connected to push buttons 58 and 60, which are actuable, respectively, to cause VTR 22 to cue to the in-point address stored in in-point latch 150 or the out-point address stored in out-point address latch 154. The cue controller 164 shown in FIG. 4 further has a connection to the select B inputs (SB) of multiplexer 124 and of a multiplexer 166. Controller 164 has a 32-bit input connected to the output of subtracting circuit 122, and it suitably receives information from tape motion controller 160 regarding the status of VTR 22. Cue controller 164 is capable of giving commands to tape motion controller 160 so as to cause VTR 22 to speed up, to stop, and to assume the still motion mode in which it will repeatedly read and display a selected video frame on monitor 26. The operation of cue controller 164 can be described briefly with reference to an example initiated by actuation of push button 58. When this happens, a positive signal is supplied to the select B input (SB) of multiplexer 124, which causes the output of in-point address latch 150 to be supplied through multiplexer 166 and multiplexer 124 to the subtrahend input of subtracting circuit 122. At the same time, cue controller 164 suitably issues a signal to tape motion controller 160 which causes VTR 22 to speed up. As tape 24 is moved in VTR 22, time code address values are continuously read into time code buffer 120 every time that a time code ready signal from AND gate 116 indicates that the time code just read is probably accurate. Therefore, the subtracted value or output from subtracting circuit 122 indicates the distance between the time code address of the desired in-point and the time code address of the current tape position. This subtracted value is supplied as an input to cue controller 164 and, on the basis thereof, the cue controller causes VTR 22 to continue movement of the tape therein until the desired frame is reached, at which point, the output of the subtracting circuit 122 is zero and cue controller 164 causes VTR 22 to be switched to its still motion mode so that the frame having the desired in-point time code address will be repeatedly shown on monitor 26.

The desired addresses determined by the embodiment of the invention shown in FIG. 4, can also be used by a preview-edit controller 168 to control the processes of previewing of or performing a video edit. Such controller 168 may employ well known electronics for previewing and for controlling the actual editing of video information starting at specified time code addresses on a tape in play VTR 32 and on a tape in record VTR 22 until a specified address is reached, either on the tape in the play VTR or on the tape in the record VTR. In the video tape editing system 20, shown in FIG. 3, play VTR control circuit 38 is virtually identical to record VTR control circuit 30, shown in FIG. 4, except for the fact that the preview-edit controller 168, as well as the previously mentioned edit push button 62, exist only in the record VTR control circuit 30. The single preview-edit controller 168 in circuit 30 is effective to control both the play and record VTRs during an edit or an edit-preview.

During a video edit after push buttons 52 and 54 have been used to select in- and out-points for the edit on record tape 24, the operation of the preview-edit controller 168, is as follows:

First, controller 168 causes a high signal to be supplied to the select B input (SB) of multiplexer 124 so that the time code address of the in-point stored in in-point address latch 150 is supplied as the subtrahend to subtracting circuit 122. Then controller 168, through its connection with tape motion controller 160, causes VTR 22 to move tape 24 therein until the difference between the value in the time code buffer 120 and the in-point time code address equals a value which signifies that the tape 24 is at a proper preroll position which is a specified number of frames before the in-point address contained within latch 150. Through its connections 48 and 50 with play VTR control circuit 38, controller 168 causes play VTR 32 to move play tape 34 to a similar pre-roll position a specified number of frames before the in-point which has been selected for the play tape 34. Then, once this condition has been achieved, controller 168 causes both tapes to speed up and to achieve synchronism by the time that the play and the record tapes reach their respective in-points. When tape 24 reaches its respective in-point, the output of subtracting circuit 122 becomes zero, and preview-edit controller 168 senses that this condition and causes the information signals being played back from play tape 34 to be supplied to record VTR 22 over the play-to-record signal connection 46 for recording on record tape 24. Once this has happened, controller 168 causes the select B input SB of multiplexer 166 to be set high, so that the address of the out-point stored in out-point address latch 154 is supplied through multiplexers 166 and 124 to the subtrahend input of subtracting circuit 122. The controller 168 causes the tape 24 to continue moving in the forward direction in VTR 22 until the difference between the value of the time code read from tape 24 and stored in time code buffer 120 and the out-point value supplied from latch 154 to the subtrahend input of subtracting circuit 122 equals zero. At this time, recording of the information signal from play VTR 32 on the tape 24 in record VTR 22 will end, that is, VTR 22 will be changed from its recording mode back to its playback mode.

Figure 5:
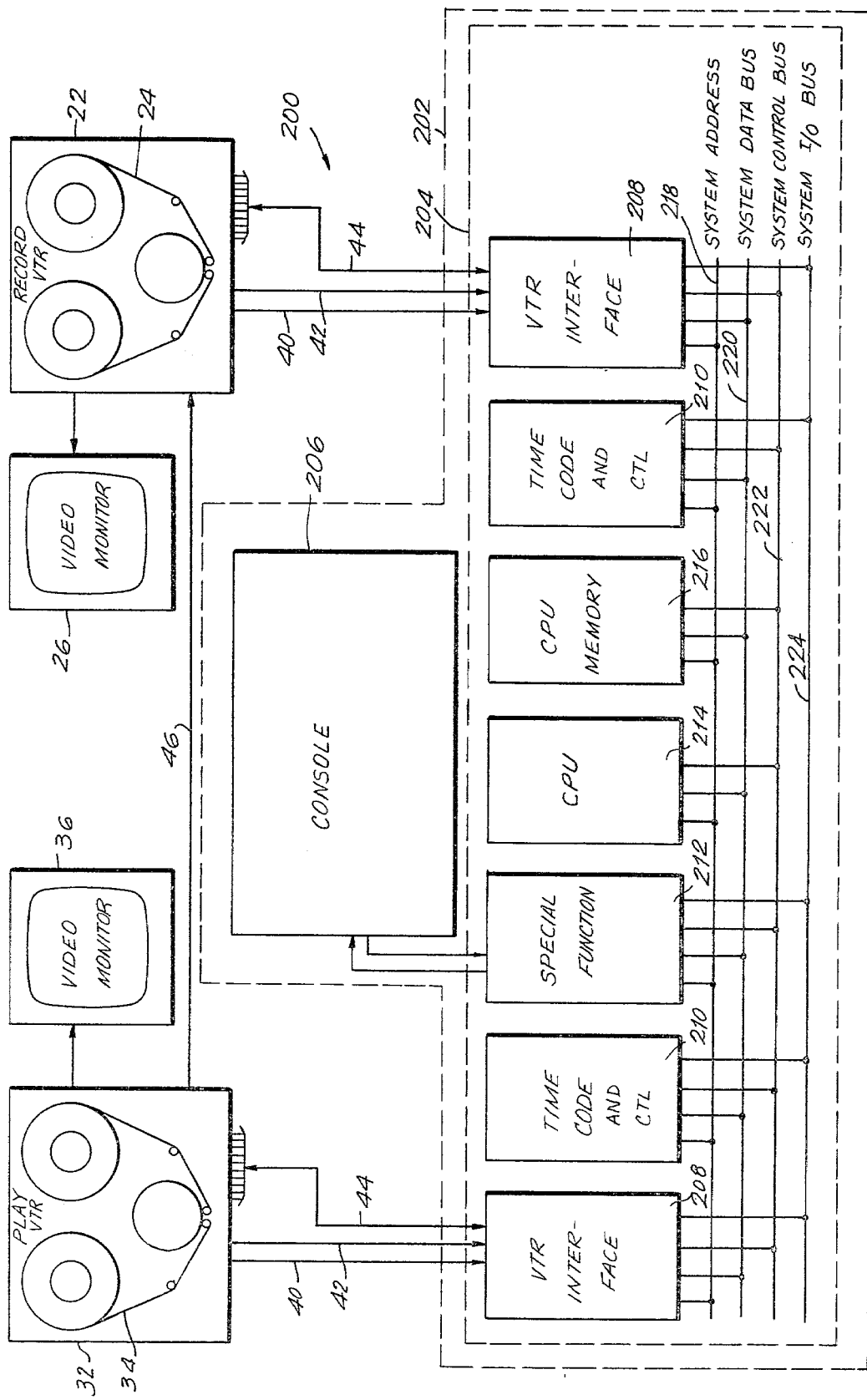
FIG. 5 shows a relatively more complex video tape editing system which includes another embodiment of the invention.

Referring now to FIG. 5, a video editing system 200 is there shown in which microprocessing techniques are employed in an embodiment of this invention. The video editing system 200, like video editing system 20 of FIG. 3, contains a record VTR 22, a record video monitor 26, a play VTR 32 and a play video monitor 36. These VTRs are connected to the respective video monitors and to each other in a manner similar to that described above for the editing system 20. In addition, each of the VTRs is connected to an editor 202 of editing system 200 in a manner similar to that described above in respect to the editor 28 of editing system 20.

Figure 6:
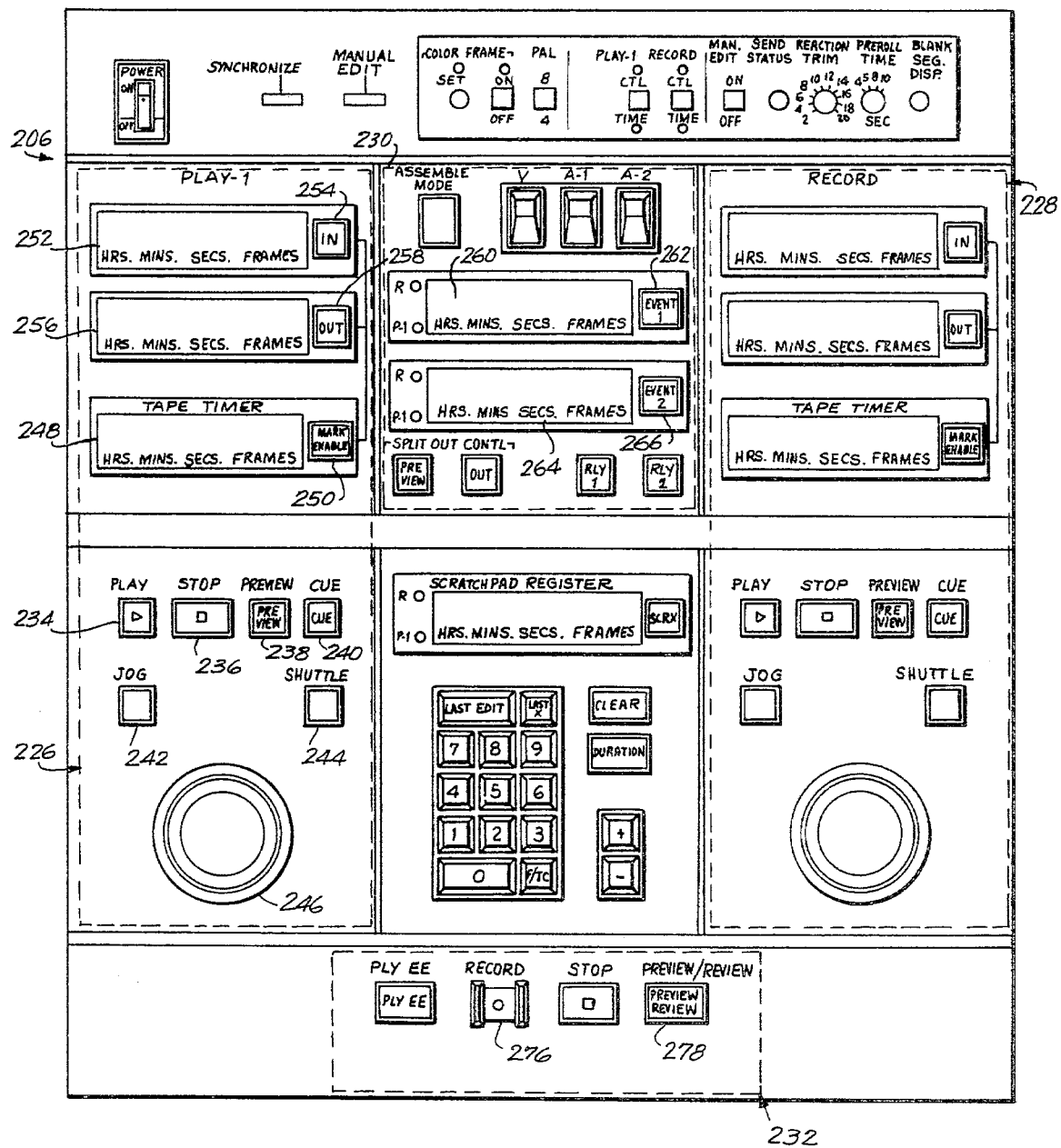
FIG. 6 is a front view of the console of the video tape editing system shown in FIG. 5.

The editor 202 of editing system 200 is shown to be generally comprised of a card bay 204 and a console 206 which is shown in greater detail in FIG. 6.

The card bay 204 contains a plurality of boards on which are disposed electronic circuitry for performing various functions. Two of these boards are VTR interface boards 208, one of which is connected to record VTR 22 and receives all signals coming from that VTR to the editor 202 and which transmits all commands from the editor 202 to VTR 22. The other of the two VTR interface boards 208 is connected to the play VTR 32 and similarly receives all information from that VTR and supplies all commands to it from editor 202. There are also two time code/CTL boards 210 associated with the VTRs 22 and 32, respectively. These boards 210 perform the functions of reading the time code addresses, and counting the control pulses recorded on the tapes in the respective VTRs.

The card bay 204 also includes a special function board 212 providing a console interface which receives parallel information from the time code/CTL boards 210 and from a central processing unit (CPU) board 214, and communicates such information to the console 206, and which receives information from the console 206 and communicates it to the CPU board 214. The special function board 212 also includes an input/output (I/O) decoder, which, as is known in the art of computer electronics, is a device capable of receiving a parallel input-output command from a CPU and of decoding that command so as to select and supply a specified signal level to a corresponding one of a plurality of input or output signal lines. In the card bay 204, these input or output signal lines are used to control specific devices on the VTR interface boards 208 and the time code/CTL boards 210. The special function board 212 also has a direct memory access (DMA) controller, which will be described in greater detail below, and an interrupt handler which, as is known in the art of computer electronics, is a device capable of interrupting a central processing until so that it stops performing whatever portion of a program it was executing and starts to execute a portion of a program determined by the signal supplied to the interrupt handler.

The central processing unit (CPU) board 214, of course, contains the central processing unit of the editor which is a programmed computing device, such as, an 8080 microprocessor, made by Intel Corporation of 3065 Bowers Ave., Santa Clara, Calif., and which controls the apparatus of the editor 202. The card bay 204 also contains a CPU memory board 216 which includes read-only memory containing the program to be executed by the CPU, and also read and write memory, known as random access memory (RAM), which the CPU can address for the purpose of storing and reading information.

In addition to the above-mentioned boards 208–216, the card bay 204 contains a system address bus 218, a system data bus 220, a system control bus 222, and a system I/O bus 224. The system address bus 218 provides means by which the CPU can address the memory on the CPU memory board 217 and by which address information can be supplied to the other boards in the card bay. Bus 218 also allows the time code/CTL boards 210 to address information into the CPU memory board 216 during the direct memory access (DMA) procedure described below. The system data bus 220 allows the CPU to read and write data in the other boards in the card bay 204, and it is also used to transmit data into the CPU memory board 216 during DMA. The system I/O bus 224 connects the output of the I/O decoder contained with special function board 212 to the time code/CTL boards 210 and to the VTR interface boards 208.

Referring now to FIG. 6, it will be seen that the console 206 for use with the video editing system 200 is divided into a play control section 226, a record control section 228, a split edit control section 230 and a master control section 232. The play control section 226 includes a play push button 234 a stop push button 236, a preview push button 238, a cue push button 240, a jog push button 242, a shuttle push button 244 and a control knob 246. With the exception of the cue push button 240; the push buttons 234–244 and control knob 246 function in the same manner as the correspondingly named push buttons of the keyboard 51 of editor 28 shown on FIG. 3. The play control section 226 also contains a tape timer register 248, a mark enable push button 250 placed at the right-hand end of the tape timer register 248, an in-point register 252 and an in-point push button 254 placed at the right-hand end of the in-point register 252, an out-point register 256 and an out-point push button 258 placed at the right-hand end of the out-point register 256.

The tape timer register 248 displays an eight-digit time code address which contains two hour-digits, two minute-digits, two second-digits and two frame-digits.

The time code address displayed by tape time register 248 is the time code address value stored on a tape position buffer in the time code/CTL board 210 associated with the play VTR 32. This time code address value will normally reflect the current time code address of the tape 34 in play VTR 32.

Actuation of the mark enable button 250, establishes the mark enable mode of the CPU on the CPU board 214. In this mode, if either the in-point push button 254 or the out-point push button 258 is actuated, the value currently in the tape time register 248 is transferred to the register 252 or 256 to the left of the push button 254 or 258 which has been actuated. Thus, with the CPU in its mark enable mode, push buttons 254 and 258 can be selectively actuated to mark the in- and out-points on tape 34 desired for a video edit. The record control section 228 contains controls, in the form of push buttons and registers, corresponding to those described above with reference to play control section 226, and the controls in record control section 228 operate in the same manner as the corresponding controls of the play control section 226, except for the fact that they all relate to record VTR 22, rather than play VTR 32.

The split edit control section 230 contains an event (1) register 260, an event (1) push button 262 to the right of the event (1) register 260, an event (2) register 264, and an event (2) push button 266 to the right of the event (2) register 264. The event (1) and event (2) registers 260 and 264 are both eight-digit display registers each capable of displaying a time code address. When either the play control section 226 or the record control section 228 is in the mark enable mode, the event (1) or event (2) push button 262 or 266 can be actuated, causing the current value of the tape timer register 248 in the control section which is in the mark enable mode to be transferred to the event register which has had its corresponding push button actuated. When this is done, one or the other of two lamps disposed to the left of the respective event register and labeled P1 and R will light for indicating whether the address in that event register is one which has come from the play tape time register or the record tape time register, respectively. The major use of the event registers 260 and 264 is in so-called split edits in which the in-points and/or out-points for the video signal, the audio channel 1 and the audio channel 2, shown in FIG. 1, respectively, may be different. A copending application identified by U.S. Ser. No. 139,448, Apr. 11, 1980, and having a common assignee with this application explains in much greater detail the manner of performing split-in and split-out edits by use of the control panel 206.

The master control section 232 includes a record push button 276 and a preview-review push button 278. The preview-review push button 278 is actuated to cause the apparatus to preview an edit which has been set up by the selection of an in-point on both the play and record in-point registers 252 and by the selection of an out-point on either the play out-point or the record out-point register 256. If push button 278 is actuated at the same time that the record button 276 is actuated, the editing system will actually perform the selected edit. The cue button 240, which is contained in each of the play control section 226 and the record control section 228, will cause cuing to an address in its respective in-point register 252 or out-point register 256, or to an address in the event (1) or event (2) register 260 or 264, if the actuation of the cue push button 240 follows the actuation of one of the push buttons 254, 258, 262 and 266.

Figure 9:
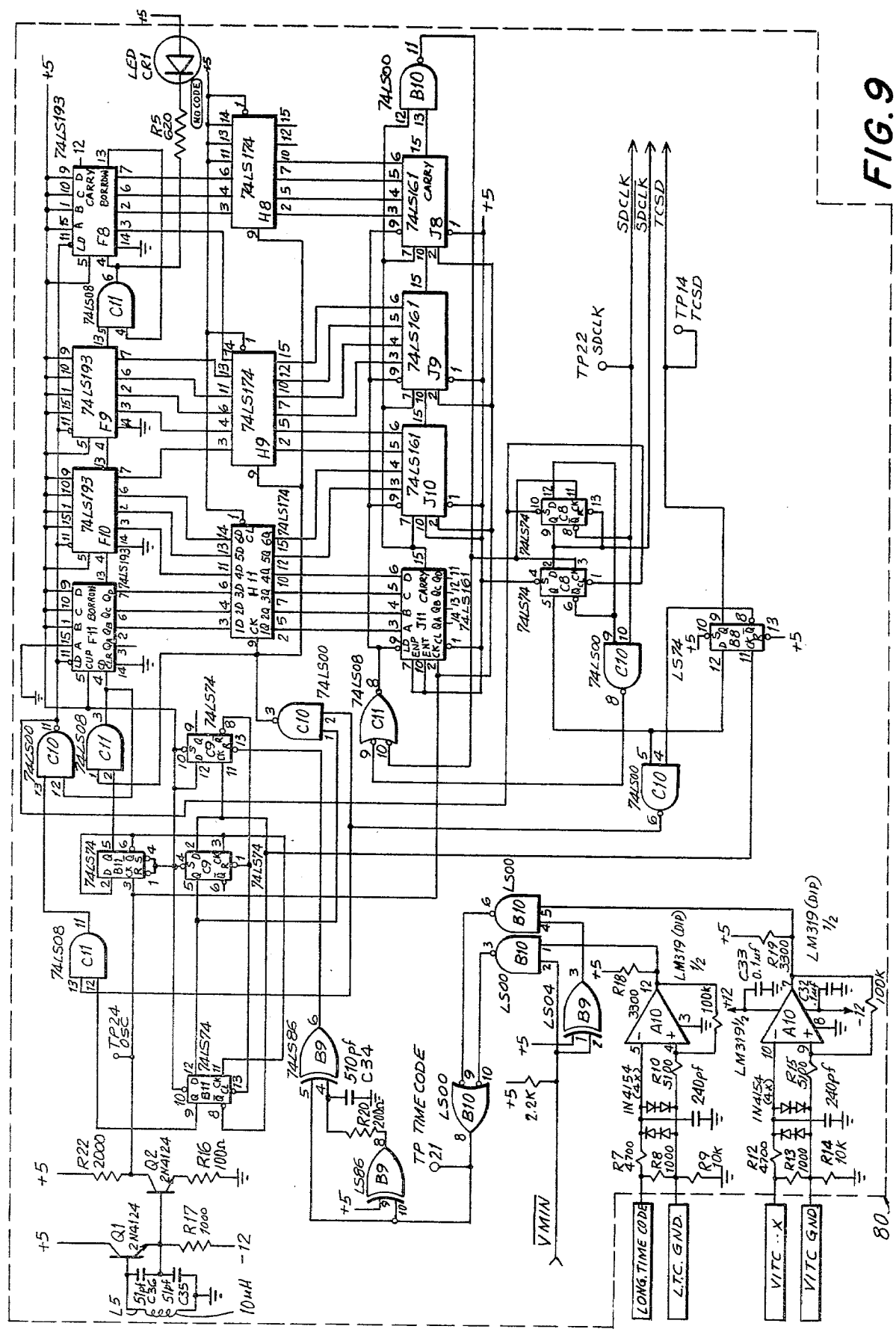
FIGS. 9–15 taken together comprise a substantially complete logic diagram of the time code/CTL board shown in FIGS. 5 and 7.

Whenever either the display control section 226 or the record control section 228 is set to its mark enable mode by actuating the respective mark enable push button 250, that push button 250 will light for indicating that the respective control section is in the mark enable mode and that the in-point and out-point push buttons 254 and 258 of that control section, as well as the event (1) and event (2) push buttons 262 and 266, constitute selectively operable means for generating a marking signal when a video or other information signal recorded at a desired point on the corresponding video tape is read and displayed on its corresponding video monitor. The apparatus for determining the address of the selected information signals, as constituted by the editor 200, further includes a time code reader 80 (FIG. 7) for reliably reading longitudinal time codes recorded on tapes 24 and 34 so long as those tapes are moved at a sufficient speed therefor. The circuitry of the time code reader 80 for each of the VTRs 22 and 32 is shown in greater detail in FIG. 9, and is located on the respective one of the time code/CTL boards 210.

Since the control panels 206 provides controls for operating both the record and play VTRs in the jog and shuttle modes, and since it is often desirable to mark in-points and out-points while operating in those modes, has has been discussed above, the video tape editing system 200 is provided with a device according to the present invention for determining time code addresses of video information signals which are marked or selected at times when the tape speed is not sufficient for the time code reader 80 to reliably read the longitudinal time codes recorded on that tape. Thus, the video editing system 200 according to this invention provides for accurately determining the longitudinal time codes of in-points and out-points marked in the mark enable mode of the play and record control sections 226 and 228 even though the addresses displayed on the tape timer registers 248 may themselves not be accurate at the time of marking. As in the first described embodiment of this invention, the device for determining the time code addresses of information signals selected or marked at low tape speeds generally includes a speed-up means for increasing the speed of the video tape being marked after the generation of a marking signal on the console 206, so that the tape eventually attains a speed sufficient for the time code reader 80 to reliably read a subsequently encountered longitudinal time code. In the editing system 200, this speed-up means is constituted by portions of the CPU board 214, the CPU memory board 216, the VTR interface board 208, and the connection 44 to the VTR in which the tape is being marked. More particularly, after the CPU of editor 202 receives a command from console 206 indicating that a desired point on a tape has been marked at a tape speed insufficient for reliable reading of the time codes on that tape, the CPU responds, according to instructions contained in the program memory located in the CPU memory board 216, by issuing a command to the appropriate VTR interface board 208 which causes speed up of the VTR having the tape which has been marked, so that a subsequently encountered longitudinal time code can be reliably read.

The device in editing system 200 for determining the time code address of information signals selected or marked at low tape speeds further includes counting means for counting the control pulses received by a CTL delay and synchronizing circuit 280 between the time when the marking signal is generated and the time when the time code reader 80 can reliably read a subsequently encountered longitudinal time code, so as to thereby provide a count of control pulses read or reproduced between those two times. The counting means of the video editing system 200 is shown to comprise a tape position counter 282 (FIG. 7) which produces a time code address as an output, with the value of such output being either incremented or decremented by one, depending upon the direction of movement of the associated tape, in response to a predetermined number of control pulses associated with each video frame. As a result, the output of tape position counter 282 constitutes a count of the number of frames through which its associated tape has been moved. The counting means of the video editing system 200 also includes portions of the CPU board 214 and the CPU memory board 216. By means which will be described below, the CPU memory board is continually supplied with a current output of the tape position counter 282. When a marking signal is generated at console 206, the CPU causes the value, which has been transferred to the CPU memory from the tape position counter 282 associated with the tape being marked, to be stored in a special memory location, or mark time register, associated with either the play in-point, play out-point, record in-point, record out-point, event (1) or event (2) split-in points or the event (1) or event (2) split-out points, according to which of the push buttons on the console 206 has been actuated to generate the markings signal. When a subsequently encountered longitudinal time code is read after the initiation of the speed-up process by the CPU, the CPU will refer to the then current value of the tape position counter 282 which had been automatically stored in the CPU memory. This value, in conjunction with the value stored in each of the mark time registers in response to the generation of a marking signal at low tape speed, defines the number of frames that the tape has moved between the generation of each of the marking signals associated with each of the mark time registers and the reading of the subsequently encountered time code by the time code reader 80.

The device in system 200 for determining the time code address of information signals selected at low tape speeds further includes means for providing a derived address of each of such information signals selected or marked at low tape speed, in terms of its respective longitudinal time code. Each such derived address is determined as a function of the value stored in its associated mark time register, and as a function of the current value of the tape position counter 282 and of a subsequently encountered time code read by the time code reader 80 after the VTR attains a sufficient speed for the reliable reading of time codes.

The means for providing a derived address are shown on FIG. 7 to include a time code address extracting circuit 284 which receives the time code serial data output 84 and the serial data clock output 82 of the time code reader 80 and converts those outputs into an 8-digit, 32-bit time code address. The means for providing a derived address is also shown to include a time code ready indicating circuit 286 (FIG. 7) which detects the probability of accuracy with which the time code reader 80 is reading time codes and generates a time code ready signal upon the reading of a longitudinal time code having at least a predetermined degree of probability of accuracy. The means for providing a derived address still further includes means for causing one of the first time code address read by the time code reader 80 and extracted by the time code address extracting circuit 284 after the speeding-up of the associated VTR to be selected as the subsequently encountered longitudinal time code which is used in the calculation of derived addresses and, thus to be placed in a specified location in the CPU memory 216. The CPU memory 216 is programmed to cause the CPU to take this subsequently encountered longitudinal time code address value and to subtract it from the value stored in the tape position counter 282 at the time such time code address is read, and to subtract the resulting difference from the values of each of the mark time registers stored in the CPU memory 216. Thus, each of the selected points marked on a video tape by the operation of push buttons on console 206 at a time when the tape is moving too slow for the reliable reading of time codes can be accurately determined by the video editing system 200.

Figure 14:
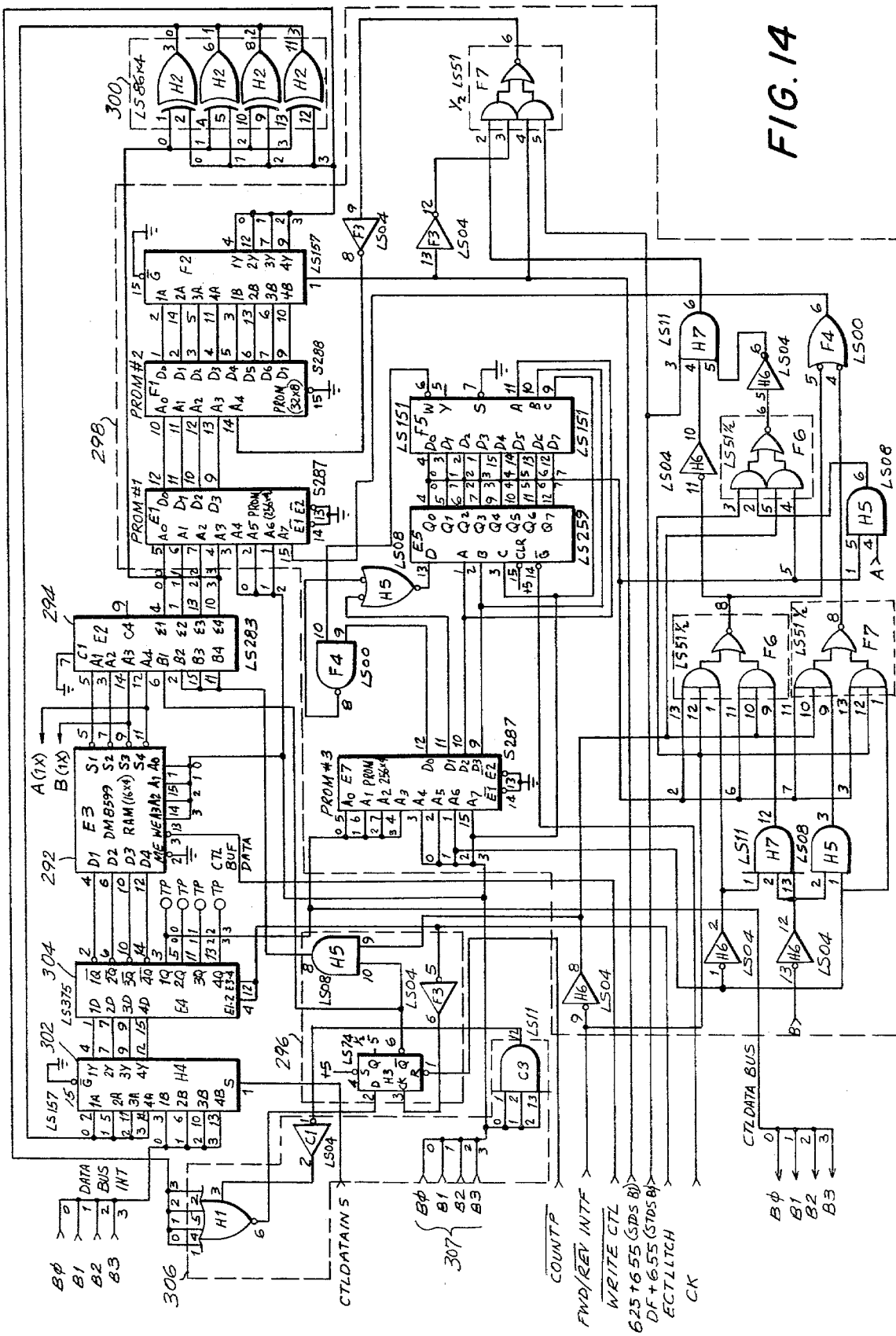

Referring again to FIG. 7, it will be seen that the tape position counter 282 is there shown to include a tape position buffer 292, which is shown in greater detail on FIG. 14 and which is capable of storing sixteen 4-bit binary-coded-decimal digits. The 4-bit output of the tape position buffer 292 is connected to one input of an adding circuit 294. The other input of this adding circuit 294 is the output of the up-down input circuit 296 which, as is shown in FIG. 14, comprises a flip-flop H3, an AND gate H5 and an inverter F3. The 4-bit output of the adder 294 is supplied as one input to a programmable read-only memory (PROM) decoder 298 which, as can be seen from FIG. 14, comprises three programmable read-only memory (PROM) circuits, E1, E7, and F1, a multiplexer F2, a decoder E5, an encoder F5, and a plurality of inverters and logic gates.

The 4-bit output of the prom decoder 298 is supplied as one input to an EXCLUSIVE OR circuit 300 which is shown in FIG. 14 as comprising four EXCLUSIVE OR gates H2. The other input to this EXCLUSIVE OR circuit 300 is the 4-bit output of the adder circuit 294. The output of EXCLUSIVE OR circuit 300 is supplied as one input to a multiplexer 302 which is shown as the multiplexer circuit H4 in FIG. 14. Under normal conditions, the multiplexer 302 provides the output of the EXCLUSIVE OR circuit 300 to the 4-bit input of a latch 304, which is shown as the latch circuit E4 in FIG. 14. The 4-bit output of latch 304 is provided as an input to the tape position buffer 292. In addition, the tape position counter 282 includes a carry/borrow circuit 306 which, as is shown in FIG. 14, comprises a NOR gate H1 and an inverter C1 and which receives the 4-bit output from the PROM decoder 298 and provides an output to the up-down input circuit 296. The 4-bit addressing input of the tape position buffer 292 is connected to an internal address bus 307 of the time code/CTL board 210. This internal address bus 307 is normally separate from the system address bus 218 of the card bay 204.

Figure 12:
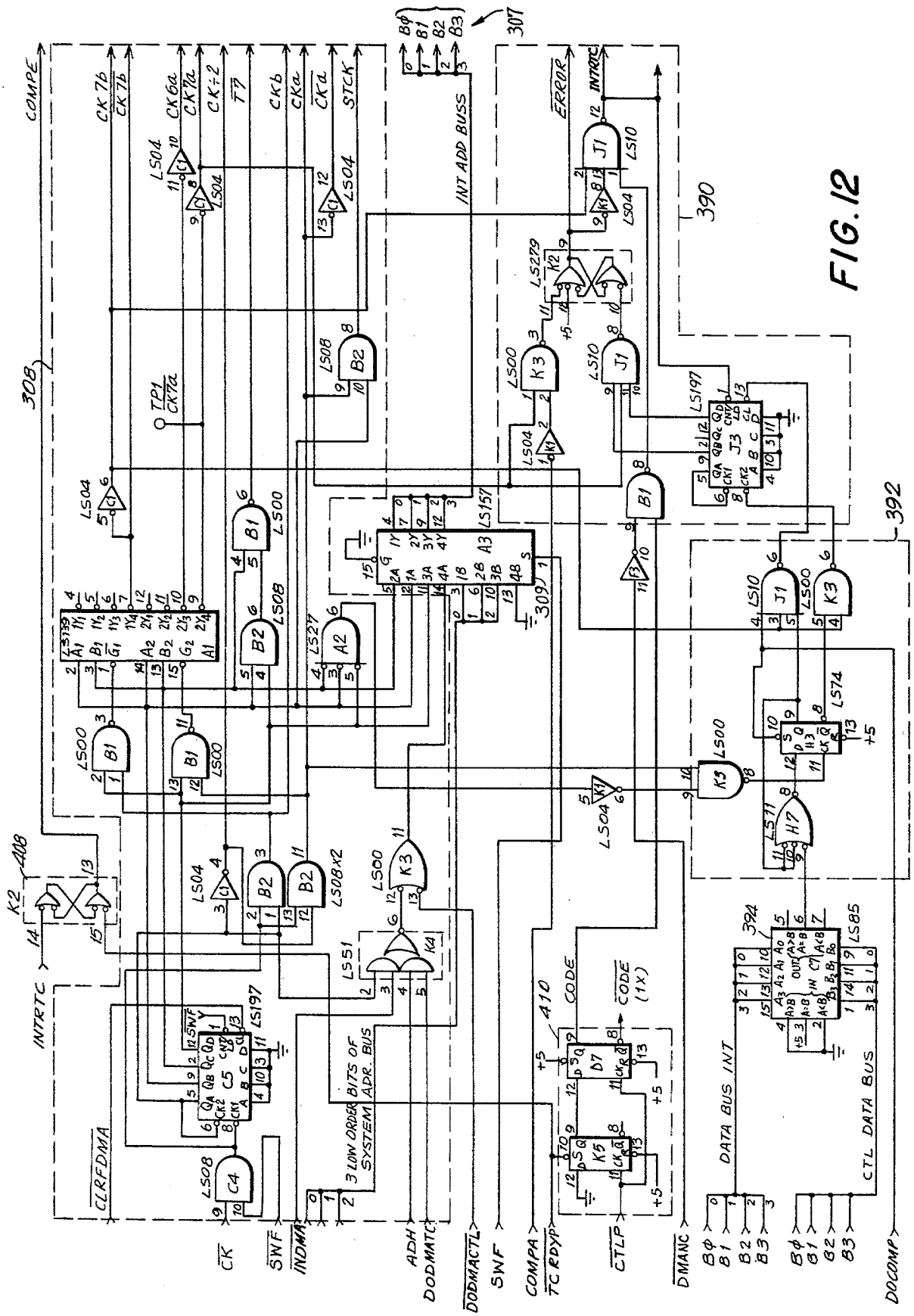

The circuitry of FIG. 7 also includes a system clock counter and address generator 308 which, as is shown in FIG. 12, comprises a 4-bit counter C5 for counting system clock pulses $\overline{CK}$ from the CPU board 214, a decoder A1 for generating signals at certain ones of the 16 possible count values of the counter C5, a NAND gate K3, and two NORRED AND gates K4 which determine the value of the high order bit of a 4-bit address generated by the counter and address generator 308, and a plurality of other logic gates. The system clock signal has a high frequency, approximately 2 Mhz, and it is counted by the counter and address generator 308 which, in response to the clock signal, generates a 16-phase clock signal which has its successive phases generated at the frequency of the system clock. The 16-phase clock signal repeatedly varies according to the following sequence: OA, OB, 1A, 1B, 2A, 2B, –7A, 7B. It takes sixteen cycles of the system clock for this sequency of sixteen clock values to repeat itself. The counter and address generator 308 also generates a 4-bit counted address signal. As is well known in the art of digital electronics, a 4-bit binary signal can assume any one of sixteen possible values from 0 to 15. The counted address generated by the counter and address generator 308 has a different value for each of the sixteen clock phases of the 16-phase clock signal. The high order bit of this counted address varies at twice the frequency of the low order bit, so that the sequence of counted address values varies in the following sequence: 0, 8, 1, 9, 2, 10, . . . 7, 15.

Under normal circumstances, the counted address is passed from the address output of the counter and address generator 308 through a multiplexer 309 (FIG. 12) to the internal address bus 307 by which it is supplied to the addressing input of the tape position buffer 292 (FIG. 7). As shown in FIG. 8, the sixteen addresses for storing 4-bit digits contained within the tape position buffer 292 can be divided into two halves, each of which is capable of storing an 8-digit time code. The lower half ranges from the address 9 to the address 7, and the upper half ranges from the address 8 to the address 15. In response to the counted addresses generated by the counter and address generator 308 at the clock phase QA, the units frame digit at the address 0 in the lower half of the tape position buffer 292 will be read, followed by the reading at the clock phase OB, of the units frame digit at the address 8 in the upper half of the buffer 292. At the next clock phase 1A, the tens frame digit at the address 1 in the lower half of the tape position buffer 292 is addressed, followed, at the next clock phase 1B, by the addressing of the tens frame digit at the address 9 in the upper half of the tape position buffer 292. This process of alternately reading digits from the lower and upper halves of the tape position buffer 292 is continued until all of the 8 digits in each of the lower and upper halves of the tape position buffer 292 have been read, and, during normal operation of the time code/CTL board 210, it is continually repeated under the influence of the counted address signal.

Each digit which is addressed and read from the tape position buffer 292 is supplied as one input to the adding circuit 294. When a control pulse is read from the VTR 22 or 32 associated with a given time code/CTL board 210, a pulse is supplied to the CTL delay and synchronizing circuit 280 on that board (FIG. 7). This delay and synchronizing circuit 280 is also supplied with a signal from the counter and address generator 308 at the clock pulse 7B at the end of the 16-phase clock count. At the end of the 16-phase clock count following the reading of a control pulse, the CTL delay and synchronizing circuit 280 generates a $\overline{\text{COUNT P}}$ pulse which is supplied as one input to the up-down input circuit 296. Another input to this up-down input circuit 296 is a forward/reverse signal which comes through the respective VTR interface board 208 from the VTR 22 or 32 in which the control pulse has been read, and which indicates whether the tape in that VTR is moving in a forward or reverse direction. If the VTR 22 or 32 is moving in a forward direction, the up-down input circuit 296 of the respective board 210 will supply a binary input of 0001 to the adder 294. This is the binary equivalent of the decimal number 1, and it causes the next digit read from the tape position buffer 292 and supplied to the adding circuit 294 to have its value increased by one. This digit will be the units frame digit from the lower half of the buffer 292, since that is the digit read during the clock phase QA which follows the clock phase 7B during which the $\overline{\text{COUNT P}}$ pulse is generated. Thus, when VTR 22 or 32 is moving in a forward direction, the tape position counter 282 of the respective board 210 will cause a value of one to be added by adder 294 to the units frame digit of the lower half of its tape position buffer 292. If the VTR is moving in the reverse direction, the up-down input circuit 296 will cause a binary value 1111, instead of 0001, to be supplied to the adder 294. As is known by those skilled in the art of digital electronics, adding a value of 1111 to a 4-bit binary number is equivalent to subtracting the number 1 from that 4-bit binary number, providing that the 5th bit resulting from such an addition is disregarded. Thus, when VTR 22 or 32 reads a control pulse while traveling in the reverse direction, its associated tape position counter 282 will decrement the value contained in the units frame digit of the lower half of the tape position buffer 292 by 1.

The output of the adder 294 is supplied as one of the inputs to the EXCLUSIVE OR circuit 300 and also as one of the inputs to the PROM decoder 298. The PROM decoder 298 also receives inputs from the internal address bus 307 and the output of latch 304. As can be seen in FIG. 14, the PROM decoder 298 contains a plurality of logic gates and programmable read only memory (PROM) circuits which, in combination, as shown, provide a predetermined 4-bit output to the EXCLUSIVE OR circuit 300 in response to each of the possible sets of inputs which can be supplied to PROM decoder 298. The input from the internal address bus 307 tells the PROM decoder 298 which of the eight digits of the time code is being supplied to it from the adder circuit 294. Other inputs to PROM decoder 298 (which are not shown in FIG. 7) inform the PROM decoder which of various possible formats is characteristic of the time code currently being read. The video editing system 200 can be operated with at least four different time code formats: to wit, the NTSC 525 lines per frame, black and white time code format; the NTSC 525 lines per frame, color or drop frame time code format; the 625 lines per frame, 50 fields per second European time code format; and 655 lines per frame, 48 fields per second time code format which is used in video tapes to be converted to motion picture films. In each of these different time code formats the sequence of time codes is different.

In the black and white NTSC format, the time codes vary sequentially from a lowest possible frame number of 00 hours, 00 minutes, 00 seconds and 00 frames, to a highest possible frame number of 23 hours, 59 minutes, 59 seconds and 29 frames. In this time code format, any one of the digits will be set to zero and the next highest digit, if one exists, will be increases by 1 any time an attempt is made to increase the value of the units frame digit beyond the value of 9, the tens frame digit beyond the value of 2, the units second digit beyond the value of 9, the tens second digit beyond the value of 5, the units minute digit beyond a value of 9, the tens minute digit beyond a value of 5, the units hour digit beyond a value of 3, and the tens hour digit beyond a value of 2.

The NTSC color or drop frame time code format is identical to that of the NTSC black and while time code format except for the fact that two frame numbers are skipped at the beginning of very minute other than the tenth minute. Accordingly, a frame number having a second value of 50 and a frame value of 29 is immediately followed by a frame number having a minute value which is one greater and a second value equal to zero and a frame value equal to 2, unless incrementing the minute value would cause that minute value to be an integral multiple of ten, in which case the second and frame values of the subsequent frame number both take a value of 00.

The European and film time code formats are similar to the NTSC black and white formats except for the fact that the European format causes a carry to take place between the frames digit and the seconds digit any time an attempt is made to increase the frame value beyond the value 24, and the film format causes such a carry to take place any time an attempt is made to increase the frames value beyond a value of 23 frames.

The PROM decoder 298 is basically a read only memory device which, when supplied with a predetermined group of address bits, produces a predetermined group of data bits. More particularly, the bits on the internal address bus 307, the bits which indicate the time code format being read, a bit which indicates whether the tape is being read in a forward or a reverse direction and the bits produced at the output of adder 294, all combine to provide an address word which causes the PROM decoder 298 to produce a corresponding predetermined 4-bit output to the EXCLUSIVE OR circuit 300. This 4-bit output of the PROM decoder 298 is always zero unless the value produced by the adder 294 constitutes an improper value in the particular time code format being read, and thus indicates the need for a carry or a borrow, dependin upon the direction of tape motion in the corresponding VTR. For example, if the units frame digit read from the lower half of the tape position buffer 292 during the clock phase OA immediately following generation of a $\overline{\text{COUNT P}}$ pulse during forward motion of the respective VTR has a decimal value of 9, the resulting output of the adding circuit 294 has a decimal value of 10. This is an illegal or improper value for any digit of any time code, and it requires a carry operation. In response to this input the PROM decoder 298 will generate a 4-bit output which, when supplied to the EXCLUSIVE OR circuit 300, will change the binary-coded-decimal value of 10 supplied to circuit 300 to the binary-coded-decimal value of zero. The EXCLUSIVE OR circuit 300 reverses the value, from 0 to 1 or from 1 to 0, of each of the 4 bits, 0–3, supplied to it from the adder 294 when the corresponding bit, 0–3, supplied to it from the prom decoder 298 has a 1 value. For example, to change the binary-coded-decimal value of 10, which is 1010, to the binary-coded-decimal value of zero, which is 0000, the PROM decoder 298 should supply a similar binary value of 1010 to the EXCLUSIVE OR circuit 300.

Whenever, the PROM decoder 298 supplies an output which is other than zero, the carry/borrow circuit 306, which, as can be seen from FIG. 14, includes a NOR gate H1, generates an input to the up-down input circuit 296 which causes that circuit to add a 1 to the next digit which is supplied to adder 294 when the associated VTR is moving in a forward direction and to subtract 1 from that next digit when the associated VTR is moving in the reverse direction, so as to cause, respectively, a carry or a borrow to take place.

The output of the EXCLUSIVE OR gate 300 is supplied through multiplexer 302 to the input of the latch circuit 304. The counter and address generator 308 supplies a latch pulse to the latch circuit 304, which causes it to latch, or store, the 4-bit value supplied to it from the multiplexer 302 during each of the A clock phases, that is, during each of the clock phases 0A, 1A, 2A, –7A. The latching pulse supplied from the counter and address generator 308 is also connected to the up-down input circuit 296, and it causes that circuit to have its output set to zero, unless the carry-borrow circuit 306 has indicated that a carry or a borrow is to take place to the next digit of the time code address, in which case, the output of the up-down input circuit 296 to the adder 294 will not be changed by the latching pulse. As is shown in FIG. 14, the carry/borrow circuit 306 includes an AND gate C-3, which is connected to the three low order bits of the internal address bus 307. When these three low order bits are high during the clock phases 7A and 7B, the AND gate C-3 supplies a signal to the carry/borrow circuit 306 which prevents the up-down input circuit 296 from causing a carry or a borrow to the next time code digit supplied to it. This prevents a carry or a borrow from the tens hour digit of one time code to the units frame digit of the next time code.

It should be noted that, in normal operation, that is, unless a $\overline{\text{CTLP}}$ pulse has just been counted, successive digits from both the upper and lower halves of the tape position buffer 292 are continuously being supplied to the input of adder 294. However, under these conditions, the input from the up-down input circuit 296 is zero and thus each digit read from the tape position buffer 292 is supplied unchanged to the input of the latch circuit 304.

The process of reading a digit from tape position buffer 292, passing it through the adder 294 and the EXCLUSIVE OR circuit 300, in which circuits it is either incremented, or decremented or passed through unchanged, and then passing it through the multiplexer 302 to the input of latch 304, is performed for all the digits of both the upper and lower halves of the tape position buffer 292 under the influence of the counted address signal generated by the counter and address generator 308. However, the latch signal supplied to the latch circuit 304 by the NORRED AND circuit 310 (FIGS. 7 and 11) is only generated during the A phase clock signals at the time when digits from the lower half of the tape position buffer 292 are cycled through the adding circuit 294, the EXCLUSIVE OR circuit 300 and the multiplexer 302 to the input of the latch circuit 304. Thus, only digits read from the lower half of the tape position buffer 292 are supplied to the input of the tape position buffer 292 through the latch 304, so as to allow those values to be recorded into the tape position buffer. The write enable input to the tape position buffer 292 is supplied from a $\overline{\text{WRITE CTL}}$ line which is the output of a NAND gate 311. When the signal on the $\overline{\text{WRITE CTL}}$ line goes low, the 4-bit output of the latch 304 is recorded in the tape position buffer 292 at the address currently on the internal address bus 307. Normally, one input of the NAND gate 311 is connected through a multiplexer 312 (FIGS. 7 and 11) to the output of a NORRED AND circuit 313, and the $\overline{\text{WRITE CTL}}$ line goes low whenever the NORRED AND circuit 313 generates a positive output. Normally, this output from circuit 313 goes positive briefly during both the A and B clock phases, causing each of the 4-bit digits originating from the lower half of the tape position buffer 292 to be recorded, with whatever changes if any have been made to it in adder 294 and EXCLUSIVE OR gate 300, back in buffer 292 at the address from which it came in the lower half of buffer 292 as well as in the corresponding address in the upper half of buffer 292. As a result, the values stored in the lower and upper halves of tape position buffer 292 are normally identical. As is described below, if a discontinuity is detected in the time code read by the time code reader 80, the $\overline{\text{WRITE CTL}}$ signal is not generated during the B clock phases in which the upper half of the tape position buffer 292 is being addresses. Therefore, when such a discontinuity is detected, the time code address in the upper half of the tape position buffer 292 will not be incremented by the counting of control pulses and thus will maintain the tape address at which such a discontinuity is detected.

It should be noted that the $\overline{\text{CTLP}}$ pulse which is counted by the tape position counter 282, is supplied to the time code/CTL board 210 from its associated VTR interface board 208, and that such VTR interface board 208 only supplies one $\overline{\text{CTLP}}$ pulse to the time code/CTL board 210 in response to the reading by the control pulse hadd 25 or 35 of its associated VTR of the number of control pulses which are associated with each frame of the recorded video signal. As earlier noted, in most VTRs, one or two control pulses are recorded per frame. Thus, it can be seen that the tape position counter 282 provides a means for incrementing, or decrementing a time code address stored in the tape position buffer 292 in response to the distance or number of frames by which the tape in its corresponding VTR has moved.

As shown in FIG. 7, the time code ready indicating circuit 286 may comprise a time code sync word detecting circuit 314 which receives the time code serial data and the serial data clock from the time code reader 80. As can be seen from FIG. 10, this sync word detect circuit 314 includes a latch E8 which is used for the purpose of providing delays to signals supplied to it, an OR gate E9, two inverters E10, an AND gate D11, and a counter D10. The counter D10 counts the pulses of the serial data clock signal supplied from the time code reader 80, and it is reset through the OR gate E9 any time that a zero bit is read by the time code reader. If the counter D10 counts 12 consecutive bits of a time code which are all one, this indicates that the sync word shown in FIG. 2A has been received and, after an appropriate delay, there is emitted a signal indicating that the sync word has been so received. The sync word detecting circuit 314 also includes a flip-flop B8 which can be used, in conjunction with the counter D10 and the latch E8, to determine whether the 12 consecutive one-bits of the sync word of the SMPTE time code shown in FIG. 2A are followed by a zero bit and then a one-bit, or whether they are followed by two zero bits. As is shown in FIG. 2A, when the tape is traveling in a forward direction, the 12 consecutive bits of the sync word are followed by a zero bit and then by a one bit, whereas, when the tape is moving in a reverse direction, these 12 consecutive one-bits are followed by two zero bits. Thus, the operation of the flip-flop B8 enables the time code sync word detecting circuit 314 to emit a signal which indicates the direction of tape movement.

Figure 10:
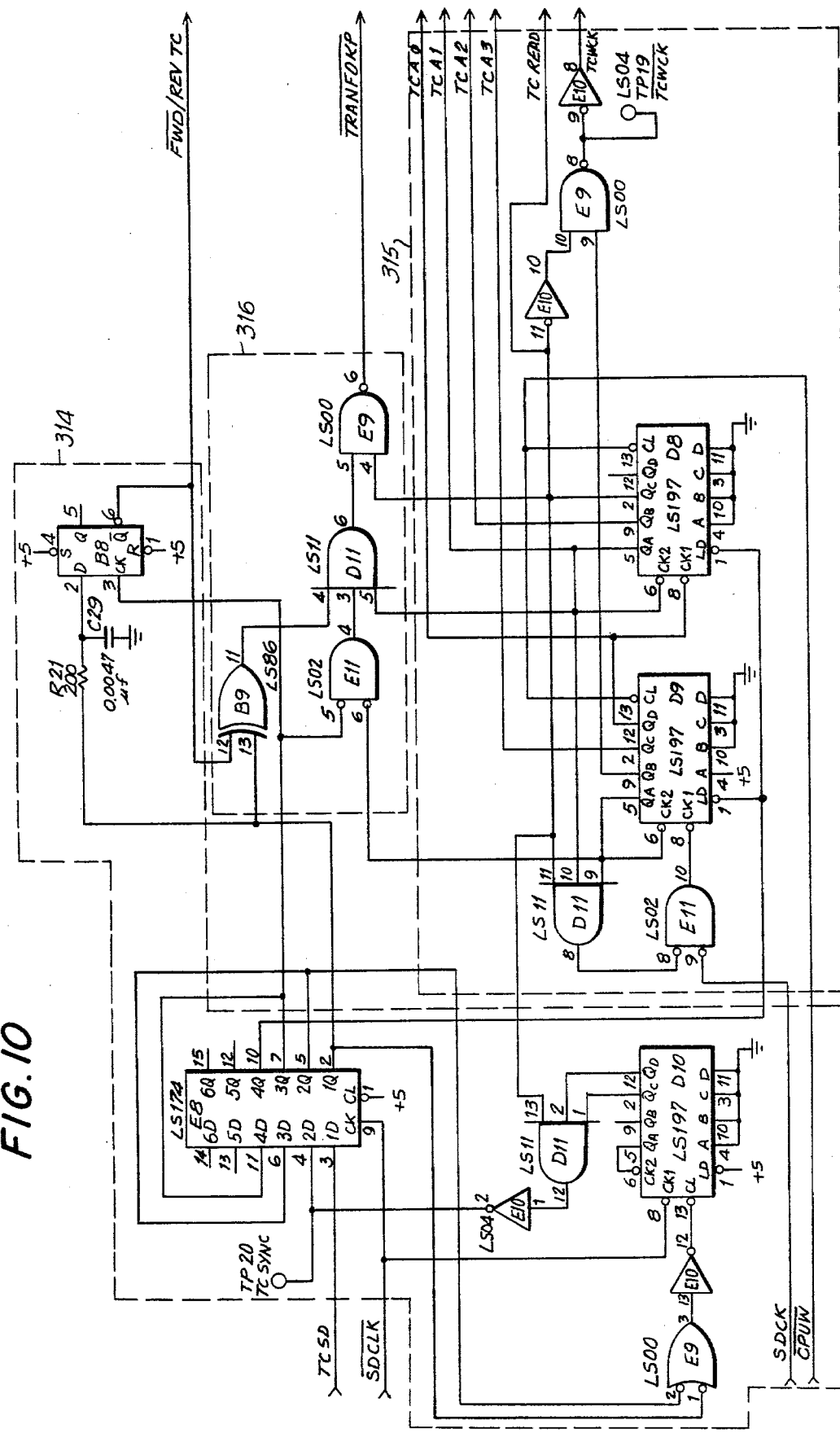

The time code ready indicating circuit 286 also includes a time code clock counter 315, which as can be seen from FIG. 10, includes a two AND gates E11 and D11, two inverters E10, and NAND gate E9 and two counters D8 and D9. These counters D8 and D9 count the pulses of the serial data clock signal produced by the time code reader 80, and they emit a signal every time that 80 such clock pulses have been counted. Such output from counters D8 and D9 is supplied as one input to a transfer OK gating circuit 316 which, as can be seen from FIG. 10, includes an EXCLUSIVE OR gate B9, two AND gates E11 and D11, and a NAND gate E9. The transfer OK gating circuit 316 receives the output from the time code sync word detecting circuit 314 indicating that a sync word has been read and, if this sync word is read at the same time that the time code clock counter 315 emits a pulse indicating that it has counted 80 time code clock pulses since the last such detection of a sync word, then the transfer OK gating circuit 316 emits a $\overline{\text{TRANFOKP}}$ pulse. This $\overline{\text{TRANFOKP}}$ pulse is supplied as a setting input to a time code ready flip-flop circuit 318, which is reset by the subsequent $\overline{\text{CTLP}}$ received from the associated VTR interface board 208. The time code ready flip-flop circuit 318 is shown on FIG. 11 to be comprised of two NOR gate K9 and a flip-flop K2. The output of the time code ready flip-flop circuit 318 is the time code ready signal TCRDY, the use of which will be explained below.

The time code clock counter 315, in addition to supplying an input to the transfer OK gating circuit 316, also generates a 4-bit time code address, the value of which varies as a function of which of the 16 digits contained within the SMPTE time code is currently having, or has just had, its bits read by the time code reader 80. The time code clock counter 315 also generates a time code write signal TCWCK which is generated after each of the 16 separate digits of the time code has been read, and a TC READ signal which is generated after all 16 digits of a time code have been read.

Figure 13:
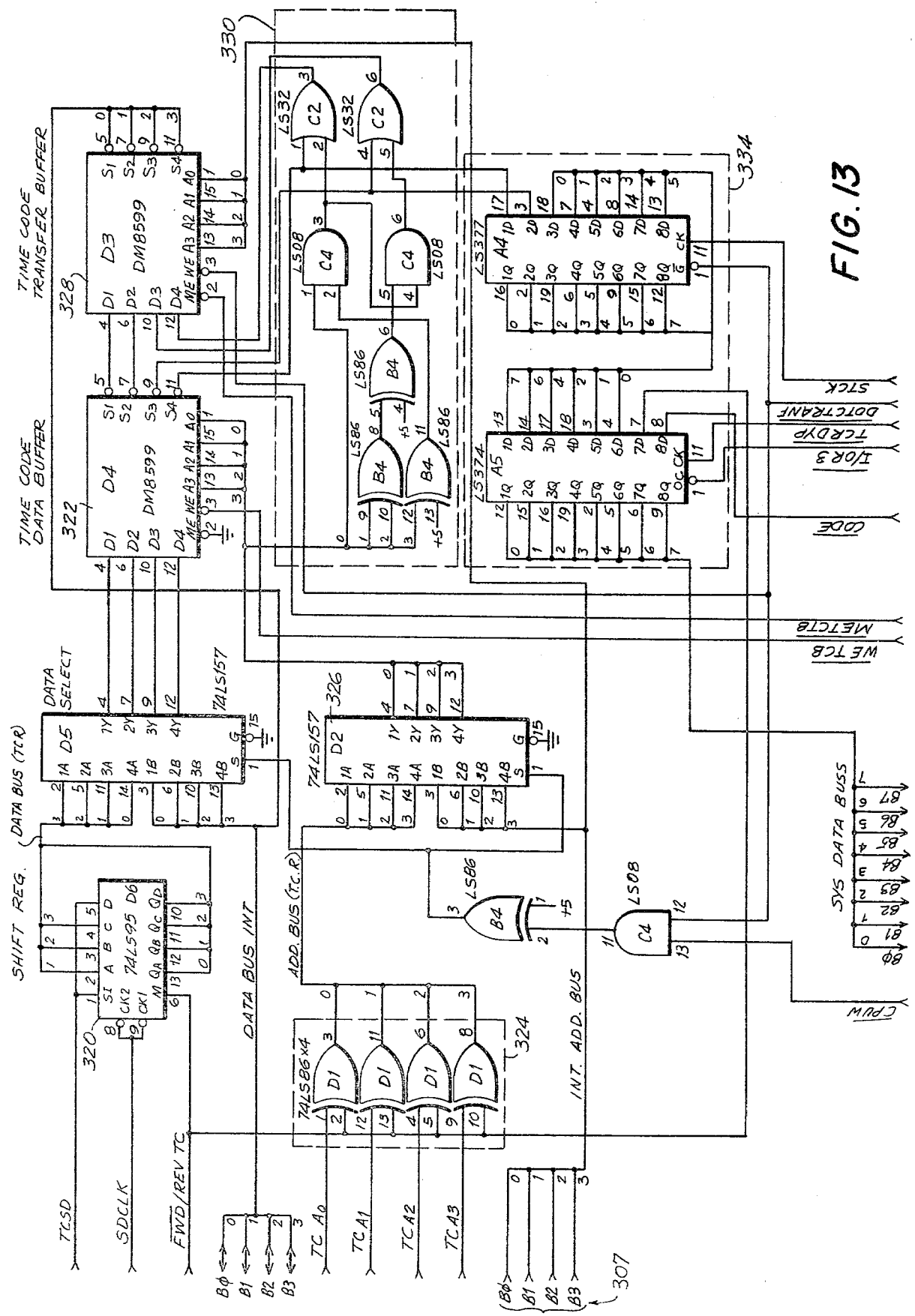

The time code address extracting circuit 284 includes a time code serial data shift register 320, shown in both FIGS. 7 and 13, which receives both the time code serial data signal and the serial data clock signal supplied by the time code reader 80. In response to the serial data clock signal, each of the bits of the time code serial data signal is shifted into the shift register 320. Shift register 320 is a 4-bit bi-directional shift register, which also receives as an input the forward/reverse signal produced as an output by the time code sync word detecting circuit 314. Thus, when the tape from which a time code is being read is moved in a forward direction, the bits of the time code serial data signal are shifted in a forward manner into the shift register 320, whereas, if the tape is moving in a reverse direction, such bits are shifted in a reverse direction into the shift register 320, so that they will have the proper order within that shift register, regardless of tape direction.

The 4-bit output of the shift register 320 is supplied, as the input, to a time code data buffer 322, shown in both FIGS. 7 and 13. This data buffer 322, like the tape position buffer 292, is a 16-by-4-bit addressable memory circuit. The time code addresses generated by the time code clock counter 315 are supplied through an EXCLUSIVE OR circuit 324 and a multiplexer 326 to the addressing input of the time code data buffer 322. Thus, as each of the 16 digits of the SMPTE time code is read by the time code reader 80, its 4-bits will be shifted into the time code serial data shift register 320, and once each of its 4-bits has been placed in this shift register, the time code clock counter 315 will generate a TCWCK signal which will cause the time code data buffer 322 to write the value then in the shift register 320 into one of its 16 memory locations. At this same time, the address generated by the clock counter 315 will be supplied through the EXCLUSIVE OR circuit 324 and the multiplexer 326 to the addressing input of the time code data buffer 322 so as to assure that each individual 4-bit digit recorded from the shift register 320 into the data buffer 322 is stored in the appropriate address for such digit. The addressing scheme within the time code data buffer 322 is such that the 8 address digits of the SMPTE time code are stored in the bottom half of its memory space, that is, in addresses 0–7 and the 8 user digits of the time code are stored in the upper half of the data buffer 322, that is, at the addresses 8–15. The EXCLUSIVE OR gate 324 receives the forward/reverse signal generated by the time code sync word detector 314. When this signal indicates that the tape from which time codes are being read is moving in a reverse direction, it causes each of the 4 digits of the time code address supplied to the EXCLUSIVE OR circuit 324 to have its value complemented, that is, to change zeros to ones and ones to zeros. As a result, the sequence of addresses which exit from the EXCLUSIVE OR gate and which are supplied to the addressing input of the data buffer 322 when a tape is moving in a reverse direction are exactly opposite the sequence of time code addresses which are supplied to the data buffer 322 when the tape is moving in a forward direction so that, regardless of tape direction, each digit of the time code is stored in the same memory address within the buffer 322.

The 4-bit output of the time code data buffer 322 has its two low order bits supplied directly to the two low order bits of a time code transfer buffer 328. The time code transfer buffer 328, like the time code data buffer 322 and the tape position buffer 292, is a 16 by 4-bit addressable memory circuit. The other two output bits of the time code data buffer 322 are supplied as inputs to a user bit detect and separate circuit 330 which, as can be seen from FIG. 13, is comprised of three EXCLUSIVE OR gates B4 two AND gates C4 and two OR gates C2. This detect and separate circuit 330 has a 2-bit output which is supplied to the upper 2 bits of the 4-bit data input of the transfer buffer 328.

Figure 11:
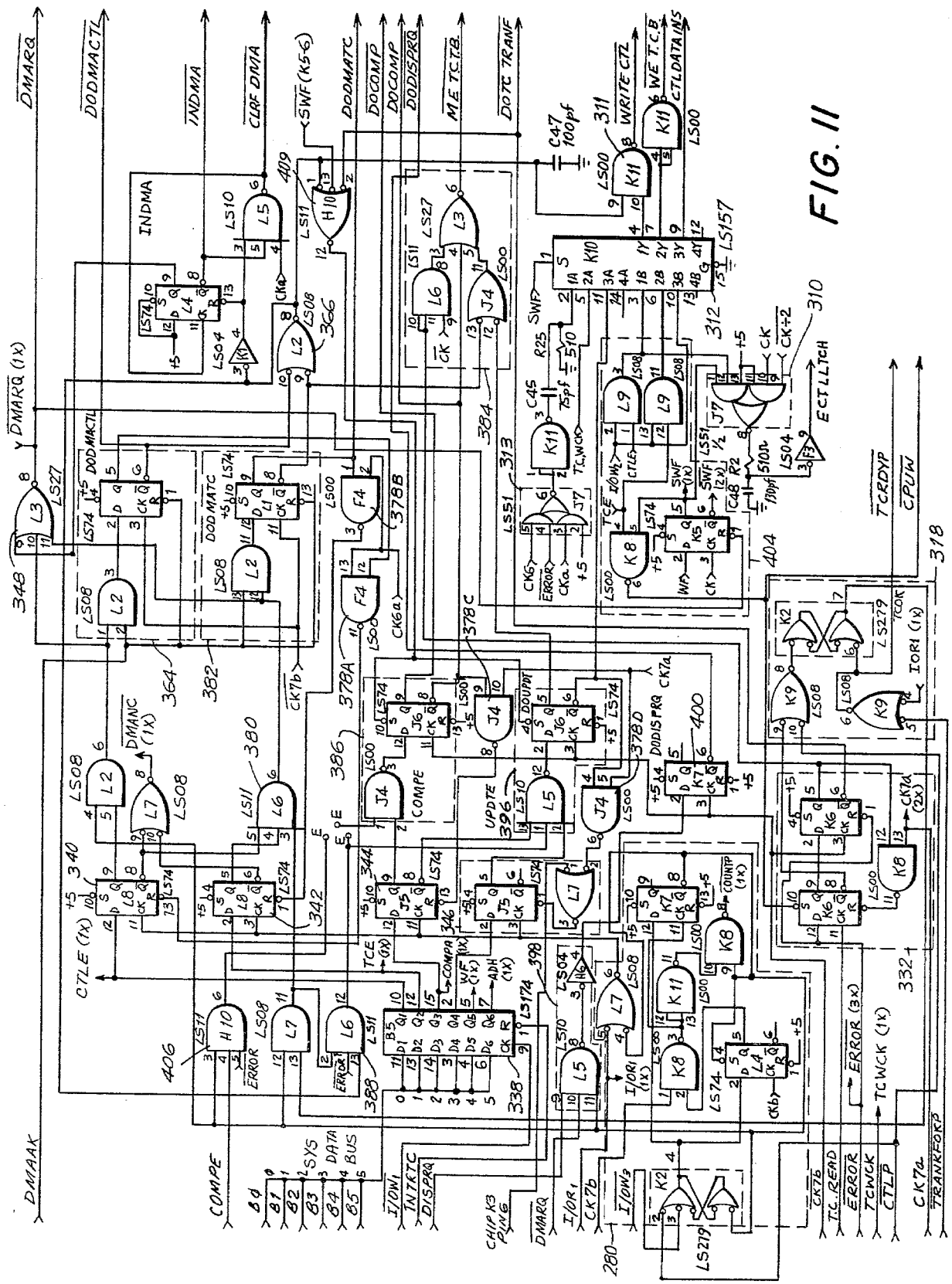

A write enable input of the transfer buffer 328 is connected to the output of a do time code transfer flip-flop circuit 332 which, as can be seen from FIG. 11, may be comprised of two flip-flops K6 and a NAND gate K8. Under normal conditions, this flip-flop circuit 332 generates a signal $\overline{\text{DOTCTRANF}}$ every time that a TC READ signal is generated by the time code clock counter 315 indicating that all 16 digits of a time code have been read and, thus, should have been stored in their proper locations within the time code data buffer 322. To do time code transfer flip-flop circuit 332 receives clocking signals from the system clock counter and address generating circuit 308, which cause circuit 332 to emit its $\overline{\text{DOTCTRANF}}$ SIGNAL for a period equivalent to the 16 phases of the 16-phase clock signal generated by generator 308. The $\overline{\text{DOTCTRANF}}$ signal is also supplied, as a switching input, to the multiplexer 326 which causes that multiplexer to connect the internal address bus 307 to the addressing input of the time code data buffer 322 instead of the time code address signals from the time code clock counter 315 which are normally supplied to the data buffer 322. The addressing inputs of the time code transfer buffer 328 are always connected to the internal address bus 307. Thus, during the period that the $\overline{\text{DOTCTRANF}}$ signal is generated, both the time code data buffer 322 and the time code transfer buffer 328 are simultaneously addresses by each of the sixteen 4-bit address values generated by the system clock counter and address generator 308. The read enable input to the time code data buffer 322 is enabled at all times that the write enable input to that data buffer is not enabled. Since the write enable input to data buffer 322 is only enabled after each of the separate 16 digits of the time code has been read by the time code reader 80, the write input to buffer 322 is not enabled during the period in which the $\overline{\text{DOTCTRANF}}$ signal is generated, which period takes place after all 16 of the digits of the SMPTE time code have been read. Thus, during the generation of the $\overline{\text{DOTCTRANF}}$ signal, each of the sixteen 4-bit memory locations in the data buffer 322 is addressed thereby causing the 4-bit value stored at each addressed location to be placed on the output of the data buffer 322. The two low order bits of this 4-bit value are supplied directly to the input of the time code transfer buffer 328, while two high order bits of this 4-bit digit or value pass through the user bit detect and separate circuit 330.

The circuit 330 also receives the 4-bit address value on the internal address bus 307 from the output of multiplexer 326. The detect and separate circuit 330 detects which of the bits passing through it are user bits and which are not. The SMPTE time code, as noted above, places a maximum valve on each of its eight address digits. For example, the tens frame digit of the time code address cannot exceed the value of 2, since the highest allowable frame number occurring within a second is the frame number 29. Since all of the digits that range between the value of 0 and 2 can be expressed with only 2 binary digits, the 4-bit digit in the tens frame digit of the time code address has two digits which are not used to convey address information. Since these upper two bits of the tens frame digit are not necessary to convey address information, they can be used for other purposes. One of them is used to indicate whether the time code currently being read is the NTSC 525 lines per frame standard time code format, or the NTSC 525 lines per frame color or drop frame time code format discussed above. The other of the two high order bits in the tens frame digit of the time code is a user bit which can be employed to convey a piece of binary information which an operator of the system desires to record upon the tape. Similarly, the tens hour digit never exceeds the value of 2 since the hour value of the time code cannot exceed the maximum value of 23. Thus, the two high order bits of the tens hour digit are also free for use in recording non-address information. In addition, the tens second digit and the tens minute digit of a time code address can never exceed the value of 5, because the highest possible value for minutes and for seconds within a time code is 59. Thus, in these two digits the highest order bit is free to record user information. Although the user bits which have just been discussed can be used to record information unrelated to the time code addresses, these user bits must be removed from the time code address digits in order for the latter digits to accurately reflect their time code value. For example, if the two user bits located in the upper half of the 4-bit tens frame digit of the time code address were both high, these two user bits would make a tens frame digit indicating an actual tens frame value of 2 appear to have a value of 14. Thus, the function of the user bit detect and separate circuit 330 is to remove user bits from those digits in the time code address in which such user bits occur, and to store the user bits in a user bit latch circuit 334 where they can be read under the command of the CPU on CPU board 214. More particularly, when the CPU causes the I/O $\overline{R_3}$ line to go low, the values stored in user bit latch are gated onto the system data bus so that the values in latch circuit 334 can be read by the CPU on board 214. As is shown in FIG. 13, the user bit latch circuit 334 may comprise two latches, A4 and A5. Latch A4 is connected as a shift register and it shifts in the user bits which are separated from time code digits by the operation of the user bit detect and separate circuit 330, and latch A5 latches all of the user bits from latch A4 once all of such bits have been removed from a specific time code.

The user bit detect and separate circuit 330 causes all user bits which are supplied to it from the time code data buffer 322 to be replaced with zero bits. Thus, during the period in which the $\overline{DOTCTRANF}$ signal is generated, each of the sixteen digits stored in one of the sixteen address locations in time code data buffer 322 is transferred to, and stored at a corresponding one of the sixteen address locations on transfer buffer 328, with the only change being that user bits contained in the time code address values stored in the lower half of time code data buffer 322 are all replaced with zero values in the equivalent address digits stored in the lower half of time code transfer buffer 328. The addresses at which data is stored in the time code transfer buffer 328 are shown on FIG. 8. The digits stored in the time code data buffer 322 are stored according to a similar addressing scheme. It should be noted that the user digits 1 through 8 which are stored at the addresses 8-15 in both the time code data buffer 322 and the time code transfer buffer 328, are separate from the user bits which are stored in various of the address digits occurring in the lower half of the memory, that is, addresses 7-0, in the time code data buffer 322.

After the 16-phase clock signal generated by system clock counter and address generator 308 has caused each of the sixteen digits in time code data buffer 322 to be transferred to the time code transfer buffer 328, a signal is supplied from generator 308 to the do time code transfer flip-flop circuit 332 so as to reset that flip-flop circuit and terminate the $\overline{DOTCTRANF}$ signal, and thus to terminate the transfer of data between the time code data buffer 322 and the time code transfer buffer 328.

The time code/CTL board 210, as shown in FIG. 7, further includes circuitry for controlling the automatic transfer of data from tape position buffer 292 and time code transfer buffer 328 to designated memory locations in the CPU memory board 216, for comparing the values contained in the time code transfer buffer 328 with the corresponding values stored in the tape position buffer 292, and for updating value in the tape position buffer 292 from the time code address value stored in the time code transfer buffer 328. More particularly, time code/CTL board 210 includes a mode control latch 338 which determines which of the following four functions are to be performed: the transfer of the CTL count in tape position buffer 292 to CPU memory board 216; the transfer of the time code address from the time code transfer buffer 328 to the CPU memory board 216; the comparing of the time code address values in the time code transfer buffer 328 and the tape position buffer 292; and the updating of the tape position 292 from the value contained in the time code transfer buffer 328.

As is shown in greater detail on FIG. 11, mode control latch 338 is connected to the six low order bits of the system data bus and, when latch 338 receives a latching signal on the $\overline{I/O}$ $\overline{W1}$ line at the command of CPU board 214, it latches the first six bits of the data put on the system data bus at that time by the CPU board 214. Thus, the CPU board 214 has the ability to store any desired combination of six bits in the latch 338 under the control of the program it is currently executing. Under normal operation, the first four bits of mode control latch 338 are all set high. The first of these four bits is supplied as a D input to a CTL DMA request flip-flop 340; the second of these four low order bits of latch 338 is supplied as a D input to a time code DMA request flip-flop 342; the third of these four low order bits is supplied as a D input to a compare enable arm flip-flop 344; and the fourth of these four bits of latch 338 is supplied as the D input to an update enable arm flip-flip 346. Each of these four flip-flops 340, 342, 344 and 346 which has its D input connected to a respective one of the four lower bits of the output of mode control latch 338, has its clocking input connected to an output of the CTL delay and synchronizing circuit 280. Each time that a CTL pulse designating a tape motion of one frame is read by the VTR associated with a given time code/CTL board 210, the reproduced CTL pulse is supplied to the input of the CTL delay and synchronizing circuit 280. Just before the beginning of the next cycle of the 16-phase clock signal generated by the system clock counter address generator 308, a $\overline{COUNT\ P}$ pulse is supplied to the tape position counter 282 so that that counter can either increment or decrement its value by 1, depending upon the direction of tape movement in the VTR from which the control pulse was read. After one full cycle of the 16-phase clock signal from generator 308, during which the tape position counter 282 has time to count the COUNT P pulse supplied to it, the output of CTL delay and synchronizing circuit 280 applied to the clocking inputs of flip-flops 340, 342, 344 and 346 goes high, thereby causing each of flip-flops 340, 342, 344 and 346 which receives a high signal from the mode control latch 338 to be set.

The CTL DMA request flip-flop 340 is used to initiate a Direct Memory Access (DMA) procedure in which the time code address value stored in the tape position buffer 292 is placed in a specified memory location, called the DMA tape position register, in CPU memory board 216. The term Direct Memory Access refers to either the reading, or the writing of memory data from or into memory address locations which are normally addressed by a central processing unit under the control of addressing circuitry other than that of the central processing unit itself. Such direct memory access is used by the time code/CTL boards 210 in editing system 200 for saving time because the time code address values can be written into CPU memory board 216 more rapidly under the influence of addressing circuitry on the time code/CTL boards 210 and the special function board 212 than it can be by the CPU itself.

When the CTL DMA request flip-flop 340 is set by the combined operation of the CTL delay and synchronizing circuit 280 and the mode control latch 338, it supplies a high signal on its Q output which is delivered to one input of a NOR gate 348 (FIG. 11), which causes the output $\overline{DMARQ}$ of that NOR gate to go low.

Figure 16:
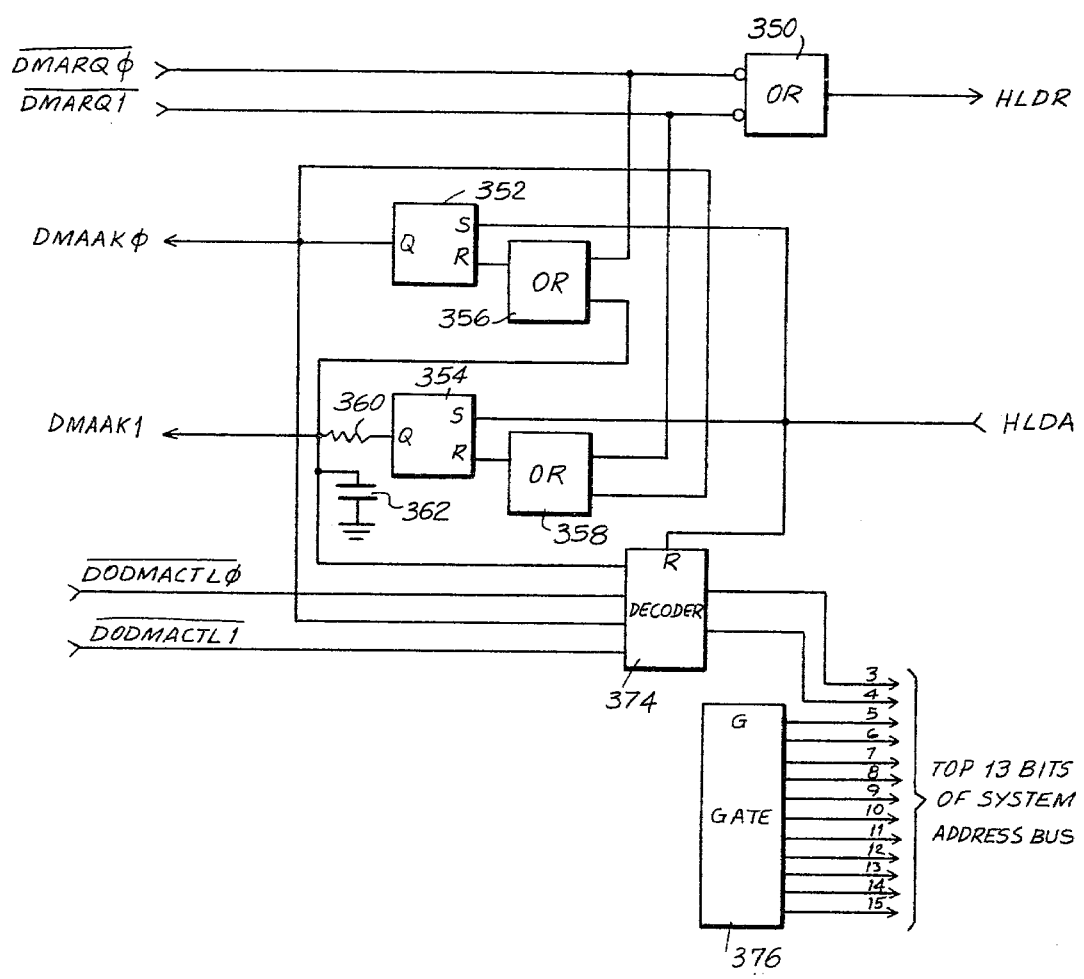
FIG. 16 is simplified diagram of a direct memory access controller included in a special function board shown on FIG. 5.

Each of the time code/CTL boards 210 is capable of generating a $\overline{DMARQ}$ output or signal. One of these $\overline{DMARQ}$ outputs is labeled $\overline{DMARQ0}$ and the other is labeled $\overline{DMARQ1}$. These two signals $\overline{DMARQ0}$ and $\overline{DMARQ1}$ are supplied to a DMA controller located on the special function board 212, and which is shown in simplified form on FIG. 16. The $\overline{DMARQ0}$ and $\overline{DMARQ1}$ signals are supplied to respective inverting inputs of an OR gate 350. Whenever a direct memory access or DMA is requested by one of the two time code/CTL boards 210, its respective $\overline{DMARQ}$ signal will go low, causing the output of OR gate 350 to go high, which generates a hold request signal HLDR. This hold request signal causes the microprocessor located on CPU board 214 to enter a hold state when it completes execution of its current instruction. As soon as the microprocessor enters the hold state, it generates a hold acknowledge signal HLDA which is supplied to the DMA controller located on the special function board 212. More particularly, as shown on FIG. 16, the hold acknowledge signal HLDA is applied to the setting input of two flip-flops 352 and 354. The flip-flops 352 and 354 have OR circuits 356 and 358, respectively, connected to their reset inputs. The OR gate 356 receives the $\overline{DMARQ0}$ signal at one of its inputs, and the OR gate 358 has the $\overline{DMARQ1}$ signal applied to one of its inputs. Thus, each of the flip-flops 352 and 354 can only be set to, and remain in, its set state while the associated $\overline{DMARQ}$ signal is low for indicating that the associated time code/CTL board 210 is requesting a DMA procedure. Thus, when a hold acknowledge signal HLDA is received by the circuit shown in FIG. 16, it will be set whichever of the two flip-flops 352 and 354 has its associated $\overline{DMARQ}$ signal at a low level. However, as can be seen on FIG. 16, the Q output DMAAK0 of flip-flop 352 is applied to the other inputs of OR gate 358. Similarly, the Q output DMAAK1 of flip-flop 354 is applied to the other input of OR gate 356, but it should be noted that this connection between the output of flip-flop 354 and an input of OR gate 356 has an interposed integrating circuit comprised of a resistor 360 and a capacitor 362 which will slightly delay the arrival of a high signal generated by flip-flop 354 to the respective input of OR gate 356. Thus, if the $\overline{DMARQ0}$ and $\overline{DMARQ1}$ signals are both low, indicating that both of the time code/CTL boards 210 are requesting a DMA procedure, the following hold ackowledge signal HLDA will initially set both flip-flops 352 and 354, but the described connection between the Q output of flip-flop 352 and the respective input of OR gate 358, will immediately cause flip-flop 354 to be reset. Such resetting of flip-flop 354 will take place so rapidly that the brief high output produced by flip-flop 354 will not have time to reset flip-flop 352 through OR gate 356. Thus, the DMA controller located on the special function board 212 establishes a priority whereby if both the $\overline{DMARQ0}$ and $\overline{DMARQ1}$ signals go low before a hold acknowledge signal HLDA is generated, the DMAAK0 output signal will go high before the DMAAKI output signal and the DMAAK1 output signal will not be allowed to go high until the $\overline{DMARQ0}$ signal goes high, indicating that the time code/CTL board 210 associated with the latter signal is no longer requesting a DMA procedure. It should be noted, however, that the DMA controller of FIG. 16 will prevent a $\overline{DMARQ0}$ signal from one of the boards 210 from interrupting a DMA procedure which is already underway in the other time code/CTL board 210. Thus, if only the $\overline{DMARQ1}$ signal is low when a hold acknowledge signal HLDA is generated, only the flip-flop 354 will be set, causing the DMAAK1 output signal to go high. This setting of flip-flop 354 will, after the short delay required for changing of the integration circuit constituted by resistor 360 and capacitor 362, prevent flip-flop 352 from being set by the hold acknowledge signal HLDA until the $\overline{DMARQ1}$ output signal goes high for indicating that its associated time code/CTL board 210 is no longer requesting a DMA procedure.

Figure 15:
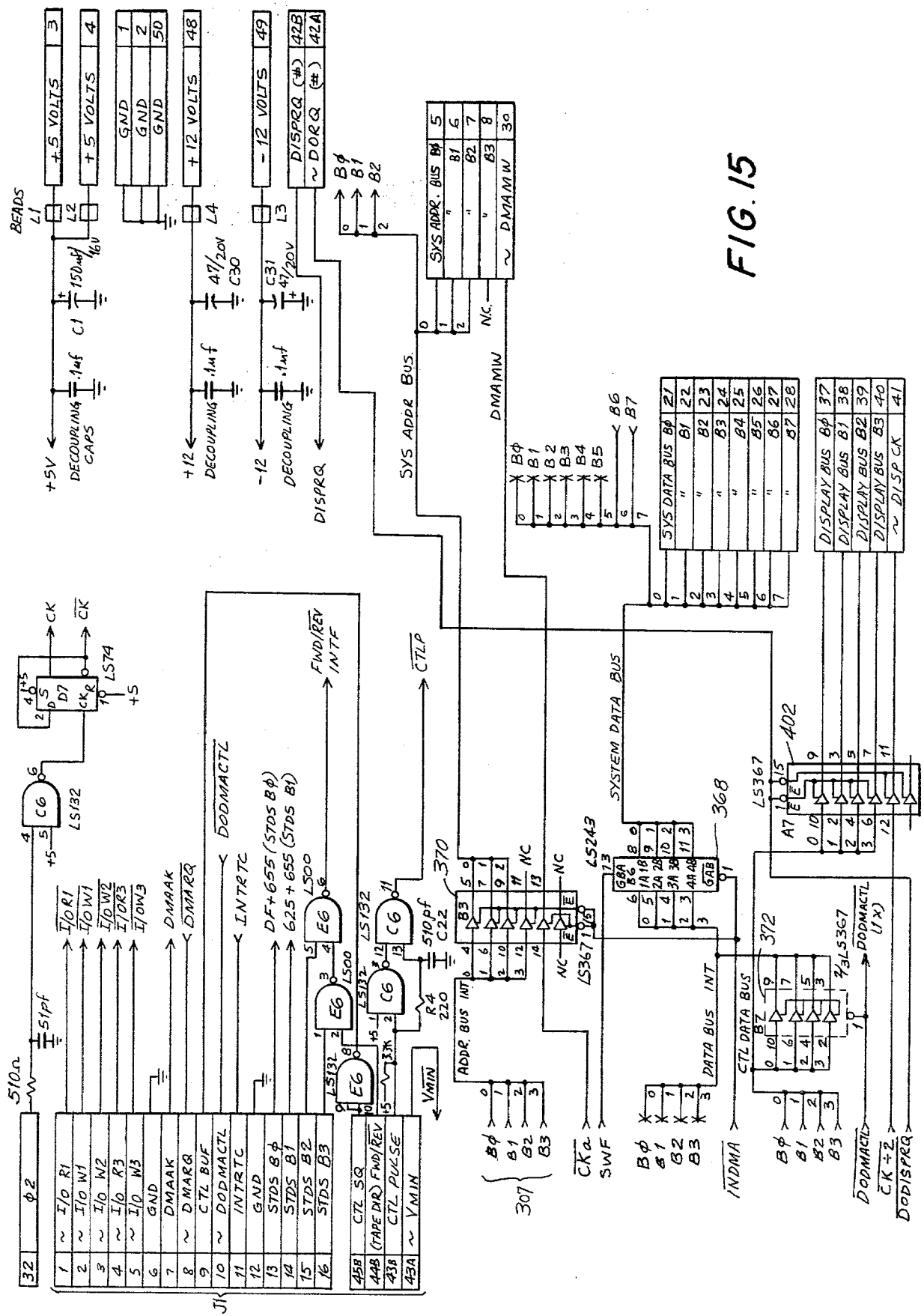

The Q output of CTL DMA request flip-flop 340 (FIG. 7) is also supplied to a DODMACTL circuit 364 which, as seen in FIG. 11, may include an AND gate L2 and a flip-flop L1. When an output DMAAK signal is generated by the flip-flop 352 or 354 of FIG. 16 associated with one of the time code/CTL boards 210, that output signal DMAAK is also supplied to one input of the DODMACTL circuit 364 in the respective board 210. When the Q output of the CTL DMA request flip-flop 340 and the appropriate DMAAK output signal are both high, AND gate L2 (FIG. 11) will have a high output which is supplied to the D input of flip-flop L. At the end of the cycle of the 16-phase clock signal generated by system clock counter and address generator circuit 308, flip-flop L1 contained within the DODMACTL circuit 364 is clocked thereby causing it to store the value currently being obtained from AND gate L2. Thus, it can be seen that if the CTL DMA request flip-flop 340 is set and if a DMAAK signal has been received indicating that the microprocessor on the CPU board 214 has ceased its operation and is no longer using the system address or data buses, the DODMACTL circuit 364 is set to the DODMACTL state in which its Q output is high and its $\overline{Q}$ output is low. The low $\overline{Q}$ output from the circuit 364 in the DODMACTL state is supplied to one input of an OR gate 366 (FIG. 7) which has both inverting inputs and an inverting output. This low input supplied from circuit 364 to OR gate 366 causes its output also to go low, so that a low signal is generated on an $\overline{INDMA}$ line. When the signal on the $\overline{INDMA}$ line is low in the DODMACTL state, a gate 368, shown in detail in FIG. 15, is made to connect the 4-bit internal data bus of the time code/CTL board 210 to the 4 lower bits of the 8-bit system data bus of the card bay 204. The $\overline{INDMA}$ line is also connected to a gating input of a gate 370 which is also shown on FIG. 15. When the $\overline{INDMA}$ signal goes low in the DODMACTL state, gate 370 causes the three low order bits of internal address bus 307 to be connected to the three low order bits of the system address bus of card bay 204. The $\overline{Q}$ output of the DODMACTL circuit 364 is also connected to a $\overline{DODMACTL}$ line which is connected to the gating input of a gate 372, as shown in FIG. 15. When the signal on the $\overline{DODMACTL}$ line goes low, it causes the 4-bit output of latch circuit 304 in the tape position counter 282, which 4-bit output is applied to the CTL data bus, to be connected to the 4-bit internal data bus which, at this same time, is connected to the 4 lower bits of the system data bus. Thus, in the DODMACTL state, the 4-bit output of latch circuit 304 is applied to the 4 lower bits of the system data bus and the three lower bits of the internal address bus are connected to the three lower bits of the system address bus. The four high order bits of the system data bus are held low during any DMA procedure by circuitry (not shown) which is located on special function board 212.

Further, in the DODMACTL state, the $\overline{\text{DODMACTL}}$ line signal is low and is supplied to a decoder 374 (FIG. 16) located in the DMA controller on special function board 212. In the DODMACTL state of a specified one of time code/CTL boards 210, decoder 374 also receives the DMAAK signal associated with the board 210 which is generating the $\overline{\text{DODMACTL}}$ signal. The decoder 374 also receives the hold acknowledge HLDA signal which is generated throughout the whole DMA process. Thus, decoder 374, which could be comprised of read only memory, responds to the ones of its inputs which indicates that a specified one of the two time code/CTL boards 210 is performing a CTL DMA procedure. Accordingly, decoder 374 generates an output which is supplied as two additional address bits (3) and (4) to the system address bus. The hold acknowledge signal HLDA is also shown to be applied to the gating input G of a gate 376. This gate has eleven fixed inputs, which are not shown, and when the hold acknowledge signal is generated gate 376 provides a fixed set of eleven additional addressing bits (5)–(15) which are supplied to the system address bus. Thus, it can be seen that during DMA, the three low order bits of the system address bus are determined by the system clock counter and address generator 308, that the next two address bits are determined by the decoder circuit 374 and that the top eleven bits are fixed by the gate 376.

As shown on FIG. 12, the $\overline{\text{DODMACTL}}$ signal is supplied to the system clock and generator circuit 308 at one of the negative or inverted inputs of an OR gate K3 for causing the output of that OR gate to remain high during the entire CTL DMA process during which the $\overline{\text{DODMACTL}}$ signal is low. The output of OR gate K3 is normally passed through multiplexer 309 onto the internal address bus 307 as its high order bit. Thus, during the CTL DMA process, only the top half of the tape position buffer 292 has its digits addressed. As each of the three low order bits of the internal address bus is varied at every other phase of the 16-phase clock pulse during the DMA process, a successive one of the eight time code address digits contained in the upper half of the tape position buffer 292, is cycled through adder circuit 294, EXCLUSIVE OR circuit 300 and multiplexer 302 to the latch circuit 304, where it is latched by the latching signal generated by the NORRED AND circuit 310 during the A phases of the 16-phase clock signal. The value latched in circuit 304 is then supplied through CTL data bus, gate 372, the internal data bus and gate 368 to the system data bus for writing at the eight successive 18-bit addresses of the tape position register on the CPU board 216 determined by the address comprised of the three low order bits of the address generated by the system clock counter and address generator 308, by the two bits supplied by the output of decoder circuit 374 on FIG. 16, and by the eleven high-order bits which are fixed by the output of the gate circuit 376, also shown on FIG. 16. Thus, in the DODMACTL state, each of the eight digits stored in the upper half of tape position buffer 292, is stored in eight sequential addresses of the CPU memory 216, at an address which is associated, by the bits supplied from the output of gate 376, with DMA information, and which, as a result of the bits produced by decoder 374, is associated with a CTL DMA procedure coming from its particular time code/CTL board 210.

It should be noted that during any DMA procedure being performed by one of the time code/CTL boards 210, no values are written into its tape position buffer 292. This is because the output of OR gate 366 is supplied to one input of the NAND gate 311 which is identified as K11 on FIG. 11. During a DMA procedure, the output of OR gate 366 is low causing the output of the NAND gate K11 to always be high which, in turn, causes the $\overline{\text{WRITE CTL}}$ signal to be high for preventing any values from being written into tape position buffer 292. After the CTL DMA procedure has been underway for approximately one cycle of the 16-phase clock signal from generator 308, that generator 308 causes a gate circuit 378 (FIG. 7) to pass the positive $\overline{\text{Q}}$ output of DODMACTL circuit 364 to the reset input of the CTL DMA request flip-flop 340 for resetting that flip-flop and causing the DODMACTL circuit 364 to be reset at the completion of the cycle of the 16-phase clock signal, thus ending the DODMACTL state. As shown in FIG. 11, gate 378 is actually comprised of a plurality of gates 378A and 378D.

After the completion of the CTL DMA procedure which starts shortly after the reading of a control pulse by the respective VTR, the time code DMA procedure is initiated. As was stated earlier, during normal operation of the circuitry of FIG. 7, mode control circuit 338 causes the D input of the time code DMA flip-flop 342 to have a positive value and, after the cycle of the 16-phase clock signal during which tape position counter 282 counts a given control pulse, the time code DMA flip-flop 342 is set by the output of the CTL delay and synchronizing circuit 280 at the same time as is the CTL DMA request flip-flop 340. However, the positive Q output which is generated when the time code DMA request flip-flop 342 is set is not sufficient to cause the respective time code/CTL board 210 to enter the time code DMA procedure. This is because the Q output of the time code DMA request flip-flop 342 is supplied as one input to an AND gate 380, and the other two inputs to this AND gate 380 are the Q output of the CTL DMA request flip-flop 340 and the time code ready signal generated by flip-flop 318.

Thus, the time code/CTL board 210 of FIG. 7 will not enter the time code DMA procedure until the CTL DMA procedure has been completed, and until a time code ready signal has been generated for indicating that the value read by the time code reader 80 and stored in the time code transfer buffer 328 has a high probability of accuracy. Once all of these conditions are met, the output of AND circuit 380 goes high, and this high output is supplied both to NOR gate 348, for causing the generation of a low signal on the $\overline{\text{DMARQ}}$ line, and to a DO DMA time code circuit 382. As was discussed above, a low signal on the $\overline{\text{DMARQ}}$ line causes a hold request to be applied to the microprocessor on CPU board 214. As soon as the microprocessor completes its current instruction, it generates a hold acknowledge signal, and, in accordance with the above described operation of the circuitry shown in FIG. 16, a DMAAK signal is applied to the time code/CTL board 210 which has generated a request for a DMA precedure. The DO DMA time code circuit 382 may be comprised of an AND gate L2 and a flip-flop L1, as can be seen from FIG. 11. Both the DMAAK signal from the circuitry of FIG. 16 and the output of AND gate 380, are supplied to the input of the AND gate L2, and, when both of these signals are high, AND gate L2 presents a positive signal to the D input of flip-flop L1. Just before the beginning of the next cycle of the 16-phase clock signal from generator 308, this positive D input will be latched under the influence of a clocking signal which is supplied to the DO DMA time code circuit 382 from generator 308. This causes the DO DMA time code circuit 382 to enter the DO DMA time code state in which the Q output of circuit 382 is high and the $\overline{Q}$ output is low, so as to cause the circuitry shown in FIG. 7 to initiate a time code DMA procedure.

When the $\overline{Q}$ output of circuit 382 is low, it presents a low input to the OR gate 366 which, in turn, causes the output $\overline{INDMA}$ of gate 366 to go low for causing the gate 368 to connect the four bits of the internal data bus to the four low-order bits of the system data bus. The low value of output $\overline{INDMA}$ also causes gate 370 to connect the three low order bits of the 4-bit internal address bus to the three low order bits of the 16-bit system address bus. The operation of gates 368 and 370 is identical in both the CTL DMA procedure and the time code DMA procedure. However, during the time code DMA procedure, the low signal produced by the $\overline{Q}$ output of the DO DMA time code circuit 382 is also supplied to an inverting input of a NOR circuit 384 for causing the output of that circuit to go low. The output of NOR circuit 384 is the $\overline{ME\ T.C.T.B.}$ signal, which is the memory enable input to time code transfer buffer 328, and it causes the data in the buffer 328 addressed by the internal address bus to be placed on the internal data bus when the memory enable input is low.

As is shown in FIG. 12, the $\overline{INDMA}$ line is connected to one of two NORRED AND gates of a circuit K4 included in generator 308. When on the $\overline{INDMA}$ line is low during either the CTL or time code DMA procedures, it prevents the high order bit of the address generated from the system clock counter and address generator 308 from changing between a high and a low signal state at every clock phase, as it normally does except during DMA procedures. This is of little concern during the CTL DMA procedure, because, as was discussed above, the low $\overline{DODMACTL}$ signal generated at that time causes the output of OR gate K3 and the high order address bit to remain high regardless of the output of the circuit K4. However, during the time code DMA procedure, the $\overline{INDMA}$ signal causes the value of the high order bit generated by the counter and address generator 308 to be determined by the AND gate contained within the circuit K4 which receives as inputs the two signals ADH and DODMATC. The DODMATC signal is the Q output of the DODMA time code circuit 382, and it is always high during the time code DMA procedure. The ADH signal is the 6th output bit of the mode control latch 338. Normally, the value stored by the CPU board 214 in the mode control latch 338 is such that the ADH signal is low, so that the fourth bit of the address produced by the counter and address generator 308 is low during the time code DMA procedure, and further so that only the lower half of the time code transfer buffer 328 is address (79) in such procedure.

Thus, during the time code DMA procedure, each of the time code address digits stored in the lower half of time code transfer buffer 328, is sequentially placed on the four low order bits of the system data bus after passage through the internal data bus and gate 368. At the same time that each such time code address digit is placed on the system data bus, the three low order address bits which selected it from the time code transfer buffer 328 are also passed through the internal address bus and gate 370 to the three low order bits of the system addrsss bus. Concurrently with the foregoing, the hold acknowledge HLDA signal generated during a DMA procedure causes gate 376 to supply the eleven fixed DMA high order bits to the system address bus, and decoder 374 supplies two address bits to the system data bus which cause the time code address digits being transferred to be written into eight successive 8-bit addresses of the CPU memory board 216, which addresses are associated with the VTR for which such a DMA procedure is being undertaken and with the time code DMA procedure rather than the CTL DMA procedure, since, at this time, no $\overline{DODMACTL}$ signal is being supplied to decoder 374. The eight successive 8-bit storage locations on the CPU memory board 216 in which the eight digit value from buffer 328 is stored in the DMA procedure is called the DMA time code register.

Near the end of the 16-phase clock cycle of the time code DMA procedure, a signal emitted by the system clock counter and address generator 308 is supplied to gate 378B of gating circuit 378 (FIG. 11). This causes the positive signal on the Q output of DO DMA time code flip-flop circuit 382 to be supplied to the reset input of the time code DMA request flip-flop 342, thus resetting the latter flip-flop. This, in turn, causes the DO DMA time code flip-flop 382 circuit to be reset at the end of the 16-phase clock cycle.

It can be seen that, during the 16-phase clock cycle of the time code DMA procedure, the address generated by the system clock counter and address generator 308 causes the eight time code address digits stored in the lower half of time code transfer buffer 328 to be stored in the respective DMA time code register defined by the eight sequential addresses in the CPU memory board 216 at a location associated with time code DMA data from the respective time code/CTL board. It should be noted that the CPU board 214 has the capability, if instructed to do so by its program, to cause the eight user digits stored in the upper half of time code transfer buffer 328 to be transferred to the time code register in the CPU memory board 216. It can do this by changing the value stored in the mode control latch 338, which is shown in greater detail in FIG. 11, so that its sixth, or ADH bit is high. This high ADH bit will be ANDED with the DODMACTL signal which is supplied to the gate K4 of the system clock counter and address generator 308, shown in detail on FIG. 12, thereby causing the high order bit of the address generated by circuit 308 to remain high during the time code DMA procedure which will cause the eight user digits in the upper half of buffer 328 to be placed in CPU memory 216 during a time code DMA procedure.

During normal operation of the circuitry shown in FIG. 7, mode control latch 338 is set by CPU board 214, so as to supply a high signal to the D input of compare enable arm flip-flop 344. As a result of the foregoing, flip-flop 344 is normally set simultaneously with setting of the CTL DMA and time code request flip-flops 340 and 342 after tape position counting circuit 282 has had a chance to count a given control pulse from the respective VTR. When flip-flop 344 is set, it supplies a high signal to a do compare circuit 386. As is shown on FIG. 11, circuit 386 may include a NAND gate J4 and a flip-flop J6, with one input to NAND gate J4 being the Q output of compare enable arm flip-flop 344, and the other input of this gate J4 being normally connected, through a jumpered connection E—E, to the output of an AND circuit 388. AND circuit 388 has three inputs, one of which is the output of OR gate 366 which is only high when neither the CTL nor the time code DMA procedures is underway. The second input to AND gate 388 is the time code ready signal from flip-flop 318 which is only high if there is an indication that the time code address currently stored in the time code transfer buffer 328 was read with a fairly high probability of accuracy. The third input to AND gate 388 comes from the output of a non-compare count circuit 390 which has a high value only if that circuit has not detected a discontinuity in the time code addresses being read by time code reader 80. Thus, AND gate 388 will only have a positive output when there is no DMA underway in the circuitry shown in FIG. 7, when the time code ready signal indicates that the time code address in transfer buffer 328 is probably accurate, and when the non-compare count circuit 390 has not detected a discontinuity in time code addresses. When all of these conditions are met during a time that compare enable arm flip-flop 344 is set, NAND gate J4 will generate a negative cycle to the D input of flip-flop J6 in do compare circuit 386. Just before the beginning of the next 16-phase clock cycle from generator 308, this flip-flop J6 will be set to a low level by a clocking signal from generator 308. When flip-flop J6 within the do compare circuit 386 is set low, its $\overline{Q}$ output goes high for causing the circuitry of FIG. 7 to enter a do compare mode.

In the do compare mode, the high signal generated at the Q output of flip-flop J6 in do compare circuit 386 is supplied to NOR circuit 384, which causes the $\overline{ME}$ $\overline{T.C.T.B.}$ signal supplied to the read enable input of transfer buffer 328 to go low. This causes the value of each 4-bit digit within buffer 328 which is addressed by the internal address bus to be placed on the internal data bus.

The high signal on the $\overline{Q}$ output of do compare circuit 386 is also applied to an enabling input of a compare address circuit 392 which is shown in FIG. 12 to include a NAND gate J1, two NAND gates K3, a NOR gate H7 having both inverting inputs and outputs, and a flip-flop H3. The flip-flop H3 is fixed in a set mode at all times except when it receives a high signal from the $\overline{Q}$ output of do compare circuit 386 during the do compare state. Once the do compare state has been entered, flip-flop H3 is free to have its value reset. The NOR gate H7, since it has both inverting inputs, and outputs is the equivalent of an AND gate, and one of its inputs is the output of a compare digit circuit 394. As is described below, the compare enable state lasts for one 16-phase clock cycle. During this clock cycle, each of the 16 digits stored in time code transfer buffer 328 is supplied through the internal data bus to one of the inputs of compare circuit 394. During this same interval, the value of each of the eight digits which are successively held in latch circuit 304, is supplied to the other input of compare digit circuit 394 over the CTL data bus. During the compare procedure, the 4-bit address signal generated by the system clock counter and address generator circuit 308 has its high order bit varying at twice the rate at which its three low order bits vary, as has been described above with reference to the operation of tape position counter 282. Thus, during the compare procedure, a different digit is supplied through the internal data bus to one input of compare digit circuit 394 from transfer buffer 328 at every clock phase, with time code address digits from the lower half of transfer buffer 328 being supplied during A clock phases and user digits being supplied from the upper half of buffer 328 during B clock phases. However, as was discussed above with regard to the operation of tape position counter 282, latch 304 only stores values that are supplied to it during the A clock phases. Therefore, the values which are supplied from latch 304 through the CTL data bus to the other input of compare digit circuit 394 only vary at every other clock phase during A clock phases. The output produced by compare digit circuit 394 during the B clock phases is of no importance because, during these clock phases, circuit 394 is comparing user digits from the upper half of time code transfer buffer 328 with time code address digits from tape position buffer 292. It is only during the A phases of the 16-phase clock signal that time code address values are supplied to compare digit circuit 394 from both the lower half of the time code transfer buffer 328 and the lower half of tape position buffer 292. The compare address circuit 392 receives a signal $CK_a$ from generator 308 which is high only during a portion of each A phase of the 16-phase clock signal. As is shown in FIG. 12, this signal $CK_a$ is supplied to one input of a NAND gate K3 whose other input is normally high. Thus, the output of this NAND gate which is supplied as the clocking input of the flip-flop H3, only goes high when the $CK_a$ signal goes low at an intermediate portion of each A phase of the 16-phase clock signal. As a result, only the outputs of compare digit circuit 394 which result from the comparison of time code address digits from both time code transfer buffer 328 and tape position buffer 292 are supplied to the flip-flop H3 of compare address circuit 392.

The output of compare digit circuit 394 is high only if both of the digits supplied to it are identical. If the two digits supplied to circuit 394 are not identical, its output will be low and the output of gate H7 will be low. If a low value is clocked into flip-flop H3 of circuit 392, the Q output of flip-flop H3 will go low and, being connected to an input of gate H7, will prevent the latter from having a high output until flip-flop H3 is set by a low signal on the do compare line at the end of a compare procedure. The system clock counter and address generator 308 also supplies a signal to compare address circuit 392 which is low only when all three of the three low order bits of the address generated by generator 308 are low. This signal is supplied to the input of NAND gate K3 other than the input which receives the $CK_a$ signal, and it prevents the outputs of compare digit circuit 394 from being clocked into flip-flop H3 during the comparison of the least significant digits, that is, the units frame digit, contained in time code transfer buffer 328 and tape position buffer 292. This prevents minor differences in the time code addresses stored in buffers 328 and 292 from causing compare address circuit 392 to indicate a non-comparison. However, if there is any non-comparison between any of the other seven digits of the time code addresses which are compared during the compare procedure, the NAND gate K3 of circuit 392 (FIG. 12) which has an output pin (6) will generate a negative non-compare signal at its output during the last phase of the 16-phase clock signal of the compare procedure.

The non-compare output of compare address circuit 392 is supplied as an input to non-compare count circuit 390 which, as can be seen from FIG. 12, includes a counter J3, a flip-flop K2, and a plurality of NAND gates and inverters. The counter J3 in non-compare counting circuit 390 counts the non-compare signals which are generated by compare address circuit 392 at the end of each compare procedure. This counter J3 is reset at the end of any compare procedure for which a non-compare signal is not generated. If the counter J3 in non-compare count circuit 390 attains a count of 10, meaning that 10 successive compare procedures have each resulted in the generation of a non-compare signal, counter J3 will cause non-compare count circuit 390 to generate a time code discontinuity signal which is labeled the $\overline{\text{ERROR}}$ signal.

The $\overline{\text{Q}}$ output of do compare circuit 386, which is high during the compare procedure, is supplied to one of the gated inputs 378C of gate circuit 378 (FIG. 11). Near the end of the 16-phase clock cycle, the high signal generated on the $\overline{\text{Q}}$ output of do compare circuit 386 is passed through input gate 378C to the reset input of compare enable arm flip-flop 344 for causing the latter to be reset. The resulting low value supplied from the Q output of compare enable arm flip-flop 344 to do compare circuit 386, causes the state of circuit 386 to be changed before the beginning of the next 16-phase clock cycle. As a result, the compare procedure ends after exactly one 16-phase clock cycle.

During normal operation of the circuitry shown in FIG. 7, the mode control latch 338 is set by the CPU board 214 to provide a high signal to the D input of update enable arm flip-flop 346. Thus, flip-flop 346 is normally set as soon after the receipt of each CTL pulse as tape position counter 282 has had time to count such pulse, as are CTL DMA request flip-flop 340, time code DMA request flip-flop 342, and compare enable arm flip-flop 344. As soon as flip-flop 346 is set, it provides a positive input to a do update circuit 396 which may be composed of a NAND circuit L5 and a flip-flop J6 (FIG. 11). The NAND circuit L5 has a first input connected to the Q output of update enable flip-flop 346, a second input connected to the output of AND gate 388 and a third input connected to the Q output of compare enable arm flip-flop 344. Thus, the output of NAND gate L5 will only go low under the simultaneous attainment of the following conditions: update enable arm flip-flop 346 has been set, as stated above; compare enable flip-flop 344 has been reset indicating that the compare procedure has been finished; there is no DMA procedure underway; there is no time code discontinuity signal being generated from the output of non-compare count circuit 390; and the time code ready signal is being generated by flip-flop 318 for indicating that the time code address digits in time code transfer buffer 328 have a high probability of accuracy. When all of these conditions are met, do update circuit 396 will have its flip-flop J6 reset at the beginning of the next 16-phase clock cycle for initiating an update procedure.

It should be noted that at this point that the non-compare signal generated by compare address circuit 392 is applied to a reset input of update enable flip-flop 346. As is shown in detail on FIG. 11, the pin 6 output of NAND gate K3 in circuit 392 on FIG. 12 is connected through an AND gate L7 to the reset input of update enable flip-flop 346. Thus, the update procedure will not be initiated after the counting of a control pulse if the compare procedure which has taken place immediately therebefore has indicated that the most significant seven digits of the time code address in time code transfer buffer 328 differ from the most significant bits of the time code address stored in the lower half of tape position buffer 292.

When flip-flop J6 of do update circiqt 396 is reset, it causes the circuitry of FIG. 7 to perform an update procedure. During such update procedure, the Q output of do update circuit 396 is high and the Q output of that circuit is low. Such low signal at the Q output is applied to NOR circuit 384, which causes the output of that NOR circuit, that is, the $\overline{\text{ME T.C.T.B.}}$ line or signal to go low, for causing time code transfer buffer 328 to place onto the internal data bus each of the stored digits which is addressed by the internal address bus. The high signal generated from the $\overline{\text{Q}}$ output of do update circuit 396 is applied through multiplexer 312 to the switching input of multiplexer 302, so as to disconnect from latch 304 the output of EXCLUSIVE OR gate 300 which is normally connected to latch 304 and, in its place, to connect to the input of latch 304 the 4-bit internal data bus which carries the output from time code transfer buffer 328. Thus, during the 16-phase clock cycle of the update procedure, each of the sixteen digits stored within time code transfer buffer 328 is addressed by the 4-bit address signal generated by system clock counter and address generator 308 which is connected through multiplexer 309 to the internal address bus. Each of these digits is then supplied through multiplexer 302 to the input of latch 304. However, the timing of the latching signal supplied to latch 304 from generator 308 through the NORRED AND circuit 310 is such that latch 304 only stores the digits which are read during the A clock phases of the 16-phase clock signal, that is, the time code address digits stored in the lower half of time code transfer buffer 328. During each successive A phase of the 16-phase clock signal, a successive one of the digits of the time code address stored in time code transfer buffer 328 is stored in latch 304 and, thus, is supplied as an input to tape position buffer 292 which stores each such digit at the address supplied to it from the internal address bus upon receiving a $\overline{\text{WRITE CTL}}$ signal from NAND gate 311. Thus, it can be seen that, during the update procedure, each of the eight time code address digits stored in the lower half of time code transfer buffer 328 is transferred into both the bottom eight digits and the top eight digits of time position buffer 292.

Near the completion of the 16-phase clock cycle of the update procedure, a signal generated by the system clock counter and address generator 308 is applied to a gate 378D (FIG. 11) of gate circuit 378. This causes the positive signal at the $\overline{\text{Q}}$ output of the do update circuit 396 to be passed through gate circuit 378 to the reset input of update enable arm flip-flop 346 for causing the latter flip-flop to be reset and thereby change the state of its input into the do update circuit 396. At the completion of the 16-phase clock cycle of the update procedure, a signal from system clock counter and address generator 308 clocks do update circuit 396 causing it to change states in accordance with the change in state of update enable arm flip-flop 346, thereby causing the Q output of circuit 396 to go low while its $\overline{\text{Q}}$ output goes high for terminating the update procedure.

The circuitry shown in FIG. 7 further includes an AND gate 398, which, as is shown in FIG. 11, may include a NAND gate L5 and an inverter H6, a do display flip-flop 400 and a gate 402, all of which are used for automatically updating the value displayed in tape timer register 248 on console 206 (FIG. 6) from the time code address value stored in the bottom half of tape position buffer 292. The AND gate 398 has a first input from the output of CTL delay and synchronizing circuit 280, which is always high except during the 16-phase clock cycle in which tape position counter 282 responds to a $\overline{COUNTP}$ pulse by incrementing or decrementing the value in tape position buffer 292. A second input of AND gate 398 is connected to the $\overline{DMARQ}$ line which extends from the output of NOR gate 348. This signal on the DMARQ line is always high except when a DMA procedure is being requested either by CTL DMA request flip-flop 340 or time code DMA request flip-flop 342. A third input of AND gate 398 is connected to the display request DISPRQ line which goes high when circuitry located on special function board 212 is prepared to update the value on the tape timer registers 248 on console 206. Such circuitry on special function board 212 is described in greater detail in copending applications identified by U.S. Ser. Nos. 139,444, 139,448, 139,747, now U.S. Pat. No. 4,322,814 all filed Apr. 11, 1980, having a common assignee herewith. The output of AND gate 398 is supplied to the D input of do display flip-flop 400. The clocking input of flip-flop 400 is connected to the $\overline{7b}$ output of clock counter and address generator 308 which goes low during the clock phase 7B, that is, the last clock phase of the 16-phase clock signal. Thus, do display flip-flop 400, which is clocked by the rising edge of a signal applied to its clocking input, is set at the beginning of the first phase of the 16-phase clock cycle, when the $\overline{7b}$ output goes high, and which occurs while a display request signal is being supplied to time code CTL board 210 from special function board 212 at a time when the time code/CTL board 210 is neither requesting nor performing a DMA procedure and also is not counting a control pulse. When do display flip-flop 400 is set, its $\overline{Q}$ output goes low for providing a do display request signal $\overline{DODISPRQ}$. When the $\overline{DODISPRQ}$ signal is low, gate 402 is activated for causing the 4-bit control data bus to be connected to a 4-bit display bus which is connected to special function board 212. When gate 402 is activated by the $\overline{DODISPRQ}$ signal, a $\overline{CK \div 2}$ signal from clock counter and address generator 308 is also passed through gate 402 as a DISPLAY CK signal. During the ensuing 16-phase clock cycle, each of the 16 digits in tape position buffer 292 will be placed on the display bus which is connected to the output of gate 402. However, since the $\overline{CK \div 2}$ signal is high only during A phase clock signals, special function board 212 will only send the eight time code addresses from the lower half of tape position buffer 292 to the tape timer register 248 associated with the time code/CTL board 210 which is emitting the $\overline{DODISPRQ}$ signal.

The circuitry of FIG. 7 also includes a CPU write circuit 404 which, as can be seen from FIG. 11, may include two AND gates L9, a NAND gate K8, and a flip-flop K5. The CPU write circuit 404 can be set to a CPU write state when the output of mode control latch 338, which is connected to its input, is set high. The output of latch 338 is set high by CPU board 214 when the latter writes into mode control latch 338 a group of bits which has a high bit at the bit which is associated with the output connected to CPU write circuit 404.

CPU write circuit 404 is shown to be connected to a switching input of multiplexer 309, to one of the two inputs of the AND gate C4 of system clock counter and address generating circuit 308 (FIG. 12), and to the switching input and at least two of the multiplexed inputs of the multiplexer 312. Further, one output of write CPU circuit 404 is connected to one input of NORRED AND circuit 310.

When write CPU circuit 404 is set to the write CPU state by the output of mode control latch 338, circuit 404 generates a low signal to one of the inputs of AND gate C4 in clock counter and address generator 308. This prevents circuit 308 from counting system clock pulses and causes the 16-phase clock signal to cease being generated. The output from CPU write circuit 404 to the switching input of multiplexer 309 disconnects the output of clock counter and address generator 308 from the internal address bus and instead causes multiplexer 309 to connect the three low order bits of the system address bus to the 4-bit internal address bus. At this time, the 4th bit of the internal address bus is held low through a connection supplied to it by multiplexer 309. In the CPU write state, multiplexer 312 is switched by its connection with CPU write circuit 404, so that the $\overline{Q}$ output of do update flip-flop 396 is disconnected from the switching input of multiplexer 302 and instead a high signal generated by one output of CPU write circuit 404 is applied to multiplexer 302. Similarly, the switching of multiplexer 312 by CPU write circuit 404 causes the output of the NORRED AND circuit 313 to be disconnected from the input to NAND gate 311 which is used to generate the $\overline{WRITE\ CTL}$ signal. Instead, an output from CPU write circuit 404 is applied through multiplexer 312 to such input of NAND gate 311. The output from CPU write circuit 414 which is connected to one input of NORRED AND gate 310 causes the output of that NORRED AND gate 310 to go high, and, as a result thereof, latch circuit 304 latches signals which are supplied to it from multiplexer 302.

In the CPU write state, CPU board 214 can directly introduce a time code address into tape position buffer 292. Once CPU board 214 has caused CPU write circuit 404 to be set in the CPU write state, the system address bus, which is connected to the internal address bus through multiplexer 309 and, thus, to the addressing input of tape position buffer 292, can be used by the CPU to address the memory locations in the bottom half of buffer 292. Similarly, in the CPU write state, CPU board 214 can supply a desired digit to the 4-bit input of tape position buffer 292. At this time, the multiplexer 302 receives a switching input from multiplexer 312 which causes multiplexer 302 to pass to latch 304 the four low order bits of the system data bus, the value of which can be controlled by the CPU board 214. Latch 304 also receives an output from NORRED AND gate 310 which causes latch 304 to pass to tape position buffer 292 the value received by latch 304 from the system data bus. Through one of its connections to multiplexer 312, CPU write circuit 404 can also cause an input to be supplied through NAND gate 311 to the write enable input of tape position buffer 292, so as to cause the 4-bit digit supplied to buffer 292 to be recorded at the address determined by the three low order bits of the system address bus. Thus, it can be seen that CPU board 214 can, by causing CPU write circuit 404 to enter the CPU write state, write any selected 4-bit digit into any one of the eight digits stored in the lower half of tape position buffer 292.

The CPU memory board 216 is comprised of circuitry which can contain a plurality of 8-bit memory words which are addressable by the CPU board 214, or by the time code/CTL boards 210 during DMA procedures. The memory circuitry on board 216 is divided into two basic types, Read Only Memory (ROM) from which data can be read, but into which it cannot be written, and Read/Write Memory, which is commonly called RAM, which stands for Random Access Memory. The ROM memory on CPU memory board 216 is used mainly to store the program which the microprocessor of CPU board 214 executes for the purpose of controlling editing system 200. The RAM memory on CPU memory board 216, is used for the storage of numerical and logical values which can change during the program which the CPU board 214 executes.

Included in the RAM memory of CPU memory board 216 are two 8-byte (one byte equals 8 bits) DMA tape position registers. One of these DMA tape position registers, referred to as the play DMA tape position register, is associated with play VTR 32, and it receives the 8-digit time code address which is transmitted to CPU memory board 216 by the time code/CTL board 210 associated with play VTR 32 from tape position buffer 292 on the respective time code/CTL board 210 during the CTL DMA procedure discussed above. The other of the DMA tape position registers is referred to as the record DMA tape position register and receives the 8-digit time code address from tape position buffer 292 on the time code/CTL board 210 which is associated with record VTR 22.

Similarly, CPU memory board 216 includes two 8-byte DMA time code registers, namely, a play DMA time code register which, during the time code DMA procedure, receives the 8-digit time code address from time code transfer buffer 328 located on the time code/CTL board 210 associated with play VTR 32, and a record DMA time code register which receives the 8-digit time code address from the time code transfer buffer 328 contained on the time code/CTL board 210 associated with record VTR 22 during the time code DMA procedure from the latter board 210.

During normal operation of editor 202, each of the DMA tape position registers and the DMA time code registers in CPU memory board 216 is updated by the CTL and time code DMA procedures every time that the respective time code/CTL board 210 counts a control pulse reproduced from the tape in the corresponding VTR. Thus, the value in each of the DMA tape position registers within CPU memory board 216 is identical to the 8-digit time code address in the lower half of tape position buffer 292 on the respective time code/CTL board 210, except for the brief period that the tape position counter 282 is counting a control pulse.

The CPU memory board 216 also contains a plurality of mark time registers, each of which is capable of storing an 8-digit time code address value. As was discussed above, when mark enable push button 250 (FIG. 6) of either play control section 226 or record control section 228 is actuated, that push button 250 will light, indicating that its associated control section is in the mark enable mode. In the mark enable mode of control section 226 or 228, actuation of in-point push button 254 out-point push button 258 of that control section will cause the display register 252 or 256 to the immediate left of that push button to receive, by transfer, the value contained within that control sections tape timer register 248. Similarly, if either the event (1) or the event (2) push button 262 or 266 is pressed or actuated at a time when only one of the control sections 226 and 228 is in the mark enable mode, the current value contained in the tape timer register 248 of that control section will be transferred to the display register 260 or 264 to the immediate left of the push button 262 or 266 which has been actuated. Thus, it can be seen that the in-point and out-point push buttons 254 and 258 of play control section 226, the in-point and out-point push buttons 254 and 258 of record control section 228, and the event (1) and event (2) push buttons 262 and 266, constitute marking push buttons, and their corresponding display registers can be considered as mark time display registers.

There is one mark time register contained within CPU memory board 216 for each of the marking push buttons 254, 258, 262 and 266 and its associated mark time display register 252, 256, 260 or 264 on console 206. Thus, there are on board 216 a play in-point mark time register, a play out-point mark time register, a record in-point mark time register, a record out-point mark time register, an event (1) mark time register, and an event (2) mark time register. The value displayed in each of the mark time display registers on console 206 is supplied thereto from the corresponding mark time register in CPU memory board 216 by means of CPU board 214 and the console interface contained in special function board 212, as is explained in greater detail in the copending applications identified by U.S. Ser. Nos. 139,444, 139,448 and 139,747. Thus, normally, the values displayed in the mark time display registers 252, 256, 260 and 264 on console 206, are identical with those contained in the corresponding mark time registers contained within CPU memory board 216.

The CPU memory board 216 also contains a frame accuracy register which is comprised of one byte, or 8 bits. As will be explained below, there is one bit within this frame accuracy register which is associated with each of the mark time registers contained in CPU memory board 216.

Figure 17:
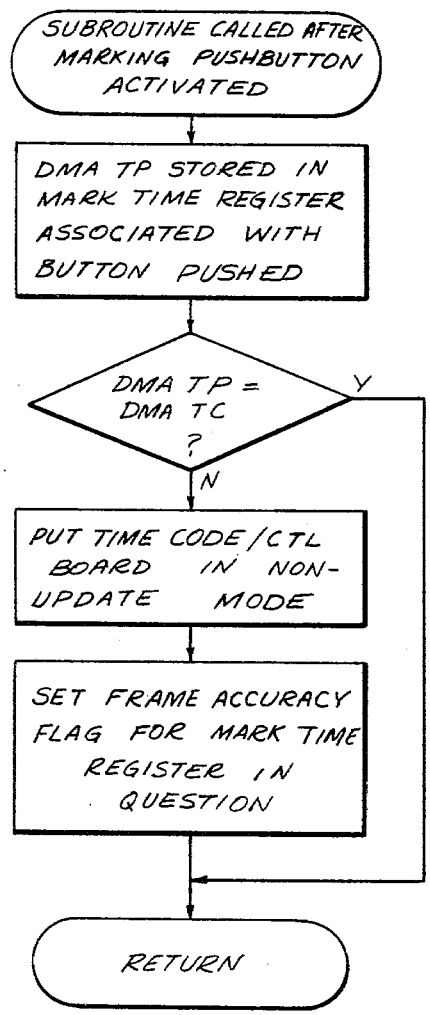
FIGS. 17 and 18 are flow charts showing steps performed by a microprocessor in a central processing unit board shown on FIG. 5.
Figure 18:
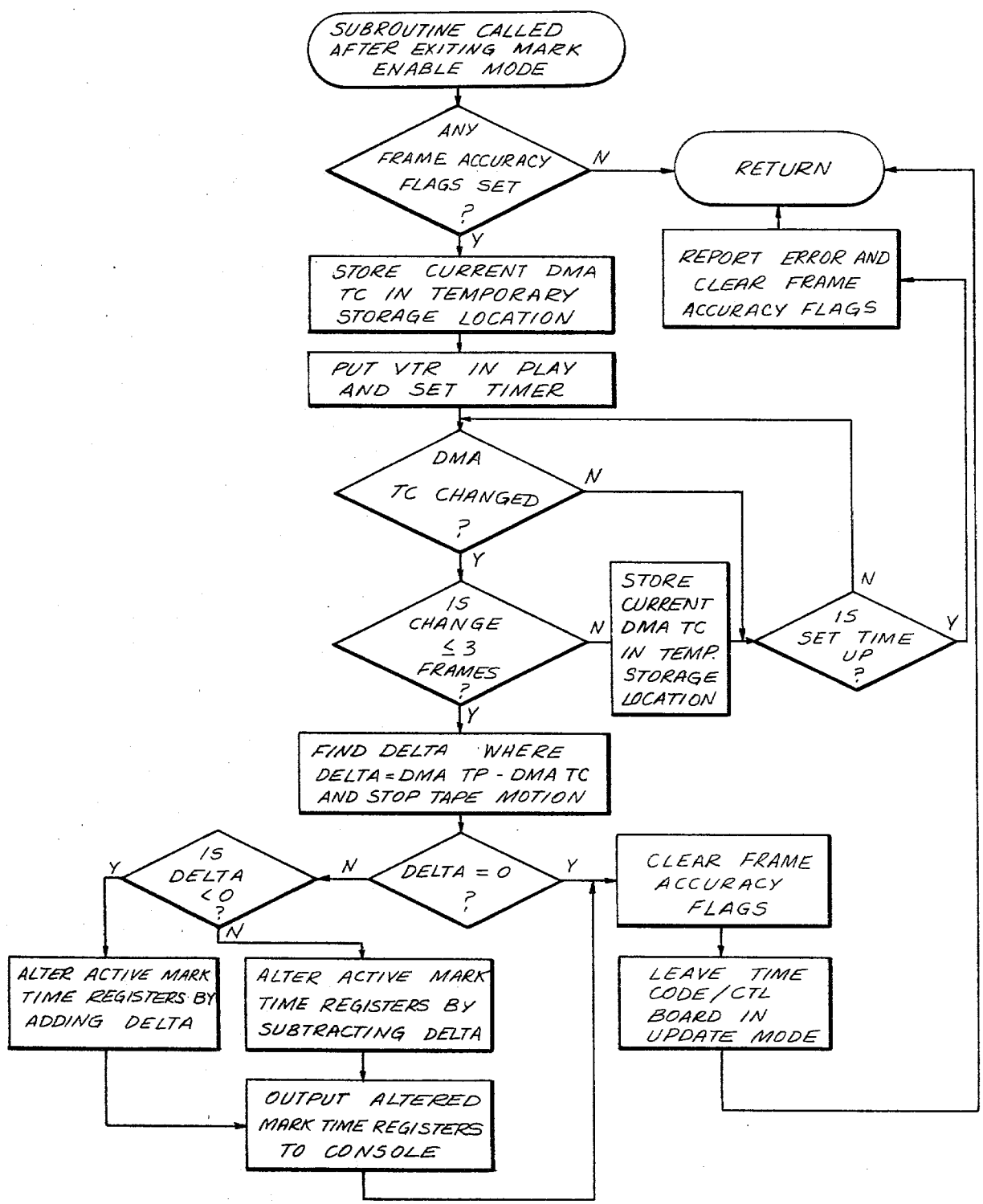

Referring now to FIGS. 17 and 18, flow charts are there shown which indicate the steps performed by the CPU or microprocessor of CPU board 214 for the purpose of determining, in conjunction with the other components of editing system 200, the time code addresses of video signals selected by the actuation of marking push buttons 254, 258, 262 and 266 on console 206 at times when the tape speed in the respective VTR is too low for the reliable reading of time code addresses. These steps are performed by the microprocessor in CPU board 214 in response to programmed instructions contained in the read-only memory on CPU memory board 216. The steps performed by the microprocessor are divided into those shown on FIG. 17 and which are performed immediately after the actuation of a marking push button with the respective control section 226 or 228 in the mark enable mode, and those shown on FIG. 18 which are performed immediately after the play control section 226 or the record control section 228 has been withdrawn from the mark enable mode as a result of the actuation of its mark enable push button 250 at a time when the respective control section is already in the mark enable mode as indicated by illumination of its mark enable push button 250.

The steps shown on the flow chart of FIG. 18 require the speeding up of the tape in the VTR which has been marked by the actuation of one or more marking push buttons. Since such speeding up of the tape movement in a VTR necessarily interrupts the viewing of a selected frame on video monitor 26 or 36, and since it requires a certain amount of time, it has been deemed desirable to delay speeding up of the tape in the VTR until desired by the operator of editing system 200. For this reason, the speeding-up process does not take place until the operator actuates the mark enable push button 250 associated with a particular VTR for the second time, so as to withdraw the respective control section 226 or 228 from the mark enable mode.

After a marking push button on console 206 has been pressed with the respective control section 226 or 228 in the mark enable mode, console 206 supplies CPU board 214, through the console interface on special function board 212, with a character indicating which of the marking push buttons 254, 258, 262 and 266 has been actuated. At this point, the microprocessor on CPU board 214 causes performance of the steps shown in the flow chart of FIG. 17. In the language of the computing arts, the CPU board 214 calls the subroutine of that flow chart. The first step taken in this subroutine, or program of steps is the storing of the 8-digit time code address contained within the DMA tape position register in the mark time register associated with the marking push button which has been actuated. For example, it it is assumed that the in-point push button 254 of play control section 226 is actuated, the first step in the subroutine of FIG. 17 would result in the storage, in the play in-point mark time register, of the current 8-digit value in the play DMA tape position register.

In the second step of the flow chart on FIG. 17, the microprocessor of CPU board 214 compares the value of the 8-digit time code address stored in the DMA tape position register with the DMA time code register associated with the VTR for which a marking push button has just been actuated and, if it finds that such two values are equal, it exits the subroutine shown on FIG. 17 by returning to whatever sequence of steps the micrprocessor was executing before the subroutine was entered. The CPU board 214 does this because, if the values in the DMA tape position and the DMA time code registers are identical, there is a high probability that the associated VTR is accurately reading time codes and, therefore, that the value stored in the mark time register associated with the actuated marking push button is most probably accurate and does not require further correction. If, however, the values in the DMA tape position and the DMA time code registers do not equal each other, there is a high probability that the time code reader 80 has not been able to accurately read time codes and, therefore, that the value which has just been transferred from the DMA tape position register to the mark time register associated with the actuated marking push button probably requires correction. As mentioned above, the time code DMA procedure will not take place unless the time code ready indicating circuit 286 of the associated time code/CTL board 210 generates a time code ready signal indicating that there is a high probability that the time code just ready by reader 80 is accurate. If the time code DMA procedure does not take place, the DMA time code register contained within CPU memory board 216 will not be updated and, therefore, its value will lag behind the value of the DMA tape position buffer which is normally updated each time that its associated time code/CTL board 210 counts a control pulse regardless of whether a time code ready signal is generated or not. Thus, the inability of time code reader 80 to reliably read time codes, normally causes the values of the DMA tape position and the DMA time code registers to differ.

When these two values do differ, the microprocessor of CPU board 214 performs the step of putting the time code/CTL board 210 associated with the actuated marking push button into the non-update mode, as is shown in FIG. 17. The microprocessor does this by writing into mode control latch 338 a group of control bits which has a low bit associated with that output of latch 338 which is supplied to the D input of update enable arm flip-flop 346. Update enable arm flip-flop 346 is prevented from being set as long as the bit associated with its D input is low in mode control latch 338 and, as long as flip-flop 346 cannot be set, do update circuit 396 will be prevented from entering the do update state. Thus, the circuitry of FIG. 7 will not be able to perform the update procedure in which the eight time code address digits contained within time code transfer buffer 328 are transferred to both the upper and lower halves of tape position buffer 292. The prevention of the update procedure makes it possible for tape position counter 282 to keep an accurate count of each control pulse which is read by the respective VTR in the period between the actuation of a marking push button and the subsequent reliable reading of a time code value from the tape contained within that VTR. Such accurate count by tape position counter 282 of control pulses read during that period can be used in conjunction with the value of the subsequently reliably read time code address to correct the value stored in the mark time register corresponding to the actuated marking push button. If the update procedure was allowed to continue, it could interfere with the accuracy of counting of the control pulses.

After the time code/CTL board 210 has been placed in the non-update mode, the subroutine shown on FIG. 17 causes the bit within the frame accuracy register on CPU memory board 216, which bit is associated with the mark time register corresponding to the marking push button which has been actuated, to be set to a value indicating that such mark time register may contain an inaccurate time code address which requires correction. After such setting of this bit within the frame accuracy register, the CPU will exit the subroutine shown on FIG. 17 and will return to the series of steps which it was executing before that subroutine was called or entered.

If the play or record control section 226 of 228 is already in the mark enable mode at the time its mark enable push button 250 is actuated, the illumination of push button 250 will be extinguished and the respective control section will cease being in the mark enable mode. At this point, the subroutine shown in the flow chart of FIG. 18 will be entered, or called, by the CPU. The first step performed by the CPU upon entering the subroutine shown in FIG. 18 involves reading of the frame accuracy register on the CPU memory board 216 and the determination of whether or not any of the bits within that register associated with the mark time registers have been set so as to indicate that the values in those mark time registers may require correction. If none of these bits have been set, none of the mark time registers require correction and thus there is no need for any of the further steps contained within the flow chart of FIG. 18. If this is the case, the CPU will then exit from the subroutine shown in FIG. 18, and will return to the sequence of steps it was executing before this subroutine was called.

On the other hand, if one or more of the bits in the frame accuracy register have been set, indicating that one or more of the mark time registers may require correction, the CPU stores, in a temporary storage location on CPU memory board 216, the 8-digit time code address contained in the DMA time code register.

Then the CPU generates commands, through the system data bus and the I/0 decoder on special function board 212, to the VTR interface board 208 associated with the VTR whose corresponding control section 226 or 228 has just had its mark enable mode terminated. Such commands to one of the boards 208 will cause the respective VTR to enter a play mode, and thus will increase the speed of the tape in that VTR to a level at which properly recorded time codes on that tape can be read reliably. At this time, the CPU also sets a timer circuit which may be part of board 214 and which, for example, indicates when a counted time of approximately 10 seconds has elapsed.

After the CPU has set the respective VTR to a play mode and has set the timer circuit, the CPU enters the next step indicated on the flow chart of FIG. 18, and in which the CPU compares the value of the 8-digit time code address currently in the DMA time code register with the corresponding value stored in the temporary storage location. If these two values are identical, that is, if the value in the DMA time code register has not changed since the VTR was placed in the speed-up mode, the CPU will then check whether the counted time being measured by the timer circuit has elapsed. If such time has not yet elapsed, the CPU will repeat the operation of comparing the value in the DMA time code register with that in the temporary storage location to determine if the value in the DMA time code register has changed. The CPU repeats the foregoing comparing operation until either the value in the DMA time code register does change, or the counted time elapses. If the counted time does elapse before the value in the DMA time code register changes, then the CPU indicates that an error has taken place and it clears all of the bits in the frame accuracy flags which indicate that one or more of the mark time registers may require correction. Then, the CPU returns to the sequence of steps which was being performed before the subroutine shown in FIG. 18 was entered. The foregoing procedure is followed because, if the value in the DMA time code register does not change within the counted time, for example, within 10 seconds, something is wrong and it probably would be a waste of time for the machine to continue attempting to reliably read a time code on the tape. Such problems might exist, for example, if there are electronic failures in the circuitry of editor 202, or if the time code signal is either missing or unreadable on the portion of the tape currently being read.

If, on the other hand, the value of the DMA time code register does change before the counted time elapses, the CPU will check to see if the new value in the DMA time code register differs from the value in the temporary storage location on board 216 by 3 or less frames. During the first time that this step is performed by the CPU after the respective VTR has been placed in the play mode, the value in the DMA time code register normally will differ from the value in the temporary storage location by considerably more than 3 frames. If this is the case, the CPU will then store the value currently in the DMA time code register in the temporary storage location, and will then check to make sure that the counted time has not elapsed. As soon as the value in the DMA time code register is once again changed, the CPU will check to see if this new value varies by three or less frames from the value in temporary storage location. If it does not, the CPU will keep repeating the process of storing at the temporary storage location the time code value most recently read and waiting for a new time code value to be read, until either the counted time elapses or two subsequent values are received in the DMA time code register which differ by less than 3 frames.

The purpose of requiring that there be read into the DMA time code register two time code values which differ from each other by less than 3 frames before proceeding with the correction process, is to prevent the correction process from continuing at a time when the time code values being read into the DMA time code register are varying in an erratic manner. If no two values successively read into the DMA time code register on CPU memory board 216 are within 3 frames or less of each other during the counted time, then the CPU reports an error and clears the flags on the frame accuracy register, and will return to the sequence of steps it was performing before the subroutine on FIG. 18 was called or entered.

If, on the other hand, two time code values are successively read into the DMA time code register which vary by 3 frames or less, the CPU determines a value $\Delta$ which is equal to the difference between the current value in the DMA tape position register associated with the VTR in question and the current value of the DMA time code register associated with that VTR. Further, at this time, CPU board 214 issues commands to the VTR through the I/O decoder located on special function board 212 and the respective VTR interface board 208 which causes the VTR to stop movement of the tape therein.

Once the value $\Delta$ has been determined, the CPU performs its next step of determining whether or not the value of $\Delta$ is zero. If the value of $\Delta$ is zero, the CPU then performs the steps of clearing the frame accuracy flags and of setting the respective time code/CTL board 210 to the update mode by writing into the mode control latch 338 a new control word which contains a high bit associated with the output which is supplied to the D input of update enable arm flip-flop 346. In response to the foregoing, the time code/CTL board 210 will normally transfer the value contained in the bottom half of time code transfer buffer 328 to tape position buffer 292 after each control pulse counted by the tape position counter 282. Once this step is accomplished, the CPU will then exit from the subroutine shown in FIG. 18 and return to the sequence of steps which it was performing before that subroutine was called or entered.

If, on the other hand, the value of $\Delta$ is not zero, the CPU will then determine whether or not the value of $\Delta$ is less than zero. If $\Delta$ is less than zero, that is, the value in the DMA time code register is greater than that in the DMA tape position register, the CPU will then add the absolute value of $\Delta$ to each of the mark time registers which has an associated bit in the frame accuracy flag indicating that it should be corrected. On the other hand, if the value of $\Delta$ is greater than zero, that is, if the value in the DMA tape position register is greater than that in the DMA time code register, the CPU will subtract the absolute value of $\Delta$ from each of the mark time registers which has an associated bit in the frame accuracy register indicating that it should be corrected. After completion of this process of either adding or subtracting the absolute value of $\Delta$ to or from each of the mark time registers requiring correction, the CPU outputs the altered value of each of the corrected mark time registers to the corresponding mark time display registers on console 206. Then, the CPU performs the same steps which it would have performed if the value Δ was found to have been zero, that is, it clears the bits, or flags, in the frame accuracy register which indicate those mark time registers requiring correction, it sets the time code/CTL board 210 to the update mode, and then it exits from the subroutine shown on the flow chart in FIG. 18 and returns to the sequence of steps which was being performed by the CPU before that subroutine was called.

The value in the DMA tape position register used in the calculation of the difference value Δ is equal to the value in each of the mark time registers to be corrected plus the number of control pulses, or frames, which have been counted by tape position counter 282 since tape position buffer 292 had the value stored in each such mark time register. This is true because the tape position counter 282 counts each control pulse which is supplied to it and because the CPU prevents the update procedure, which might alter the value of the count in the tape position counter 282, after the loading of any time code address into a mark time register under conditions which indicate that the value in that mark time register might require the correction procedure of FIG. 18. Thus, the difference between the time code address in the DMA tape position register and that in each mark time register which is to be corrected, is equal to the number of frames which the video tape in question has been moved since the marking push button associated with that mark time register was actuated. If the counted number of frames is an accurate indication of the amount that the tape position has changed since the marking push button associated with a given mark time register was actuated, the value in that mark time register will be an accurate representation of the time code address of the video tape at the time that the marking push button associated with that register was actuated if the time code address in that mark time register differs from the subsequently encountered longitudinal time code address in the DMA time code retister, at the time that the value of Δ is calculated, by the counted number of frames.

If the value of Δ is zero, the value in each active mark time register, that is, each mark time register which has an associated bit in the frame accuracy register indicating it may require correction, already differs from the value in the DMA time code register by the same amount that it differs from the value in the DMA tape position register, since the values in both the time code and tape position registers are equal. If the value of Δ is less than zero, the value in the DMA time code register is greater than by the value Δ, and thus the value in each of the active mark time registers must be correspondingly increased by Δ so that its time code address will differ from the time code address in the DMA time code register by the counted number of frames. Similarly, if the value of Δ is greater than zero, then the time code address stored in the DMA time code register is less than the value stored in the DMA tape position register by the value Δ and, therefore, the value in each of the active mark time registers must be correspondingly decreased by the absolute value of Δ. As a result of the foregoing, the difference between the value in each mark time register and the value in the DMA time code register will be made equal to the number of frames counted by tape position counter 282 in response to movement of the tape between actuation of the associated mark time push button and reading of the subsequently encountered longitudinal time code in the DMA time code register.

Thus, it can be seen that editor 202 according to this invention provides means for accurately determining the longitudinal time code addresses of video or other information signals selected by actuation of marking push buttons at times when the speed of the tape upon which such information signals are recorded is too slow for the reliable reading of longitudinal time code addresses. It should be noted that once such addresses of selected information signals have been derived by the apparatus according to this invention, as described above, means known in the art of video editing can be employed for causing a video editor to cue to a selected one of such addresses and to repeatedly display the respective video frame in a still mode. Similarly, the derived address can be used as in- or out-points in a video edit, or they can be used for any of the many other purposes for which time code addresses are used in video editing equipment.

As was noted above, the counting of control pulses recorded on a tape can be subject to error, particularly if the tape is repeatedly stopped, started, reversed, or moved at extremely slow speeds. Thus, it is possible that the value in the DMA tape position register at the time that the value of Δ is determined may not be an accurate indication of the distance the tape has moved since actuation of a marking push button. For this reason, if the address of a particular video frame is to be determined with extreme accuracy, it is preferred that the repeated stopping, starting, reversing and slow movement of the tape be avoided between the time that a marking push button is actuated and the time when the mark enable mode is terminated so as to execute the subroutine of FIG. 18. If this preferred procedure is followed, the editor 202 is able to calculate the exact longitudinal time code address of a video tape at the time that a marking push button is actuated.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus for determining the addresses of selected information signals recorded on a tape, said tape also having recorded on it a series of longitudinal time codes recorded along the length of said tape and designating corresponding addresses of recorded information signals, and a series of control pulses which are recorded serially along said tape and being reproduced for the purpose of synchronizing the motion of said tape relative to transducer means which reads said information signals on said tape, said apparatus including time code reading means capable of reliable reading said longitudinal time codes only when said tape is moved at a speed which is sufficient therefor, selectively operable means for generating a marking signal when an information signal recorded at a desired point of said tape is read, and control pulse reading means for reproducing said control pulses as said tape moves; a device for determining the address, in terms of its respective longitudinal time code, of a selected information signal when the latter is selected at a time when the tape is not being moved at said speed sufficient for reliable reading of said longitudinal time codes, said device comprising:

speed-up means operable for increasing the speed of said tape after generation of marking signal so that said tape attains a sufficient speed for said time code reading means to reliably read a subsequently encountered longitudinal time code;

counting means for counting said control pulses reproduced by said control pulse reading means between said generation of said marking signal and the reliable reading of said subsequently encountered longitudinal time code and thereby providing a count of said control pulses; and means for providing a derived address, in terms of its respective longitudinal time code, which is a function of said count and of said subsequently encountered longitudinal time code and which corresponds to said desired point.

2. An apparatus according to claim 1; in which said device further comprises selectively actuable control means, and means connected to said control means and said speed-up means for preventing the operation of said speed-up means until said control means is actuated.

3. An apparatus according to claim; further comprising cue means for moving said tape to a position at which the information signal recorded at said derived address can be read.

4. An apparatus according to claim 3; in which said cue means includes means for bringing said tape to rest at said position and for causing repetitive reading of said information signal recorded at said derived address.

5. An apparatus according to claim 1; in which said device further comprises means for detecting the probability of accuracy of the longitudinal time code being read and for generating a time code ready signal upon reading a longitudinal time code having at least a predetermined degree of said probability of accuracy; and wherein said means for providing a derived address includes means for selecting said subsequently encountered longitudinal time code in response to said time code ready signal.

6. An apparatus according to claim 1; in which said device further comprises means for automatically stopping the operation of said speed-up means in response to said time code reading means reading said subsequently encountered longitudinal time code.

7. An apparatus according to claim 1; wherein said counting means includes a count register which contains a current value of said count, and a mark time register for storing said current value when said marking signal is generated; and wherein said derived address is a function of the value stored in said mark time register, the address designated by said subsequently encountered longitudinal time code and the value of said count register at the time that said subsequently encountered longitudinal time code is read.

8. An apparatus according to claim 7; further comprising means operable before said marking signal is generated for setting the value of said count register to an address designated by the longitudinal time code read by said time code reading means at the time of said setting; and wherein said means for providing a derived address includes means for subtracting the address designated by said subsequently encountered longitudinal time code from the value of said count register at the time said subsequently encountered longitudinal time code is read, and means for subtracting the resulting difference from the value of said mark time register.

9. An apparatus according to claim 1; wherein said selectively operable means for generating a marking signal is capable of selectively generating a plurality of marking signals;

wherein said counting means includes a count register which contains a current value of said count, a plurality of mark time registers respectively corresponding to said plurality of marking signals and storing said current value when the respective one of said marking signals is generated; and wherein said means for providing said derived address includes means for providing a derived address corresponding to each of said marking signals and which is determined as a function of the value stored in the mark time register corresponding to said marking signal, the address designated by said respective subsequently encountered time code, and the value of said count register at the time that said respective subsequently encountered longitudinal time code is read.

10. An apparatus according to claim 9; wherein said apparatus is designed for use with a video tape editing system for transferring playback information signals from a selected starting location on a playback video tape in a playback video tape recorder to a selected starting location on a record video tape in a record video tape recorder for a selected number of frames, wherein at least one of said playback and record video tapes is said tape, and wherein said apparatus further comprises switching means for causing said editing system to switch between a state in which said playback information signals are transferred from said playback video tape to said record video tape and a state in which said playback information signals are not so transferred when said time code reading means reads said derived address.

11. An apparatus according to claim 1; wherein said information signals recorded on said tape include a sequence of successive video signal frames and said longitudinal time codes designate, in terms of a frame number, the relative position of each such frame within said sequence of successive frames.

12. An apparatus according to claim 11; wherein a predetermined number of said control pulses are recorded in conjunction with each said video signal frame; and wherein said counting means alters said count by one in response to the reproducing by said control pulse reading means, of said predetermined number of control pulses.

13. A method for determining the address of a selected information signal recorded on a tape which also has recorded on it a series of longitudinal time codes recorded along its length and designating corresponding addresses of recorded information signals and a series of control pulses recorded along said tape for the purpose of synchronizing the motion of said tape relative to the motion of transducer means by which said information signal on said tape are read, and in which said longitudinal time codes can be reliably read only when said tape is moved at a speed which is sufficient therefor; said method comprising:

speeding up said tape upon the selection of a recorded information signal at a time when the tape is not being moved at a speed sufficient for reliable reading of the corresponding longitudinal time code so that the tape attains a sufficient speed for reliable reading of a longitudinal time code;

reading a longitudinal time code encountered subsequent to said tape attaining said sufficient speed;

reading said control pulses which pass a given location as said tape moves;

counting the number of said control pulses read between the time that said information signal is selected and the time that said subsequently encountered longitudinal time code is read and for producing a count of said control pulses; and deriving a derived address, in terms of the longitudinal time code, corresponding to said selected information signal, as a function of said subsequently encountered longitudinal time code and said count.

14. A method according to claim 13; further comprising preventing said speeding up from occurring until a selectively actuable control means has been actuated.

15. A method according to claim 13; further comprising moving said tape to a position at which the information signal recorded at said derived address can be read.

16. A method according to claim 15; further comprising bringing said tape to rest at said position and causing repetitive reading of said information signal recorded at said derived address.

17. A method according to claim 13; further comprising detecting the probability of accuracy of the longitudinal time code being read, and selecting a longitudinal time code as said subsequently encountered longitudinal time code when said detected probability of accuracy has at least a predetermined level.

18. A method according to claim 13; further comprising terminating said speeding up in response to reading of said subsequently encountered longitudinal time code.

19. A method according to claim 13; wherein said counting includes keeping a current running count of said control pulses which are read, and storing the value of said current running count when said selected information signal is selected; and wherein said derived address is derived as a function of the value of said stored current running count stored when said information signal is selected, the value of the address designated by said subsequently encountered longitudinal time code and the value of said current running count at the time that said subsequently encountered longitudinal time code is read.

20. A method according to claim 19; in which, before said selected information signal is selected, the value of said current running count is set to an address value designated by a longitudinal time code read at the time of said setting; and said deriving of said derived address includes subtracting the value of the address designated by said subsequently encountered longitudinal time code from the value of said current running count at the time said subsequently encountered longitudinal time code is read, and subtracting the resulting difference from the value of said stored current running count.

21. A method according to claim 19; in which, for determining the address at which an additional selected information signal is recorded, there is derived a derived address corresponding to each said additional selected information signal as a function of the stored current running count stored when said additional information signal is selected, the value of the address designated by said subsequently encountered longitudinal time code, and the value of said current running count at the time that said subsequently encountered longitudinal time code is read.

22. A method according to claim 21; for use in video tape editing in which playback information signals are transferred, from a selected starting location on a playback video tape in a playback video tape recorder, to a record video tape in a record video tape recorder for a selected number of frames starting from a selected starting location on said record video tape;

wherein at least one of said playback and record video tapes is said tape with the longitudinal time codes thereon; and further comprising discontinuing the transferring of said playback information signals from said playback video tape to said record video tape upon reading of said longitudinal time code corresponding to said derived address of the additional information signal.

23. A method according to claim 13; wherein said information signals recorded on said tape include a sequence of successive video signal frames and said longitudinal time codes designate, in terms of a frame number, the relative position of each such frame within said sequence of successive frames.

24. A method according to claim 23; wherein a predetermined number of control pulses are recorded in conjunction with each said video signal frame; and wherein, in said counting, said count is increased by one in response to the reading of said predetermined number of control pulses.

* * * * *